(12) United States Patent
Jani et al.

(10) Patent No.: US 7,727,565 B2
(45) Date of Patent: *Jun. 1, 2010

(54) LIQUID-FILLED CHEWING GUM COMPOSITION

(75) Inventors: Bharat Jani, East Brunswick, NJ (US); Kishor Kabse, Morris Plains, NJ (US)

(73) Assignee: Cadbury Adams USA LLC, Parsippany, NJ (US)

( * ) Notice: Subject to any disclaimer, the term of this patent is extended or adjusted under 35 U.S.C. 154(b) by 1020 days.

This patent is subject to a terminal disclaimer.

(21) Appl. No.: 11/408,761

(22) Filed: Apr. 21, 2006

(65) Prior Publication Data

US 2007/0003663 A1  Jan. 4, 2007

Related U.S. Application Data

(63) Continuation-in-part of application No. 11/210,954, filed on Aug. 24, 2005, now abandoned, which is a continuation-in-part of application No. 10/925,822, filed on Aug. 25, 2004, now Pat. No. 7,641,926.

(60) Provisional application No. 60/776,641, filed on Feb. 24, 2006, provisional application No. 60/683,634, filed on May 23, 2005, provisional application No. 60/650,758, filed on Feb. 7, 2005.

(51) Int. Cl.
A23G 4/20 (2006.01)
(52) U.S. Cl. .............................. 426/3; 426/103; 426/660
(58) Field of Classification Search ...................... 426/3, 426/5, 89, 103, 533, 615, 639, 660, 6
See application file for complete search history.

(56) References Cited

U.S. PATENT DOCUMENTS

| | | |
|---|---|---|
| 325,711 A | 9/1885 | Stuckes, Jr. |
| 810,210 A | 1/1906 | Laws |
| 943,945 A | 12/1909 | Liebich |
| 1,633,336 A | 6/1927 | Larson |
| 1,771,506 A | 7/1930 | Mustin |
| 1,771,982 A | 7/1930 | Mustin |
| 1,936,456 A | 11/1933 | Larson |
| 2,004,957 A | 6/1935 | Messner |
| 2,191,199 A | 2/1940 | Hall |
| 2,197,719 A | 4/1940 | Conner |
| 2,448,786 A | 9/1948 | Faxon |
| 2,876,167 A | 3/1959 | Manahan |
| 2,886,440 A | 5/1959 | Kramer et al. |
| 2,886,441 A | 5/1959 | Kramer et al. |
| 2,886,442 A | 5/1959 | Kramer et al. |
| 2,886,443 A | 5/1959 | Rosenthal et al. |
| 2,886,444 A | 5/1959 | Rosenthal et al. |
| 2,886,445 A | 5/1959 | Rosenthal et al. |
| 2,886,446 A | 5/1959 | Kramer et al. |
| 2,886,449 A | 5/1959 | Rosenthal et al. |
| 2,973,273 A | 2/1961 | Curtiss |
| 3,004,897 A | 10/1961 | Shore |
| 3,052,552 A | 9/1962 | Koerner et al. |
| 3,071,476 A | 1/1963 | Werft et al. |
| 3,117,027 A | 1/1964 | Lindlof et al. |
| 3,124,459 A | 3/1964 | Erwin |
| 3,159,585 A | 12/1964 | Evans et al. |
| 3,241,520 A | 3/1966 | Wurster et al. |
| 3,255,018 A | 6/1966 | Comollo |
| 3,475,533 A | 10/1969 | Mayrand |
| 3,538,230 A | 11/1970 | Pader et al. |
| 3,664,962 A | 5/1972 | Kelly et al. |
| 3,664,963 A | 5/1972 | Pasin |
| 3,677,771 A | 7/1972 | Kolar |
| 3,708,396 A | 1/1973 | Mitsuhashi et al. |
| 3,795,744 A | 3/1974 | Ogawa et al. |
| 3,795,748 A | 3/1974 | Cillario |
| 3,806,290 A | 4/1974 | Graff et al. |
| 3,819,838 A | 6/1974 | Smith et al. |
| 3,821,417 A | 6/1974 | Westall et al. |
| 3,826,847 A | 7/1974 | Ogawa et al. |
| 3,857,963 A | 12/1974 | Graff et al. |
| 3,857,964 A | 12/1974 | Yolles |

(Continued)

FOREIGN PATENT DOCUMENTS

CA  1208966  8/1986

(Continued)

OTHER PUBLICATIONS

J. Agric. Food Chem. 2004, 52, 8119-8126, Istabel Ovejero-Lopez, Anne-Mette Haahr, Frans Van Den Berg, and Wender L.P. Bredie, Flavor Release Management from Gum Model System.

Prencipe et al.; Squeezing out a better toothpaste; Chemtech, Dec. 1995; http://pubs.acs.org/hotartcl/chemtech/95/dec.dec/html; printed Apr. 20 2004; pp. 1-7.

Gantrez® AN; ISP Polymers for Oral Care; http://www.ispcorp.com/products/oralcare/content/brochure/oral/prod.html, printed Jun. 9, 2004, pp. 1-5.

Demmers et al.; Effect of Surfactants and Proteolytic Enzymers on Artificial Calculus Formation; Surfactants and Enzymes: Calculus; pp. 28-35.

(Continued)

*Primary Examiner*—Lien Tran
*Assistant Examiner*—Kelly Bekker
(74) *Attorney, Agent, or Firm*—Hoffmann & Baron, LLP

(57) ABSTRACT

Some embodiments provide a chewing or bubble gum composition which includes a liquid fill composition and a gum region which includes a gum base surrounding the liquid fill which may include a modified release component, wherein the gum region includes a polyol composition including at least one polyol and having a water solubility of less than 72% by weight at 25° C. The composition may also include a coating region which surrounds the gum region.

18 Claims, No Drawings

U.S. PATENT DOCUMENTS

| | | |
|---|---|---|
| 3,862,307 A | 1/1975 | Di Giulio |
| 3,872,021 A | 3/1975 | McKnight |
| 3,878,938 A | 4/1975 | Venables et al. |
| 3,894,154 A | 7/1975 | Graff et al. |
| 3,912,817 A | 10/1975 | Sapsowitz |
| 3,930,026 A | 12/1975 | Clark |
| 3,943,258 A | 3/1976 | Bahoshy et al. |
| 3,962,416 A | 6/1976 | Katzen |
| 3,962,463 A | 6/1976 | Witzel |
| 3,974,293 A | 8/1976 | Witzel |
| 3,984,574 A | 10/1976 | Comollo |
| 4,037,000 A | 7/1977 | Burge et al. |
| 4,045,581 A | 8/1977 | Mackay et al. |
| 4,083,995 A | 4/1978 | Mitchell et al. |
| 4,107,360 A | 8/1978 | Schmidgall |
| 4,130,638 A | 12/1978 | Dhabhar et al. |
| 4,136,163 A | 1/1979 | Watson et al. |
| 4,139,639 A | 2/1979 | Bahoshy et al. |
| 4,148,872 A | 4/1979 | Wagenknecht et al. |
| 4,150,112 A | 4/1979 | Wagenknecht et al. |
| 4,150,161 A | 4/1979 | Rudolph et al. |
| 4,156,715 A | 5/1979 | Wagenknecht et al. |
| 4,156,716 A | 5/1979 | Wagenknecht et al. |
| 4,156,740 A | 5/1979 | Glass et al. |
| 4,157,385 A | 6/1979 | Wagenknecht et al. |
| 4,157,402 A | 6/1979 | Ogawa et al. |
| 4,159,315 A | 6/1979 | Wagenknecht et al. |
| 4,160,054 A | 7/1979 | Wagenknecht et al. |
| 4,160,820 A | 7/1979 | Wagenknecht et al. |
| 4,187,320 A | 2/1980 | Koch et al. |
| 4,208,431 A | 6/1980 | Friello et al. |
| 4,217,368 A | 8/1980 | Witzel et al. |
| 4,224,345 A | 9/1980 | Tezuka et al. |
| 4,230,688 A | 10/1980 | Rowsell et al. |
| 4,250,196 A | 2/1981 | Friello |
| 4,252,829 A | 2/1981 | Terrevazzi |
| 4,271,197 A | 6/1981 | Hopkins et al. |
| 4,271,199 A | 6/1981 | Cherukuri et al. |
| 4,276,312 A | 6/1981 | Merritt |
| 4,292,329 A | 9/1981 | Ogawa et al. |
| 4,295,845 A | 10/1981 | Sepulveda et al. |
| 4,301,178 A | 11/1981 | Witzel et al. |
| 4,314,990 A | 2/1982 | Denny, Jr. et al. |
| 4,316,915 A | 2/1982 | Friello et al. |
| 4,340,583 A | 7/1982 | Wason |
| 4,352,823 A | 10/1982 | Cherukuri et al. |
| 4,352,825 A | 10/1982 | Cherukuri et al. |
| 4,363,756 A | 12/1982 | Sepulveda et al. |
| 4,374,858 A | 2/1983 | Glass et al. |
| 4,384,004 A | 5/1983 | Cea et al. |
| 4,386,106 A | 5/1983 | Merritt et al. |
| 4,399,154 A | 8/1983 | Puglia et al. |
| 4,421,773 A | 12/1983 | Akutagawa |
| 4,430,351 A | 2/1984 | Cillario |
| 4,452,821 A | 6/1984 | Gergely |
| 4,457,857 A | 7/1984 | Sepulveda et al. |
| 4,459,425 A | 7/1984 | Amano et al. |
| 4,466,983 A | 8/1984 | Cifrese et al. |
| 4,485,118 A | 11/1984 | Carroll et al. |
| 4,513,012 A | 4/1985 | Carroll et al. |
| 4,515,769 A | 5/1985 | Merritt et al. |
| 4,563,345 A | 1/1986 | Arrick |
| 4,585,649 A | 4/1986 | Lynch |
| 4,590,075 A | 5/1986 | Wei et al. |
| 4,597,970 A | 7/1986 | Sharma et al. |
| 4,601,907 A | 7/1986 | Knebl et al. |
| 4,614,649 A | 9/1986 | Gorman et al. |
| 4,614,654 A | 9/1986 | Ream et al. |
| 4,614,658 A | 9/1986 | Wilson et al. |
| 4,627,987 A | 12/1986 | Barnett et al. |
| 4,634,593 A | 1/1987 | Stroz et al. |
| 4,642,235 A | 2/1987 | Reed et al. |
| 4,647,450 A | 3/1987 | Peters et al. |
| 4,673,577 A | 6/1987 | Patel |
| 4,683,138 A | 7/1987 | Glass et al. |
| 4,707,363 A | 11/1987 | Sato et al. |
| 4,711,784 A | 12/1987 | Yang |
| 4,722,845 A | 2/1988 | Cherukuri et al. |
| 4,726,953 A | 2/1988 | Carroll et al. |
| 4,740,376 A | 4/1988 | Yang |
| 4,741,905 A | 5/1988 | Huzinec |
| 4,749,575 A | 6/1988 | Rotman |
| 4,751,095 A | 6/1988 | Karl et al. |
| 4,752,481 A | 6/1988 | Dokuzovic |
| 4,753,790 A | 6/1988 | Silva et al. |
| 4,762,719 A | 8/1988 | Forester |
| 4,771,784 A | 9/1988 | Kozin et al. |
| 4,800,087 A | 1/1989 | Mehta |
| 4,804,548 A | 2/1989 | Sharma et al. |
| 4,816,265 A | 3/1989 | Cherukuri et al. |
| 4,822,599 A | 4/1989 | Mitra |
| 4,824,681 A | 4/1989 | Schobel et al. |
| 4,828,845 A | 5/1989 | Zamudio-Tena et al. |
| 4,828,857 A | 5/1989 | Sharma et al. |
| 4,842,762 A | 6/1989 | Sabol, Jr. et al. |
| 4,871,570 A | 10/1989 | Barnett et al. |
| 4,904,482 A | 2/1990 | Patel et al. |
| 4,911,934 A | 3/1990 | Yang et al. |
| 4,915,958 A | 4/1990 | Faust et al. |
| 4,918,182 A | 4/1990 | Jackson et al. |
| 4,919,841 A | 4/1990 | Kamel et al. |
| 4,923,684 A | 5/1990 | Ibrahim et al. |
| 4,927,646 A | 5/1990 | Jenner et al. |
| 4,929,447 A | 5/1990 | Yang |
| 4,931,293 A | 6/1990 | Cherukuri et al. |
| 4,933,190 A | 6/1990 | Cherukuri et al. |
| 4,938,128 A | 7/1990 | Knebl |
| 4,949,630 A | 8/1990 | Knebl |
| 4,952,407 A | 8/1990 | Record et al. |
| 4,971,797 A | 11/1990 | Cherukuri et al. |
| 4,971,806 A | 11/1990 | Cherukuri |
| 4,975,288 A | 12/1990 | Hager et al. |
| 4,978,537 A | 12/1990 | Song |
| 4,980,178 A | 12/1990 | Cherukuri et al. |
| 4,981,698 A | 1/1991 | Cherukuri et al. |
| 4,985,236 A | 1/1991 | Ibrahim et al. |
| 4,986,991 A | 1/1991 | Yatka et al. |
| 4,997,659 A | 3/1991 | Yatka et al. |
| 5,004,595 A | 4/1991 | Cherukuri et al. |
| 5,009,900 A | 4/1991 | Levine et al. |
| 5,017,385 A | 5/1991 | Wienecke |
| 5,043,154 A | 8/1991 | Gaffar et al. |
| 5,043,169 A | 8/1991 | Cherukuri et al. |
| 5,057,327 A | 10/1991 | Yatka et al. |
| 5,057,328 A | 10/1991 | Cherukuri et al. |
| 5,059,429 A | 10/1991 | Cherukuri et al. |
| 5,064,658 A | 11/1991 | Cherukuri et al. |
| 5,073,389 A | 12/1991 | Wienecke |
| 5,080,877 A | 1/1992 | Chane-Ching et al. |
| 5,082,671 A | 1/1992 | Cherukuri |
| 5,084,278 A | 1/1992 | Mehta |
| 5,096,699 A | 3/1992 | Gaffar et al. |
| 5,096,701 A | 3/1992 | White, Jr. et al. |
| 5,100,678 A | 3/1992 | Reed et al. |
| 5,108,763 A | 4/1992 | Chau et al. |
| 5,125,819 A | 6/1992 | Hager et al. |
| 5,126,151 A | 6/1992 | Bodor et al. |
| 5,139,793 A | 8/1992 | Johnson et al. |
| 5,139,794 A | 8/1992 | Patel et al. |
| 5,139,798 A | 8/1992 | Yatka et al. |
| 5,154,939 A | 10/1992 | Broderick et al. |
| 5,156,866 A | 10/1992 | Sato et al. |
| 5,164,210 A | 11/1992 | Campbell et al. |
| 5,169,657 A | 12/1992 | Yatka et al. |

| | | | | | | |
|---|---|---|---|---|---|---|
| 5,169,658 | A | 12/1992 | Yatka et al. | 5,869,028 A | 2/1999 | McGill et al. |
| 5,174,514 | A | 12/1992 | Prodi | 5,879,728 A | 3/1999 | Graff et al. |
| 5,176,900 | A | 1/1993 | White, Jr. et al. | 5,900,261 A | 5/1999 | Ribadeau-Dumas et al. |
| 5,198,251 | A | 3/1993 | Song et al. | 5,912,007 A | 6/1999 | Pan et al. |
| 5,202,112 | A | 4/1993 | Prencipe et al. | 5,939,051 A | 8/1999 | Santalucia et al. |
| 5,208,009 | A | 5/1993 | Gaffar et al. | 5,952,019 A | 9/1999 | Yatka et al. |
| 5,227,182 | A | 7/1993 | Song et al. | 5,955,116 A | 9/1999 | Kehoe et al. |
| 5,229,148 | A | 7/1993 | Copper | 6,027,746 A | 2/2000 | Lech |
| 5,240,710 | A | 8/1993 | Bar-Shalom et al. | 6,054,144 A | 4/2000 | Burruano et al. |
| 5,244,887 | A | 9/1993 | Straub | 6,056,992 A | 5/2000 | Lew |
| 5,256,402 | A | 10/1993 | Prencipe et al. | 6,087,353 A | 7/2000 | Stewart et al. |
| 5,266,336 | A | 11/1993 | McGrew et al. | 6,174,514 B1 | 1/2001 | Cherukuri et al. |
| 5,273,741 | A | 12/1993 | Gaftar et al. | 6,190,644 B1 | 2/2001 | McClanahan et al. |
| 5,279,842 | A | 1/1994 | Escola Gallart et al. | 6,238,690 B1 | 5/2001 | Kiefer et al. |
| 5,300,283 | A | 4/1994 | Prencipe et al. | 6,242,019 B1 | 6/2001 | Bell et al. |
| 5,334,375 | A | 8/1994 | Nabi et al. | 6,261,540 B1 | 7/2001 | Nelson |
| 5,334,396 | A | 8/1994 | Yatka | 6,280,762 B1 | 8/2001 | Bealin-Kelly et al. |
| 5,336,509 | A | 8/1994 | McGrew et al. | 6,280,780 B1 | 8/2001 | Degady et al. |
| 5,352,439 | A | 10/1994 | Norfleet et al. | 6,284,291 B1 | 9/2001 | Siecke et al. |
| 5,364,627 | A | 11/1994 | Song | 6,290,933 B1 | 9/2001 | Durga et al. |
| 5,380,530 | A | 1/1995 | Hill | 6,306,429 B1 | 10/2001 | Bealin-Kelly |
| 5,385,729 | A | 1/1995 | Prencipe et al. | 6,365,209 B2 | 4/2002 | Cherukuri |
| 5,391,315 | A | 2/1995 | Ashkin | 6,379,654 B1 | 4/2002 | Gebreselassie et al. |
| 5,399,365 | A | 3/1995 | Yatka et al. | 6,416,744 B1 | 7/2002 | Robinson et al. |
| 5,413,799 | A | 5/1995 | Song et al. | 6,428,827 B1 | 8/2002 | Song et al. |
| 5,415,880 | A | 5/1995 | Song et al. | 6,432,441 B1 | 8/2002 | Bealin-Kelly et al. |
| 5,425,961 | A | 6/1995 | Yatka et al. | 6,471,945 B2 | 10/2002 | Luo et al. |
| 5,431,929 | A | 7/1995 | Yatka et al. | 6,472,001 B1 | 10/2002 | Bunkers et al. |
| 5,431,930 | A | 7/1995 | Patel et al. | 6,475,469 B1 | 11/2002 | Montgomery |
| 5,437,876 | A | 8/1995 | Synosky et al. | 6,479,071 B2 | 11/2002 | Holme et al. |
| 5,437,878 | A | 8/1995 | Panhorst et al. | 6,485,739 B2 | 11/2002 | Luo et al. |
| 5,458,892 | A | 10/1995 | Yatka et al. | 6,491,540 B1 | 12/2002 | Barreca |
| 5,462,754 | A | 10/1995 | Synosky et al. | 6,506,366 B1 | 1/2003 | Leinen et al. |
| 5,474,787 | A | 12/1995 | Grey et al. | 6,528,102 B1 | 3/2003 | Coyle et al. |
| 5,480,668 | A | 1/1996 | Nofre et al. | 6,534,091 B1 | 3/2003 | Garces Garces et al. |
| 5,487,902 | A | 1/1996 | Andersen et al. | 6,555,145 B1 | 4/2003 | Cherukuri |
| 5,498,378 | A | 3/1996 | Tsaur et al. | 6,558,727 B2 | 5/2003 | Degady et al. |
| 5,498,429 | A | 3/1996 | Orlandi et al. | 6,562,382 B1 | 5/2003 | Corriveau et al. |
| 5,501,864 | A | 3/1996 | Song et al. | 6,602,518 B2 | 8/2003 | Seielstad et al. |
| 5,502,045 | A | 3/1996 | Miettinen et al. | 6,613,346 B2 | 9/2003 | Seielstad et al. |
| 5,503,823 | A | 4/1996 | Norfleet et al. | 6,623,266 B2 | 9/2003 | Jani et al. |
| 5,505,933 | A | 4/1996 | Norfleet et al. | 6,652,839 B2 | 11/2003 | Barreca |
| 5,523,098 | A | 6/1996 | Synosky et al. | 6,685,916 B1 | 2/2004 | Holme et al. |
| 5,525,360 | A | 6/1996 | Yatka et al. | 6,692,778 B2 | 2/2004 | Yatka et al. |
| 5,532,004 | A | 7/1996 | Bell et al. | 6,759,066 B2 | 7/2004 | Schnell et al. |
| 5,582,816 | A | 12/1996 | Mandanas et al. | 6,759,079 B2 | 7/2004 | Klug et al. |
| 5,589,160 | A | 12/1996 | Rice | 6,838,098 B2 | 1/2005 | Bunkers et al. |
| 5,589,194 | A | 12/1996 | Tsuei et al. | 6,869,614 B2 | 3/2005 | Barreca |
| 5,599,527 | A | 2/1997 | Hsu et al. | 6,949,264 B1 | 9/2005 | McGrew et al. |
| 5,603,920 | A | 2/1997 | Rice | 6,969,044 B2 | 11/2005 | Delzer et al. |
| 5,603,971 | A | 2/1997 | Porzio et al. | 7,022,352 B2 | 4/2006 | Castro et al. |
| 5,612,070 | A | 3/1997 | Yatka et al. | 7,025,999 B2 | 4/2006 | Johnson et al. |
| 5,618,517 | A | 4/1997 | Miskewitz | 2002/0004083 A1 | 1/2002 | Yatka et al. |
| 5,626,892 | A | 5/1997 | Kehoe et al. | 2002/0044968 A1 | 4/2002 | van Lengerich |
| 5,626,896 | A | 5/1997 | Moore et al. | 2002/0054859 A1 | 5/2002 | Alvarez Hernandez |
| 5,629,035 | A | 5/1997 | Miskewitz | 2002/0122842 A1 | 9/2002 | Seielstad et al. |
| 5,637,334 | A * | 6/1997 | Yatka et al. .................... 426/3 | 2002/0136812 A1 | 9/2002 | Degady et al. |
| 5,637,618 | A | 6/1997 | Kurtz et al. | 2002/0142059 A1 | 10/2002 | Jani et al. |
| 5,645,821 | A | 7/1997 | Libin | 2002/0150616 A1 | 10/2002 | Vandecruys |
| 5,651,958 | A | 7/1997 | Rice | 2003/0059501 A1 | 3/2003 | Rivier |
| 5,658,553 | A | 8/1997 | Rice | 2003/0059519 A1 | 3/2003 | Merkel et al. |
| 5,670,163 | A | 9/1997 | Cuca et al. | 2003/0077362 A1 | 4/2003 | Panhorst et al. |
| 5,676,932 | A | 10/1997 | Wason et al. | 2003/0091721 A1 | 5/2003 | Ohta et al. |
| 5,693,334 | A | 12/1997 | Miskewitz | 2003/0099740 A1 | 5/2003 | Colle et al. |
| 5,698,215 | A | 12/1997 | Kalili et al. | 2003/0113274 A1 | 6/2003 | Holme et al. |
| 5,702,687 | A | 12/1997 | Miskewitz | 2003/0138518 A1 | 7/2003 | Kiefer et al. |
| 5,713,738 | A | 2/1998 | Yarborough | 2003/0198713 A1 | 10/2003 | Clark et al. |
| 5,716,601 | A | 2/1998 | Rice | 2004/0037788 A1 | 2/2004 | Barreca |
| 5,736,175 | A | 4/1998 | Cea et al. | 2004/0037924 A1 | 2/2004 | Jani et al. |
| 5,756,074 | A | 5/1998 | Ascione et al. | 2004/0037925 A1 | 2/2004 | Jani et al. |
| 5,789,002 | A | 8/1998 | Duggan et al. | 2004/0126472 A1 | 7/2004 | Soldani |
| 5,800,848 | A | 9/1998 | Yatka et al. | 2004/0131751 A1 | 7/2004 | Dekker et al. |
| 5,824,291 | A | 10/1998 | Howard | 2004/0136928 A1 | 7/2004 | Holme et al. |

| | | |
|---|---|---|
| 2004/0146599 A1 | 7/2004 | Andersen et al. |
| 2004/0175489 A1 | 9/2004 | Clark et al. |
| 2004/0234459 A1 | 11/2004 | Faust et al. |
| 2004/0238993 A1 | 12/2004 | Benczedi et al. |
| 2005/0025721 A1 | 2/2005 | Holme et al. |
| 2005/0112236 A1 | 5/2005 | Boghani et al. |
| 2005/0214348 A1 | 9/2005 | Boghani et al. |
| 2005/0220867 A1 | 10/2005 | Boghani et al. |
| 2005/0260266 A1 | 11/2005 | Gebreselassie et al. |
| 2005/0260317 A1 | 11/2005 | Cotten et al. |
| 2005/0260329 A1 | 11/2005 | Yusuf et al. |
| 2006/0024354 A1 | 2/2006 | Barreca |
| 2006/0034897 A1 | 2/2006 | Boghani et al. |
| 2006/0193896 A1 | 8/2006 | Boghani et al. |
| 2006/0263413 A1 | 11/2006 | Boghani et al. |
| 2006/0263472 A1 | 11/2006 | Boghani et al. |
| 2006/0263473 A1 | 11/2006 | Boghani et al. |
| 2006/0263477 A1 | 11/2006 | Boghani et al. |
| 2006/0263478 A1 | 11/2006 | Boghani et al. |
| 2006/0263479 A1 | 11/2006 | Boghani et al. |
| 2006/0263480 A1 | 11/2006 | Boghani et al. |

FOREIGN PATENT DOCUMENTS

| | | |
|---|---|---|
| CA | 2238925 A1 | 11/1999 |
| DE | 19653100 | 7/1998 |
| EP | 0067595 A2 | 12/1982 |
| EP | 0086856 | 8/1983 |
| EP | 0132444 A1 | 2/1985 |
| EP | 0134120 A2 | 3/1985 |
| EP | 0252374 A1 | 1/1988 |
| EP | 0255260 A1 | 2/1988 |
| EP | 0434321 A2 | 6/1991 |
| EP | 0453397 A1 | 10/1991 |
| EP | 0608712 A1 | 8/1994 |
| EP | 0806151 | 11/1997 |
| EP | 0944331 | 9/1999 |
| EP | 1003475 | 5/2000 |
| EP | 1004594 | 5/2000 |
| EP | 1151673 | 11/2001 |
| EP | 1425976 | 6/2004 |
| EP | 1699297 A1 | 6/2005 |
| ES | 2080703 | 2/1996 |
| ES | 2190875 | 8/2003 |
| GB | 875763 | 8/1961 |
| GB | 1444024 | 7/1976 |
| GB | 2 177 587 | 1/1987 |
| GB | 2388581 A | 11/2003 |
| JP | 53-136566 | 11/1978 |
| WO | 8503414 A1 | 8/1985 |
| WO | 8800463 A1 | 1/1988 |
| WO | 8903170 A2 | 4/1989 |
| WO | 8911212 A2 | 11/1989 |
| WO | 9004926 A1 | 5/1990 |
| WO | 9007859 A2 | 7/1990 |
| WO | 9012512 A1 | 11/1990 |
| WO | 9013994 A2 | 11/1990 |
| WO | 9107104 A1 | 5/1991 |
| WO | 9202145 A1 | 2/1992 |
| WO | 9206160 A1 | 4/1992 |
| WO | WO 95/08925 | 4/1995 |
| WO | 9533034 A1 | 12/1995 |
| WO | 9608166 A1 | 3/1996 |
| WO | 9619193 A1 | 6/1996 |
| WO | 9702009 A1 | 1/1997 |
| WO | 9702011 A1 | 1/1997 |
| WO | WO 97/06695 | 2/1997 |
| WO | 9803076 A1 | 1/1998 |
| WO | 9815192 A1 | 4/1998 |
| WO | 9818339 A1 | 5/1998 |
| WO | 9823165 A1 | 6/1998 |
| WO | 9829088 A1 | 7/1998 |
| WO | 9915032 A1 | 4/1999 |
| WO | 9927798 A1 | 6/1999 |
| WO | 9943294 A1 | 9/1999 |
| WO | 9962354 A1 | 12/1999 |
| WO | 0001253 A1 | 1/2000 |
| WO | WO 00/06127 | 2/2000 |
| WO | WO 00/19977 | 4/2000 |
| WO | 0035296 A1 | 6/2000 |
| WO | 0035298 A1 | 6/2000 |
| WO | 0036924 A1 | 6/2000 |
| WO | 0069282 A1 | 11/2000 |
| WO | 0075274 A1 | 12/2000 |
| WO | WO 01/67884 | 9/2001 |
| WO | 0176384 A1 | 10/2001 |
| WO | 0200039 A2 | 1/2002 |
| WO | 0247489 A1 | 6/2002 |
| WO | 02055649 A1 | 7/2002 |
| WO | WO 02/056698 | 7/2002 |
| WO | 02076231 A1 | 10/2002 |
| WO | 02102362 A1 | 12/2002 |
| WO | 03063604 A1 | 8/2003 |
| WO | 20040006967 A1 | 1/2004 |
| WO | 2004077956 A2 | 9/2004 |
| WO | 2005016022 A1 | 2/2005 |
| WO | 2005051427 A1 | 6/2005 |
| WO | 2005079598 A1 | 9/2005 |
| WO | 2005087020 A1 | 9/2005 |
| WO | 2005091918 A2 | 10/2005 |
| WO | 2006003349 A1 | 1/2006 |
| WO | WO 2006/026298 | 3/2006 |
| WO | 2006079056 A1 | 7/2006 |
| WO | 2006086061 A1 | 8/2006 |

OTHER PUBLICATIONS

Rassing, M.R.; Chewing Gum as a Drug Delivery System: Advanced Drug Delivery Reviews, vol.13 (1994); No. 1-2, pp. 89-121.

Anonymous; "Caprol 3GO CAS No. 9007-48-1" XP002401201. Retrieved from the Internet: URL: http://www.abiteccorp.com/documents/3go-17__000.pdf> [retrieved on Sep. 28, 2006].

Anonymous; "HLB Systems" [Online] pp. 1-4, XP002401202. Retrieved from the Internet: URL: http://pharmcal.tripod.com/ch17.htm. [retrieved on Sep. 28, 2006].

Warner-Lambert Co., "Freshen-Up Peppermint Gum; Freshen-Up Fruit Gum", Aug. 23, 1982, Report No. 010075, http://productscan.com/search/fullrecord.cfm?frprt=9657.

Warner-Lambert Co., "Freshen-Up Fruit Gum", Feb. 4, 1980, Report No. 000339, http://www.productscan.com/search/fullrecord.cfm?frprt=336.

Warner-Lambert Co., "Chewels Sugarless Gum", Oct. 17, 1983, Report No. 018172, http://www.productscan.com/search/fullrecord.cfm?frprt=11085.

Lieberman, Herbert A., Lachman, Leon, "Pharmaceutical Dosage Forms", Tablets, vol. 1, pp. 386-399.

Jackson, E.B., "Cerelose—The Confectionery Industry's Natural Sweetener", Confectionery Manufacture and Marketing, vol. 28, Jun. 1991, No. 6, pp. 20, 22.

Jackson, E.B., "Cerelose—It's Role in Improved Confectionery", Confectionery Production, vol. 57, Jan. 1991, No. 1, pp. 79, 91.

Hintlian, F., "Filled Hard Candy"; Manufacturing Confectioner, vol. 75, Oct. 1995, No. 10, pp. 61-66.

Hume, J., "Notebook of a Practical Confectioner, Part 5-Continuation of Recipes for Centres", Confectionery Production, vol. 44, Jan. 1978, pp. 18, 20.

"Centres for High Boilings—Fruit Pulp, Caramel, Treacle or Powder", by Sweetmaker Confectionery Production, vol. 48, Aug. 1982, pp. 344-345.

Long, T., "Producing Centre Filled Hard Candy, Chewing Gum and Toffees", Candy and Snack Industry, vol. 145, Nov. 1980, No. 11, pp. 34, 37.

Gonze, M., "High Purity Erythritol for New Health Food Applications", ZFL, Internationale Zeitschrift Fur Lebensmittel-Tichnik, Marketing, Verpackung und Analytik, vol. 47, 1996, No. 11, pp. 66-68.

McIntyre, M., "Isomalt as an International Sugar Replacer", Food Ingredients and Analysis International, vol. 23, 2001, No. 6, pp. 35-36.

Deis, R., "Polyols in Confectionery", Manufacturing Confectioner, vol. 80, Oct. 2000, No. 10, pp. 53-57.

Hyvoenen, L., et al., "Food Technological Evaluation of Xylitol", Advances in Food Research, vol. 28, 1982, pp. 373-403.

Fritz, Douglas P., "Using Confectionery Equipment to Manufacture Chewing Gum", Manufacturing Confectioner, Nov. 2000, vol. 80, No. 11, pp. 45-48.

Rogers, P., "Helping the Medicine Go Down", vol. 166, 2001, No. 5, pp. 36-40.

"Product Parade", Candy Industry, Dec. 1991, p. 10.

Honpo, Senjakuame, "Orange Pure Sherbet Candy; Lemon Pure Sherbet Candy Manufacturer", International Product Alert, Nov. 1991, vol. 8, No. 21.

Shokuhin, Kanebo, "Ninja Club", International Product Alert, Dec. 1986, Report No. 044453.

"Mega Warheads Fruit Flavored Candy—Sour Lemon; Fruit Flavored Candy—Sour Apple; Fruit Flavored Candy—Hot Grape; Fruit Flavored Candy—Hot Cherry", by Foreign Candy Co., Inc., Product Alert, Jun. 1992, vol. 22, No. 23, Report No. 096490.

Matlow, Swizzels, "Stingers Taffy Bar—Lemon Raspberry; Fruit Punch", Nov. 1996, Report 120966.

"Calpis Candy—Assortment by Kanro", Japanscan, May 2000, Report 193961.

Kanro 10 Tsubu Hinyari Suika Nodoame 10 Candy by Kanro; Jul. 2002, Report 242381.

* cited by examiner

LIQUID-FILLED CHEWING GUM COMPOSITION

CROSS-REFERENCE TO RELATED APPLICATIONS

This application claims the benefit of U.S. Provisional Application No. 60/776,641, filed Feb. 24, 2006, and U.S. Provisional Application No. 60/683,634, filed May 23, 2005, and U.S. Provisional Application No. 60/650,758, filed Feb. 7, 2005, and is a continuation-in-part of U.S. patent application Ser. No. 11/210,954, filed on Aug. 24, 2005 now abandoned which is a continuation-in-part of U.S. patent application Ser. No. 10/925,822, filed Aug. 25, 2004 now U.S. Pat. No. 7,641,926, the contents all of which are incorporated herein by reference.

FIELD

The present invention includes compositions for a multi-layer liquid center-filled chewing gum, which maintains its liquidity for a substantial period of time. The individual gum pieces which include the compositions of the present invention include a liquid center which may include encapsulated components is surrounded by a gum region and optionally may be further coated with an external coating layer.

BACKGROUND

Liquid or center-filled gum and other confectionery products are in popular demand today. Typically, these products have a solid exterior portion and a soft or liquid-type center. The outer portion can be chewing gum or bubble gum of some type, while the liquid center portion can be a flavored material typically having a syrup-like consistency.

There are also products having a chewing gum or bubble gum core with a hard sugar or sugarless shell on the exterior. These products include, for example well-known pellet gum products sold under the brand names Chiclets®, Clorets®, and Dentyne-Ice®. Both liquid filled and coated gum products are in popular demand.

Conventional center-filled gum products having a liquid-filled center portion, a second layer of chewing gum or bubble gum material surrounding the liquid, and a hard outer shell or coating suffer from undesirable migration of the liquid into the gum base region. This results in a product which is not commercially acceptable. Loss of the center-fill not only impacts the initial organoleptic qualities of the gum, i.e., initial liquid "burst", but also may alter the physical appearance and overall shelf-life stability of the product.

One possible cause of the loss in liquidity of the center-fill is from moisture migration from the center-fill to the surrounding gum layer. This problem has most frequently been addressed by alteration of the center-fill composition.

Patents which included a specifically formulated center-fill composition to overcome the loss of liquidity problem include: U.S. Pat. No. 4,466,983 to Cifrese et al., wherein the center-fill included a hydrogenated starch hydrolysate; U.S. Pat. No. 4,250,196 to Friello which provides a center-fill which includes a combination of water and hydrogenated starch hydrolysate; and U.S. Pat. No. 4,252,829 to Terrevazzi ("Terrevazzi") which discloses a center-fill formulation including propylene glycol and sorbitol.

Other attempts to address the loss of liquidity have provided formulations which are intended to control the water content of the center-fill. Specifically, U.S. Pat. No. 4,683,138 to Glass et al provides a low-moisture liquid center-filled gum composition.

One common factor of the commercially available center-fill gum compositions is the size of the gum piece. On average, the weight of such chewing gum pieces is approximately five grams, such as those disclosed in Terrevazzi. Until the present invention, smaller center-filled gum pieces, i.e., less than three grams per piece, have not been made and thus the problems associated with center-filled gum have not existed with such smaller pieces. Smaller gum pieces, such as 2-3 gram sizes and configurations such as pellet gums, have more surface area relative to the liquid-fill and thus, maintaining liquidity of the center-fill and preventing migration into and through the surrounding gum region becomes more critical and challenging.

There is a need for new gum compositions, and particularly hard or crunchy coated gums, which provide the desired hard shell coating layer in combination with a center-fill gum, while resisting loss of liquidity. This is also a need for a center-filled gum, which retains its liquid center during manufacturing and during its shelf-life, and which can be made in a reduced piece-size without loss of the liquid-center fill properties. In addition, it would be desirable to have a center-fill chewing gum with prolonged sensory characteristics, such as sweetness and flavor intensity.

SUMMARY

In some embodiments, there are compositions and products containing liquid center-filled compositions which retain their liquidity over time and resist the migration of the liquid center-fill into the region surrounding the liquid center-fill and/or the solidification of the center-fill over time. The liquid fill of some embodiments may also include at least one modified release component.

In some embodiments there is a center-fill composition which resists loss of liquidity of the center-fill. In some embodiments, the composition may include a gum region surrounding a center-fill composition, the gum region including a gum base. The gum region may include a polyol composition having a water solubility of less than 72% by weight at 25° C. A hard shell coating which surrounds the gum region may also be included in the composition.

In some embodiments, a gum composition includes a center-fill composition, a gum layer surrounding said center-fill composition, and a coating surrounding said gum layer, wherein the gum layer includes a moisture barrier component including a polyol composition having a densely packed crystalline structure.

In some embodiments, a method of preparing a multi-layer center-fill gum includes the steps of:
 (a) extruding a liquid-filled rope of a chewing gum layer including a polyol which includes maltitol in an amount from about 30% to about 80% by weight of said gum layer;
 (b) sizing said rope;
 (c) feeding said rope into a tablet-forming mechanism;
 (d) cooling said rope;
 (e) forming individual pieces of said liquid-filled rope;
 (f) cooling said individual pieces; and
 (g) coating said individual pieces with a hard coating.

In some embodiments a gum composition may be prepared as follows:
 (a) extruding a liquid-filled rope of a chewing gum layer including a polyol which includes maltitol in an amount from about 30% to about 80% by weight of said gum layer;
 (b) sizing said rope;
 (c) feeding said rope into a tablet-forming mechanism;
 (d) cooling said rope;
 (e) forming individual pieces of said liquid-filled rope;

(f) cooling said individual pieces; and (g) coating said individual pieces with a hard coating.

In some embodiments a gum composition may include a center-fill composition and a gum layer surrounding said center-fill composition, wherein the gum layer includes a polyol composition including maltitol and a polyol selected from erythritol, xylitol, sorbitol, mannitol, isomalt, lactitol and combinations thereof, wherein said maltitol and said other polyol are in sufficient amounts to provide said composition with a water solubility of less than 72% at 25° C.

In some embodiments a composition may include maltitol and a polyol selected from erythritol, xylitol, sorbitol, mannitol, isomalt, lactitol and combinations thereof, wherein said maltitol and said other polyol are in sufficient amounts to provide said composition with a water solubility of less than 72% at 25° C.

In some embodiments a gum composition may include a center-fill layer including greater than zero up to about 10% by weight of said chewing gum composition, a gum layer including from about 55% to about 65% by weight of said chewing gum composition, and a coating including from about 25% to about 35% by weight of said chewing gum composition; wherein said gum composition further includes a gum piece of about three grams or less.

In some embodiments a gum composition may include a center-fill composition, a gum layer surrounding said center-fill composition, a coating layer surrounding said gum layer; wherein said center-fill composition has a water activity less than or equal to said gum layer. Alternatively, in some embodiments, the water activity of the center-fill may be greater than that of the surrounding gum layer.

In some embodiments a gum composition may include a center-fill composition, a gum layer surrounding said center-fill composition, a coating layer surrounding said gum layer; wherein said gum layer includes a polyol composition including maltitol; and said gum region further includes a gum base selected from styrene-butadiene copolymers (SBR), polyisobutylene, isobutylene-isoprene copolymers, polyethylene, polyvinyl acetate (PVA) and combinations thereof.

The gum compositions of some embodiments may include:

(a) a liquid-fill composition; and (b) a gum region surrounding said liquid-fill composition, said gum region comprising a gum base;

wherein:

said gum region further comprises a polyol composition having a water solubility of less than 72% by weight at 25° C.; said polyol composition comprising at least one polyol. The gum region will have a first water activity and the liquid fill composition has a second water activity. Depending on the desired characteristics of the gum composition, the first water activity may be greater than, approximately equal to, or less than the second water activity.

DETAILED DESCRIPTION

As used herein the transitional term "comprising," (also "comprises," etc.) which is synonymous with "including," "containing," or "characterized by," is inclusive or open-ended and does not exclude additional, unrecited elements or method steps, regardless of its use in the preamble or the body of a claim.

As used herein, the terms "bubble gum" and "chewing gum" are used interchangeably and are both meant to include any gum compositions.

As used herein, the terms "first region," "liquid-fill," and "center-fill" are used interchangeably and refer to the innermost region of the compositions. The term "center-fill" does not imply symmetry of a gum piece, only that the "center-fill" is within another region of the gum piece. In some embodiments, more than one center-fill or liquid fill may be present.

As used herein, the terms "second region" and "gum region" are used interchangeably to refer to a region of the compositions that may be adjacent to or at least partially surrounding the center-fill, or innermost, region.

As used herein, the terms "third region" and "coating" are used interchangeably to refer to the outermost region of the compositions.

As used herein, the term "liquid" refers to compositions which will readily flow or maintain fluid properties at room temperature and pressure.

As used herein, the term "ingredient" and the term "component" are used interchangeably to describe any additive, fixing, substance, material, agent, active, element, or part that may be included in the gum compositions of some embodiments.

Embodiments described herein provide a multi-component composition which includes at least one liquid fill region and a gum region which includes a gum base. The individual gum piece may also include an outer gum coating or shell, which typically provides a crunchiness to the piece when initially chewed. The individual gum pieces may form a variety of shapes including pellet, tablet, ball, pillow, chunk, stick and slab, among others.

In some embodiments, the components of the composition may be in different configurations depending on the desired shape of the total gum composition. The liquid-fill area or areas may be in either a concentric configuration with respect to the gum region or in a layered configuration. A concentric configuration may be acceptable for a ball, pillow or pellet shape, while a layered configuration may be more suitable for a slab or a stick shape.

The center-fill gum composition and other compositions described herein may be formed by any technique known in the art which includes the method described by U.S. Pat. No. 6,280,780 to Degady et al. ("Degady") which is herein incorporated by reference in its entirety. Degady describes an apparatus and method for forming center-filled gum pellets. The method includes first extruding a liquid-filled rope of a chewing gum layer and passing the rope through a sizing mechanism including a series of pairs of pulley-shaped roller members. The roller members "size" the rope or strand of gum material such that it leaves the series of rollers with the desired size and shape for entering a tablet-forming mechanism.

The rope is then led into a tablet-forming mechanism including a pair of rotating chain die members which are endless chain mechanisms and both rotate at the same speed by a motor and gear mechanism. Each of the chain mechanisms include a plurality of open curved die groove members which mate and form die cavities in which the pieces of gum material (pellets or tablets) are formed. While Degady is limited to the formation of pellet or tablet shaped pieces, the gum pieces may be of other shapes as described above. The shape of the die groove members may be altered to provided any desired shape.

The gum may optionally be passed through a cooling tunnel either before entering the tablet-forming mechanism, after exiting the tablet-forming mechanism or both. Cooling of the rope prior to entering the tablet-forming mechanism may be beneficial to prevent rebound of the individual pieces and thus an increase in productivity.

The cooled pieces of gum material are then fed into a storage container for conditioning and further processing. At this point, the cooled pieces of gum material could also be fed directly into a coating tunnel mechanism, such as a rotating tunnel mechanism.

Whether the pieces of formed gum material are first stored, transported in a storage container, or fed directly into a coating tunnel or mechanism, the individual pieces of gum material may subsequently be subjected to a conventional sugar or sugarless coating process in order to form a hard exterior shell on the liquid-filled gum material. Coating processes or mechanisms of this type are known. In general, the coating is applied in numerous thin layers of material in order to form an appropriate uniform coated and finished quality surface on the gum products. The hard coating material, which may include sugar, maltitol, sorbitol or any other polyol, including those described herein, and optionally flavoring, is sprayed onto the pellets of gum material as they pass through a coating mechanism or a coating tunnel and are tumbled and rotated therein. In addition, conditioned air is circulated or forced into the coating tunnel or mechanism in order to dry each of the successive coating layers on the formed products.

The coating composition may range from about 2% to about 60%, more specifically, about 20% to about 40% by weight of an individual gum piece which includes a center-fill, a gum region and a coating; even more specifically, from 25% to 35% and still more specifically around 30%. The coating may include sugar or polyol such as maltitol as the primary component, but may also include flavors, colors, etc. as described below in the discussion of the gum region.

The center-filled chewing gum provides resistance from moisture migration from the center-fill to the gum region by modifying both the polyol composition and gum base composition present in the gum region. This is in contrast to the aforementioned conventional approaches and which have not fully addressed the problems associated with manufacturing and shelf-stability of liquid center-filled products.

In some embodiments of the invention, there are included smaller piece-sizes. For example, the smallest conventional piece sizes of commercially available gum are generally in pellet forms. These piece-sizes currently range from about 5-7 grams. In some embodiments liquid filled products have been made using substantially smaller piece sizes, i.e., 50-60% smaller by weight, without loss of liquidity or migration of liquid into the gum region or beyond into the coating. Some inventive embodiments provide a liquid-filled gum piece size range which is greater than about 0.5 grams, more specifically greater than 1.5 grams up to about 3 grams, including the addition of an outer hard coating shell. In addition, in some embodiments a gum piece may include a center-fill, a gum region including a gum base and an outer coating. Such gum pieces may be about 2.2 grams total weight per piece.

It has been discovered that pieces of such small size and particularly with gum shapes or configurations having proportionally more liquid-fill surface area as compared to the weight to the liquid per se, have a greater tendency to lose the liquidity of the center due to the interaction of different factors. While not limited to a single theory, these factors include the small amount of liquid-fill in comparison to the surface of the gum region in which the liquid-fill is in direct contact, the interaction of the type of elastomer with the center-fill (i.e. SBR versus non-SBR), the compatibility of the gum region components with the liquid-fill components, and the potential capillary action of the polyol used in the gum region. For example, the structure of sorbitol, which is customarily used in gum formulations in the United States, does not provide a tightly packed crystalline structure, giving almost a sponge-like appearance. Therefore, in order to provide a center-filled gum piece of less than about 3 grams, the present invention alters the gum and gum base to include a polyol composition having a dense, tightly packed crystalline structure which is unlike the sponge-like structure in conventional sorbitol gum region formulations, in order to provide a center-filled gum piece which resists loss of liquidity.

For other useful center-fill gum compositions and/or components for use therein, see the following co-pending commonly owned patent applications, the contents of which are incorporated herein by reference in their entirety: U.S. Application No. 60/776,748, filed on Feb. 24, 2006, entitled "Liquid-Filled Chewing Gum Composition"; U.S. Application No. 60/776,642, filed on Feb. 24, 2006, entitled "Liquid-Filled Chewing Gum Composition"; U.S. Application No. 60/776,637, filed on Feb. 24, 2006, entitled "Center-Filled Chewing Gum Composition"; U.S. Application No. 60/776,508, filed on Feb. 24, 2006, entitled "Center-Filled Chewing Gum with Barrier Layer"; U.S. Application No. 60/776,382, filed on Feb. 24, 2006, entitled "Center-Filled Chewing Gum Composition"; and U.S. Application No. 60/776,699, filed on Feb. 24, 2006, entitled "Multi-Modality Chewing Gum Composition".

Gum Region

The gum region, also referred to as the second region in the claims, provides a liquid barrier to surround and prevent the liquid-fill from migration and premature release. One or more cavities can be present in the gum region to house the liquid center-fill. The shape of the cavity will be largely dictated by the final configuration of the chewing gum piece. By selection of the ratio of the desired cavity surface area to the liquid-fill weight, optimization of the reduction in potential liquid-fill migration in to the gum region area can be achieved. This is particularly useful when the gum piece size is desired to be substantially smaller than conventional commercialized gum pieces. In particular, liquid-filled pellet gums having sizes of 2 to 3 grams by weight of the entire gum piece have been successfully made. However, smaller gum pieces, as small as about 0.5 grams are contemplated.

In some embodiments, the gum region may have a non-uniform thickness. In particular, the gum region in layered configuration embodiments may be thinner on the ends than on the sides of the gum piece.

As discussed earlier, some embodiments may incorporate a modified polyol composition including at least one polyol incorporated into the gum region as discussed herein. Moreover, the selection of a non-SBR gum base in the gum region, in combination with the modified polyol composition has been found to be particularly useful in achieving stable liquid-filled chewing gum compositions.

The gum region may include a gum base. The gum base may include any component known in the chewing gum art. For example, the gum region may include elastomers, bulking agents, waxes, elastomer solvents, emulsifiers, plasticizers, fillers and mixtures thereof. Wherein the gum region is included in a three component composition including a center-fill, a gum region and a coating layer, the gum region may comprise from about 40% to about 97%, more specifically from about 55% to about 65% by weight of the chewing gum piece, even more specifically about 62%.

The gum region may also include a specific polyol composition including at least one polyol which is from about 30% to about 80% by weight of said gum region, and specifically from 50% to about 60%. The polyol composition may include any polyol known in the art including, but not limited to maltitol, sorbitol, erythritol, xylitol, mannitol, isomalt, lactitol and combinations thereof. Lycasin® which is a hydrogenated starch hydrolysate and may include sorbitol and maltitol, may also be used.

The amount of the polyol composition or combination of polyols used in the gum region will depend on many factors including the type of elastomers used in the gum base and the particular polyols used. For example, wherein the total amount of the polyol composition is in the range of about 40% to about 65% based on the weight of the gum region, the amount of maltitol may be from about 40% to about 60% in addition to an amount of sorbitol from about 0 up to about 10%, more specifically, an amount of maltitol may be from about 45% to about 55% in combination with sorbitol from about 5% to about 10%.

Maltitol is a sweet, water-soluble sugar alcohol useful as a bulking agent in the preparation of beverages and foodstuffs and is more fully described in U.S. Pat. No. 3,708,396, which disclosure is incorporated herein by reference. Maltitol is made by hydrogenation of maltose which is the most common reducing disaccharide and is found in starch and other natural products.

The polyol composition which may include one or more different polyols which may be derived from a genetically modified organism ("GMO") or GMO free source. For example, the maltitol may be GMO free maltitol or provided by a hydrogenated starch hydrolysate. For the purposes of this invention, the term "GMO-free" refers to a composition that has been derived from process in which genetically modified organisms are not utilized.

Some embodiments may include a polyol composition including maltitol which has a greater crystalline density than sorbitol. Other polyols which exhibit a greater crystalline density than sorbitol include xylitol and mannitol. The greater the crystalline density of the polyol the better the barrier properties are. Specifically, a polyol of a greater crystalline density results in a structure with fewer pores, which provides less surface area for potential moisture or fluid migration into the gum region from the liquid-fill.

Since sugar (sucrose) is generally accepted as the baseline for comparison of sweeteners, including polyols, the polyol composition of some embodiments is described similarly. For example, the polyol composition of may have a sweetness of greater than about 50% of the sweetness of sucrose. More specifically, the polyol composition of the present invention may have sweetness greater than about 70% the sweetness of sucrose.

The polyol composition of some embodiments may also be described in terms of the solubility of the composition. The solubility of the polyol composition will depend on the solubility of the one or more polyols included in the composition. For example, if maltitol is the only polyol included in the polyol composition, the solubility of the polyol composition in water will be about 60% at 25° C.

Blends of different polyols may also be used. Examples of useful polyols are erythritol, lactitol, xylitol, mannitol, maltitol, sorbitol, isomalt, and combinations thereof. Where a blend of more than one polyol is used, the solubility of the polyol composition will depend on a weighted ratio of the amount of the polyol in the blend and the solubility of each individual polyol which is included. For example, a combination of two or more polyols may have a water solubility range of about 60% to about 72%, if it includes maltitol, which has a water solubility of 60% at 25° C., and sorbitol, which has a water solubility of about 72% at 25° C. Other suitable solubility ranges, which depend on the included two or more polyols include the ranges from about 40% to about 60% at 25° C. and 55% to 65% at 25° C. The range of the solubility may vary, depending on the particular polyols used. Alternative suitable solubilities of a polyol combination include those having a solubility less than sucrose (i.e., less than 67%).

The polyol composition may include particles of a variety of sizes. Specifically, the average particle size of the polyol composition ranges from about 30 microns to about 600 microns, more specifically from about 30 microns to about 200 microns.

The amount of the gum base which is present in the gum region may also vary. The gum base may be included in the gum region in an amount from about 25% to about 45% by weight of the gum region. A more specific range of gum base is from about 28% to about 42% by weight of the gum region. Even more specifically, the range may be from about 28% to about 35% or from about 28% to about 30%.

The elastomers (rubbers) employed in the gum base will vary greatly depending upon various factors such as the type of gum base desired, the consistency of gum composition desired and the other components used in the composition to make the final chewing gum product. The elastomer may be any water-insoluble polymer known in the art, and includes those gum polymers utilized for chewing gums and bubble gums. Illustrative examples of suitable polymers in gum bases include both natural and synthetic elastomers. For example, those polymers which are suitable in gum base compositions include, without limitation, natural substances (of vegetable origin) such as chicle, natural rubber, crown gum, nispero, rosidinha, jelutong, perillo, niger gutta, tunu, balata, guttapercha, lechi capsi, sorva, gutta kay, and the like, and combinations thereof. Examples of synthetic elastomers include, without limitation, styrene-butadiene copolymers (SBR), polyisobutylene, isobutylene-isoprene copolymers, polyethylene, polyvinyl acetate and the like, and combinations thereof.

Additional useful polymers include: crosslinked polyvinyl pyrrolidone, polymethylmethacrylate; copolymers of lactic acid, polyhydroxyalkanoates, plasticized ethylcellulose, polyvinyl acetatephthalate and combinations thereof.

The amount of elastomer employed in the gum base may vary depending upon various factors such as the type of gum base used, the consistency of the gum composition desired and the other components used in the composition to make the final chewing gum product. In general, the elastomer will be present in the gum base in an amount from about 10% to about 60% by weight of the gum region, desirably from about 35% to about 40% by weight.

In some embodiments, the gum base may include wax. It softens the polymeric elastomer mixture and improves the elasticity of the gum base. When present, the waxes employed will have a melting point below about 60° C., and preferably between about 45° C. and about 55° C. The low melting wax may be a paraffin wax. The wax may be present in the gum base in an amount from about 6% to about 10%, and preferably from about 7% to about 9.5%, by weight of the gum base.

In addition to the low melting point waxes, waxes having a higher melting point may be used in the gum base in amounts up to about 5%, by weight of the gum base. Such high melting waxes include beeswax, vegetable wax, candelilla wax, carnuba wax, most petroleum waxes, and the like, and mixtures thereof.

In addition to the components set out above, the gum base may include a variety of other ingredients, such as components selected from elastomer solvents, emulsifiers, plasticizers, fillers, and mixtures thereof.

The gum base may contain elastomer solvents to aid in softening the elastomer component. Such elastomer solvents may include those elastomer solvents known in the art, for example, terpinene resins such as polymers of alpha-pinene or beta-pinene, methyl, glycerol and pentaerythritol esters of rosins and modified rosins and gums such as hydrogenated, dimerized and polymerized rosins, and mixtures thereof. Examples of elastomer solvents suitable for use herein may include the pentaerythritol ester of partially hydrogenated wood and gum rosin, the pentaerythritol ester of wood and gum rosin, the glycerol ester of wood rosin, the glycerol ester of partially dimerized wood and gum rosin, the glycerol ester of polymerized wood and gum rosin, the glycerol ester of tall oil rosin, the glycerol ester of wood and gum rosin and the partially hydrogenated wood and gum rosin and the partially hydrogenated methyl ester of wood and rosin, and the like, and mixtures thereof. The elastomer solvent may be employed in the gum base in amounts from about 2% to about 15%, and preferably from about 7% to about 11%, by weight of the gum base.

The gum base may also include emulsifiers which aid in dispersing the immiscible components into a single stable system. The emulsifiers useful in this invention include glyceryl monostearate, lecithin, fatty acid monoglycerides, diglycerides, propylene glycol monostearate, and the like, and mixtures thereof. The emulsifier may be employed in amounts from about 2% to about 15%, and more specifically, from about 7% to about 11%, by weight of the gum base.

The gum base may also include plasticizers or softeners to provide a variety of desirable textures and consistency properties. Because of the low molecular weight of these ingredients, the plasticizers and softeners are able to penetrate the fundamental structure of the gum base making it plastic and less viscous. Useful plasticizers and softeners include lanolin, palmitic acid, oleic acid, stearic acid, sodium stearate, potassium stearate, glyceryl triacetate, glyceryl lecithin, glyceryl monostearate, propylene glycol monostearate, acetylated monoglyceride, glycerine, and the like, and mixtures thereof. Waxes, for example, natural and synthetic waxes, hydrogenated vegetable oils, petroleum waxes such as polyurethane waxes, polyethylene waxes, paraffin waxes, microcrystalline waxes, fatty waxes, sorbitan monostearate, tallow, propylene glycol, mixtures thereof, and the like, may also be incorporated into the gum base. The plasticizers and softeners are generally employed in the gum base in amounts up to about 20% by weight of the gum base, and more specifically in amounts from about 9% to about 17%, by weight of the gum base.

Plasticizers also include are the hydrogenated vegetable oils and include soybean oil and cottonseed oil which may be employed alone or in combination. These plasticizers provide the gum base with good texture and soft chew characteristics. These plasticizers and softeners are generally employed in amounts from about 5% to about 14%, and more specifically in amounts from about 5% to about 13.5%, by weight of the gum base.

Anhydrous glycerin may also be employed as a softening agent, such as the commercially available United States Pharmacopeia (USP) grade. Glycerin is a syrupy liquid with a sweet warm taste and has a sweetness of about 60% of that of cane sugar. Because glycerin is hygroscopic, the anhydrous glycerin may be maintained under anhydrous conditions throughout the preparation of the chewing gum composition.

In some embodiments, the gum base of this invention may also include effective amounts of bulking agents such as mineral adjuvants which may serve as fillers and textural agents. Useful mineral adjuvants include calcium carbonate, magnesium carbonate, alumina, aluminum hydroxide, aluminum silicate, talc, tricalcium phosphate, dicalcium phosphate, calcium sulfate and the like, and mixtures thereof. These fillers or adjuvants may be used in the gum base compositions in various amounts. The amount of filler, may be present in an amount from about zero to about 40%, and more specifically from about zero to about 30%, by weight of the gum base. In some embodiments, the amount of filler will be from about zero to about 15%, more specifically from about 3% to about 11%.

A variety of traditional ingredients may be optionally included in the gum base in effective amounts such as coloring agents, antioxidants, preservatives, flavoring agents, and the like. For example, titanium dioxide and other dyes suitable for food, drug and cosmetic applications, known as F. D. & C. dyes, may be utilized. An anti-oxidant such as butylated hydroxytoluene (BHT), butylated hydroxyanisole (BHA), propyl gallate, and mixtures thereof, may also be included. Other conventional chewing gum additives known to one having ordinary skill in the chewing gum art may also be used in the gum base. A variety of components which may be added to the gum region, or alternatively to the liquid-fill region or coating are described in greater detail in the section entitled "Additional Components" hereinbelow.

Some embodiments extend to methods of making the center-fill gum compositions. The manner in which the gum base components are mixed is not critical and is performed using standard techniques and apparatus known to those skilled in the art. In a typical method, an elastomer is admixed with an elastomer solvent and/or a plasticizer and/or an emulsifier and agitated for a period of from 1 to 30 minutes. The remaining ingredients, such as the low melting point wax, are then admixed, either in bulk or incrementally, while the gum base mixture is blended again for 1 to 30 minutes.

The gum composition may include amounts of conventional additives selected from the group consisting of sweetening agents (sweeteners), plasticizers, softeners, emulsifiers, waxes, fillers, bulking agents (carriers, extenders, bulk sweeteners), mineral adjuvants, flavoring agents (flavors, flavorings), coloring agents (colorants, colorings), antioxidants, acidulants, thickeners, medicaments, and the like, and mixtures thereof. Some of these additives may serve more than one purpose. For example, in sugarless gum compositions, a sweetener, such as maltitol or other sugar alcohol, may also function as a bulking agent.

The plasticizers, softening agents, mineral adjuvants, waxes and antioxidants discussed above, as being suitable for use in the gum base, may also be used in the chewing gum composition. Examples of other conventional additives which may be used include emulsifiers, such as lecithin and glyceryl monostearate, thickeners, used alone or in combination with other softeners, such as methyl cellulose, alginates, carrageenan, xanthan gum, gelatin, carob, tragacanth, locust bean gum, pectin, alginates, galactomannans such as guar gum, carob bean gum, glucomannan, gelatin, starch, starch derivatives, dextrins and cellulose derivatives such as carboxy methyl cellulose, acidulants such as malic acid, adipic acid, citric acid, tartaric acid, fumaric acid, and mixtures thereof, and fillers, such as those discussed above under the category of mineral adjuvants.

In some embodiments, the gum region may also contain a bulking agent. Suitable bulking agents may be water-soluble and include sweetening agents selected from, but not limited to, monosaccharides, disaccharides, polysaccharides, sugar alcohols, and mixtures thereof; randomly bonded glucose polymers such as those polymers distributed under the tradename Litesse™ which is the brand name for polydextrose and is manufactured by Danisco Sweeteners, Ltd. of 41-51 Brighton Road, Redhill, Surrey, RH1 6YS, United Kingdom; isomalt (a racemic mixture of alpha-D-glucopyranosyl-1,6-mannitol and alpha-D-glucopyranosyl-1,6-sorbitol manufactured under the tradename PALATINIT by Palatinit Sussungsmittel GmbH of Gotlieb-Daimler-Strause 12 a, 68165 Mannheim, Germany); maltodextrins; hydrogenated starch hydrolysates; hydrogenated hexoses; hydrogenated disaccharides; minerals, such as calcium carbonate, talc, titanium dioxide, dicalcium phosphate; celluloses; and mixtures thereof.

Suitable sugar bulking agents include monosaccharides, disaccharides and polysaccharides such as xylose, ribulose, glucose (dextrose), mannose, galactose, fructose (levulose), sucrose (sugar), maltose, invert sugar, partially hydrolyzed starch and corn syrup solids, and mixtures thereof.

Suitable sugar alcohol bulking agents include sorbitol, xylitol, mannitol, galactitol, maltitol, erythritol, isomalt and mixtures thereof.

Suitable hydrogenated starch hydrolysates include those disclosed in U.S. Pat. No. 4,279,931 and various hydrogenated glucose syrups and/or powders which contain sorbitol, maltitol, hydrogenated disaccharides, hydrogenated higher polysaccharides, or mixtures thereof. Hydrogenated starch hydrolysates are primarily prepared by the controlled catalytic hydrogenation of corn syrups. The resulting hydrogenated starch hydrolysates are mixtures of monomeric, dimeric, and polymeric saccharides. The ratios of these different saccharides give different hydrogenated starch hydrolysates different properties. Mixtures of hydrogenated starch hydrolysates, such as LYCASIN®, a commercially available product manufactured by Roquette Freres of France, and HYSTAR®, a commercially available product manufactured by SPI Polyols, Inc. of New Castle, Del., are also useful.

The sweetening agents which may be included in the compositions of some embodiments may be any of a variety of sweeteners known in the art. These are described in more detail in the "Additional Components" section herein below and may be used in many distinct physical forms well-known in the art to provide an initial burst of sweetness and/or a prolonged sensation of sweetness. Without being limited thereto, such physical forms include free forms, such as spray dried, powdered, beaded forms, encapsulated forms, and mixtures thereof.

Desirably, the sweetener is a high intensity sweetener such as aspartame, neotame, sucralose, and acesulfame potassium (Ace-K). In general, an effective amount of sweetener may be utilized to provide the level of sweetness desired, and this amount may vary with the sweetener selected. In some embodiments the amount of sweetener may be present in amounts from about 0.001% to about 3%, by weight of the gum composition, depending upon the sweetener or combination of sweeteners used. The exact range of amounts for each type of sweetener may be selected by those skilled in the art.

Coloring agents may be used in amounts effective to produce the desired color. The coloring agents may include pigments which may be incorporated in amounts up to about 6%, by weight of the gum composition. For example, titanium dioxide may be incorporated in amounts up to about 2%, and preferably less than about 1%, by weight of the gum composition. The colorants may also include natural food colors and dyes suitable for food, drug and cosmetic applications. These colorants are known as F.D.& C. dyes and lakes. The materials acceptable for the foregoing uses are preferably water-soluble. Illustrative nonlimiting examples include the indigoid dye known as F.D.& C. Blue No. 2, which is the disodium salt of 5,5-indigotindisulfonic acid. Similarly, the dye known as F.D.& C. Green No. 1 comprises a triphenylmethane dye and is the monosodium salt of 4-[4-(N-ethyl-p-sulfoniumbenzylamino)diphenylmethylene]-[1-(N-ethyl-N-p-sulfoniumbenzyl)-delta-2,5-cyclohexadieneimine]. A full recitation of all F.D.& C. colorants and their corresponding chemical structures may be found in the Kirk-Othmer Encyclopedia of Chemical Technology, 3rd Edition, in volume 5 at pages 857-884, which text is incorporated herein by reference. Additional coloring components are described in the "Additional Components" section hereinbelow.

Suitable oils and fats usable in gum compositions include partially hydrogenated vegetable or animal fats, such as coconut oil, palm kernel oil, beef tallow, and lard, among others. These ingredients when used are generally present in amounts up to about 7%, and preferably up to about 3.5%, by weight of the gum composition.

Some embodiments may include a method for preparing the improved chewing gum compositions for the gum region, including both chewing gum and bubble gum compositions. The chewing gum compositions may be prepared using standard techniques and equipment known to those skilled in the art. The apparatus useful in accordance with some embodiments comprises mixing and heating apparatus well known in the chewing gum manufacturing arts, and therefore the selection of the specific apparatus will be apparent to the artisan.

With respect to the center-fill layer, the gum region may have a water activity greater than or equal to the water activity of the center-fill composition. However, in compositions wherein a greater water activity is desired in the center or liquid-fill, the water activity of the center-fill composition may be greater than that of the gum region. A higher moisture content will aid in hydration of thickeners like xanthan gum and cellulose when present in the center-fill.

The gum region may have a total moisture content of about 14% by weight of the gum region and more specifically may have a total moisture content from about 9% to about 14% by weight, with a free moisture content of less than about 5%. The center-fill further may have total moisture content including free and bound moisture from about zero up to about 35% by weight of said center-fill, specifically about 22%.

Liquid-Fill Composition

The center-fill or liquid-fill composition may include any components known in the art for incorporation with a center-fill composition. This may include glycerin in addition to one or more other polyols in amounts greater than zero up to about 20%, more specifically, up to about 10% by weight of the total chewing gum composition, i.e., including a center-fill composition, a gum region and a coating. More desirably, the center-fill is approximately 8% by weight of the total chewing gum composition. The other polyol component includes desirably maltitol, sorbitol, xylitol, or a combination thereof.

In some embodiments, the center-fill region may be substantially or completely filled with the liquid center-fill composition. In some other embodiments, the center-fill region may be only partially filled with the liquid center-fill composition.

In some embodiments, the center-fill region may include two or more center-fill compositions. The two or more center-fill compositions may be the same or different forms. For example, some embodiments may contain a mixture of two or more distinct liquids, which may or may not be miscible. Similarly, some embodiments may contain two or more distinct solids, semi-solids or gasses in the center-fill region. Mixtures of different center-fill forms also may be included in some embodiments. For example, a liquid and a solid may be included in the center-fill region. In some embodiments where two or more liquids are employed in the center-fill region these may be included in the same or different amounts and may have similar or distinct characteristics. More specifically, in some embodiments, the two or more center-fill compositions may differ in a variety of characteristics, such as, viscosity, color, flavor, taste, sensation, ingredient components, functional components, sweeteners, or the like.

In some embodiments, the center-fill composition also may include non-liquid components, such as, for example, flavor beads, fruit particles, nut particles, flavor particles, gelatin portions, and the like.

The liquid centers may contain those traditional ingredients well known in the chewing gum and confectionery arts, such as flavoring agents, sweetening agents, and the like, and mixtures thereof, as described above. In addition to confectionery additives, the liquid centers may also contain pharmaceutical additives such as medicaments, breath fresheners, vitamins, minerals, caffeine, fruit juices, and the like, and mixtures thereof. The confectionery and pharmaceutical agents may be used in many distinct physical forms well known in the art to provide an initial burst of sweetness and flavor and/or therapeutic activity or a prolonged sensation of sweetness and flavor and/or therapeutic activity. Without being limited thereto, such physical forms include free forms, such as spray dried, powdered, and beaded forms, and encapsulated forms, and mixtures thereof. Illustrative, but not limiting, examples of liquid centers suitable for use in some embodiments include those centers disclosed in U.S. Pat. Nos. 3,894,154, 4,156,740, 4,157,402, 4,316,915, and 4,466,983, which disclosures are incorporated herein by reference. Specific examples of suitable additional components include taurine, guarana, vitamins, Actizol™, chlorophyll, Recaldent™ tooth whitening technology, and Retsyn™.

The center-fill composition also may include a natural or synthetic gum such as carboxymethylcellulose, pectin, propylene glycol aginate, agar and gum tragacanth. These compositions serve to increase viscosity by reducing the amount of free water in the composition. The viscosity of the center-fill may range from about 300 cp to about 6,000 cp at 25° C. In liquid-fill compositions which have a greater water activity than the surrounding gum region, the viscosity may range from about 3,000 cp to about 6,000 cp at 25° C.

Xanthan gum may also be used to increase the viscosity of the center-fill composition. Increasing viscosity of the liquid also helps prevent the liquid from leaking through the gum piece. Xanthan gum is available under the tradename Keltrol® from Signet Chemical Corporation.

Some embodiments extend to methods of making the improved center-filled chewing gum compositions. The improved compositions may be prepared using standard techniques and equipment known to those skilled in the art. The apparatus useful in accordance with the embodiments described herein comprises mixing and heating apparatus well known in the chewing gum manufacturing arts, and therefore the selection of the specific apparatus will be apparent to the artisan Such methods and apparatus are disclosed, for example, in U.S. Pat. Nos. 3,806,290 and 3,857,963, which disclosures are incorporated herein by reference Coating Composition The coating composition, when included in the center-fill compositions, may be applied by any method known in the art including the method described above. The coating composition may be present in an amount from about 2% to about 60%, more specifically from about 25% to about 35% by weight of the total center-filled gum piece, even more specifically about 30% by weight of the gum piece.

The outer coating may be hard or crunchy. Typically, the outer coating may include sorbitol, maltitol, xylitol, erythritol, isomalt, and other crystallizable polyols; sucrose may also be used. Furthermore the coating may include several opaque layers, such that the chewing gum composition is not visible through the coating itself, which can optionally be covered with a further one or more transparent layers for aesthetic, textural and protective purposes. The outer coating may also contain small amounts of water and gum arabic. The coating can be further coated with wax. The coating may be applied in a conventional manner by successive applications of a coating solution, with drying in between each coat. As the coating dries it usually becomes opaque and is usually white, though other colorants may be added. A polyol coating can be further coated with wax. The coating can further include colored flakes or speckles. If the composition comprises a coating, it is possible that one or more oral care actives can be dispersed throughout the coating. This is especially preferred if one or more oral care actives is incompatible in a single phase composition with another of the actives. Flavors may also be added to yield unique product characteristics.

The coating may also be formulated to assist with increasing the thermal stability of the gum piece and preventing leaking of the liquid fill. In some embodiments, the coating may include a gelatin composition. The gelatin composition may be added as a 40% by weight solution and may be present in the coating composition from about 5% to about 10% by weight of the coating composition, and more specifically about 7% to about 8%. The gel strength of the gelatin may be from about 130 bloom to about 250 bloom.

Other materials may be added to the coating to achieve desired properties. These materials may include without limitations, cellulosics such as carboxymethyl cellulose, gelatin, pullulan, alginate, starch, carrageenan, xanthan gum, gum arabic and polyvinyl acetate (PVA).

The coating composition may also include a pre-coating which is added to the individual gum pieces prior to an optional hard coating. The pre-coating may include an application of polyvinyl acetate (PVA). This may be applied as a solution of PVA in a solvent, such as ethyl alcohol. When an outer hard coating is desired, the PVA application may be approximately 3% to 4% by weight of the total coating or about 1% of the total weight of the gum piece (including a liquid-fill, gum region and hard coating).

Additional Components

Additional additives, such as physiological cooling agents, throat-soothing agents, spices, warming agents, tooth-whitening agents, breath-freshening agents, vitamins minerals, caffeine, drugs and other actives may also be included in any or all portions or regions of the chewing gum composition. Such components may be used in amounts sufficient to achieve their intended effects.

Any of the additional components discussed herein may be added to any region of the center-fill chewing gum composition in their modified release form and/or without modified release (sometimes referred to as "free" components). In some embodiments, for instance, a single component may be added to the center-fill chewing gum in its modified release form and free form. The modified release component and free component may be included together in the same region of the center-fill chewing gum or, in some embodiments, the two components may be included in different regions of the gum.

In some other embodiments, for instance, two different components that provide the same functionality, e.g., two different flavors, sweeteners, tastes, sensations, or the like, may be included in a center-fill chewing gum. In some embodiments, both components may have modified release properties. Alternatively, in some embodiments, one of the components may be modified release, whereas the other component may be free. The two components may be included in the same or different regions of the center-fill chewing gum.

Types of individual ingredients for which optional managed release from a chewing gum composition may be desired, include, but are not limited to sweeteners, flavors, actives, effervescing ingredients, appetite suppressors, breath fresheners, dental care ingredients, emulsifiers, flavor potentiators, bitterness masking or blocking ingredients, food acids, micronutrients, sensates, mouth moistening ingredients, throat care ingredients, colors, and combinations thereof. Ingredients may be available in different forms such as, for example, liquid form, spray-dried form, or crystalline form. In some embodiments, a delivery system or chewing gum composition may include the same type of ingredient in different forms. For example, a chewing gum composition may include a liquid flavor and a spray-dried version of the same flavor. In some embodiments, the ingredient may be in its free or encapsulated form and may be present in any region of the gum composition such as in the center-fill, the gum region, or the coating.

In some embodiments, an ingredient's release is modified such that when a consumer chews the chewing gum, they may experience an increase in the duration of flavor or sweetness perception and/or the ingredient is released or otherwise made available over a longer period of time. Modified release may be accomplished by any method known in the art, such as by encapsulation. Where modified release is due to encapsulation, this may be accomplished by a variety of means such as by spray coating or extrusion.

Additionally, if early and extended release of the ingredient is desired, the chewing gum composition may include ingredients without modified release (sometimes referred to as "free" ingredients), as well as ingredients with modified release. In some embodiments, a free ingredient may be used to deliver an initial amount or "hit" of an ingredient (e.g., flavor, cooling agent) or an initial sensation or benefit caused by the ingredient (e.g., flavor, nasal action, cooling, warming, tingling, saliva generation, breath freshening, teeth whitening, throat soothing, mouth moistening, etc.). In some embodiments, the same ingredient can be provided with modified release characteristics to provide an additional or delayed amount of the same sensation or benefit. By using both the free ingredient and the ingredient with modified release characteristics, the sensation or benefit due to the ingredient may be provided over a longer period of time and/or perception of the sensation or benefit by a consumer may be improved. Also, in some embodiments the initial amount or "hit" of the ingredient may predispose or precondition the consumers' mouth or perception of the chewing gum composition.

As another example, in some embodiments it may be desirable to provide a sustained release of an ingredient in a chewing gum composition over time. To accomplish sustained release, the ingredient may be modified to allow for a lower concentration of the ingredient to be released over a longer period of time versus the release of a higher concentration of the ingredient over a shorter period of time. A sustained release of an ingredient may be advantageous in situations when the ingredient has a bitter or other bad taste at the higher concentrations. A sustained release of an ingredient also may be advantageous when release of the ingredient in higher concentrations over a shorter period of time may result in a lesser amount of the ingredient being optimally delivered to the consumer. For example, for a tooth whitening or breath freshening ingredient, providing too much of the ingredient too fast may result in a consumer swallowing a significant portion of the ingredient before the ingredient has had a chance to interact with the consumer's teeth, mucous membranes, and/or dental work, thereby wasting the ingredient or at least reducing the benefit of having the ingredient in the chewing gum composition.

Ingredient Release Management

In different embodiments, different techniques, ingredients, and/or delivery systems, may be used to manage release of one or more ingredients in a chewing gum composition. In some embodiments, more than one of the techniques, ingredients, and/or delivery systems may be used.

In some embodiments, the delay in availability or other release of an ingredient in a chewing gum composition caused by encapsulation of the ingredient may be based, in whole or in part, by one or more of the following: the type of encapsulating material, the molecular weight of the encapsulating material, the tensile strength of the delivery system containing the ingredient, the hydrophobicity of the encapsulating material, the presence of other materials in the chewing gum composition (e.g., tensile strength modifying agents, emulsifiers), the ratio of the amounts of one or more ingredients in the delivery system to the amount of the encapsulating material in the delivery system, the number of layers of encapsulating material, the desired texture, flavor, shelf life, or other characteristic of chewing gum composition, the ratio of the encapsulating material to the ingredient being encapsulated, etc. Thus, by changing or managing one or more of these characteristics of a delivery system or the chewing gum composition, release of one or more ingredients in a chewing gum composition during consumption of the chewing gum composition can be managed more effectively and/or a more desirable release profile for one or more ingredients in the delivery system or the gum composition may be obtained. This may lead to a more positive sensory or consumer experience during consumption of the chewing gum composition, more effective release of such one or more ingredients during consumption of the chewing gum composition, less need for the ingredient (e.g., more effective release of the ingredient may allow the amount of the ingredient in the chewing gum composition to be reduced), increased delivery of a therapeutic or other functional benefit to the consumer, etc. Additionally, in some embodiments, managing the release rate or profile can be tailored to specific consumer segments.

Encapsulation

In some embodiments, one or more ingredients may be encapsulated with an encapsulating material to modify the release profile of the ingredient. In general, partially or completely encapsulating an ingredient used in a chewing gum composition with an encapsulating material may delay release of the ingredient during consumption of the chewing gum composition, thereby delaying when the ingredient becomes available inside the consumer's mouth, throat, and/or stomach, available to react or mix with another ingredient, and/or available to provide some sensory experience and/or functional or therapeutic benefit. This can be particularly true when the ingredient is water soluble or at least partially water soluble.

In some embodiments, a material used to encapsulate an ingredient may include water insoluble polymers, co-polymers, or other materials capable of forming a strong matrix, solid coating, or film as a protective barrier with or for the ingredient. In some embodiments, the encapsulating material may completely surround, coat, cover, or enclose an ingredient. In other embodiments, the encapsulating material may only partially surround, coat, cover, or enclose an ingredient. Different encapsulating materials may provide different release rates or release profiles for the encapsulated ingredient. In some embodiments, encapsulating material used in a delivery system may include one or more of the following: polyvinyl acetate, polyethylene, crosslinked polyvinyl pyrrolidone, polymethylmethacrylate, polylactidacid, polyhydroxyalkanoates, ethylcellulose, polyvinyl acetatephthalate, polyethylene glycol esters, methacrylicacid-co-methylmethacrylate, ethylene-vinylacetate (EVA) copolymer, and the like, and combinations thereof.

In some embodiments, an ingredient may be pre-treated prior to encapsulation with an encapsulating material. For example, an ingredient may be coated with a "coating material" that is not miscible with the ingredient or is at least less miscible with the ingredient relative to the ingredient's miscibility with the encapsulating material.

In some embodiments, an encapsulation material may be used to individually encapsulate different ingredients in the same chewing gum composition. For example, a delivery system may include aspartame encapsulated by polyvinyl acetate. Another delivery system may include ace-k encapsulated by polyvinyl acetate. Both delivery systems may be used as ingredients in the same chewing gum or in other chewing gum compositions. For additional examples, see U.S. Patent Application Ser. No. 60/683,634 entitled "Methods and Delivery Systems for Managing Release of One or More Ingredients in an Edible Composition" and filed May 23, 2005, the entire contents of which are incorporated herein by reference for all purposes.

In some embodiments, different encapsulation materials may be used to individually encapsulate different ingredients used in the same chewing gum composition. For example, a delivery system may include aspartame encapsulated by polyvinyl acetate. Another delivery system may include ace-k encapsulated by EVA. Both delivery systems may be used as ingredients in the same chewing gum or other chewing gum compositions. Examples of encapsulated ingredients using different encapsulating materials can be found in U.S. Patent Application Ser. No. 60/655,894 filed Feb. 25, 2005, and entitled "Process for Manufacturing a Delivery System for Active Components as Part of an Edible Composition," the entire contents of which are incorporated herein by reference for all purposes.

In some embodiments, encapsulation may be employed to provide barrier protection to or from a component rather than to modify the release of the component. For instance, it often is desirable to limit the exposure of acids to other components in a chewing gum composition. Such acids may be encapsulated to limit their exposure to other components, or alternatively, the other components in the chewing gum composition may be encapsulated to limit their exposure to the acid.

Methods of Encapsulation

There are many ways to encapsulate one or more ingredients with an encapsulating material. For example, in some embodiments, a sigma blade or Banbury™ type mixer may be used. In other embodiments, an extruder or other type of continuous mixer may be used. In some embodiments, spray coating, spray chilling, absorption, adsorption, inclusion complexing (e.g., creating a flavor/cyclodextrin complex), coacervation, fluidized bed coating, or other process may be used to encapsulate an ingredient with an encapsulating material.

Examples of encapsulation of ingredients can be found in U.S. Patent Application Ser. No. 60/655,894, filed Feb. 25, 2005, and entitled "Process for Manufacturing a Delivery System for Active Components as Part of an Edible Composition," the entire contents of which are incorporated herein by reference for all purposes. Other examples of encapsulation of ingredients can be found in U.S. patent application Ser. No. 10/955,255 filed Sep. 30, 2004, and entitled "Encapsulated Compositions and Methods of Preparation," the entire contents of which are incorporated herein by reference for all purposes. Further examples of encapsulation of ingredients can be found in U.S. patent application Ser. No. 10/955,149 filed Sep. 30, 2004, and entitled "Thermally Stable High Tensile Strength Encapsulation Compositions for Actives," the entire contents of which are incorporated herein by reference for all purposes. Still further examples of encapsulation of ingredients can be found in U.S. patent application Ser. No. 11/052,672 filed Feb. 7, 2005, and entitled "Stable Tooth Whitening Gum with Reactive Components," the entire contents of which are incorporated herein by reference for all purposes. Further encapsulation techniques and resulting delivery systems may be found in U.S. Pat. Nos. 6,770,308, 6,759,066, 6,692,778, 6,592,912, 6,586,023, 6,555,145, 6,479,071, 6,472,000, 6,444,241, 6,365,209, 6,174,514, 5,693,334, 4,711,784, 4,816,265, and 4,384,004, the contents of all of which are incorporated herein by reference for all purposes.

In some embodiments, a delivery system may be ground to a powdered material with a particular size for use as an ingredient in a chewing gum composition. For example, in some embodiments, an ingredient may be ground to approximately the same particle size of the other chewing gum ingredients so as to create a homogeneous mixture. In some embodiments, the delivery system may be ground to a powdered material with an average particle size such as, for example, about 4 to about 100 mesh or about 8 to about 25 mesh or about 12 to about 20 mesh.

Tensile Strength

In some embodiments, selection of an encapsulating material for one or more ingredients may be based on tensile strength desired for the resulting delivery system. For example, in some embodiments, a delivery system produces delayed or otherwise controlled release of an ingredient through the use of a pre-selected or otherwise desired tensile strength.

In some embodiments, increasing the tensile strength of a delivery system may increase the delayed or extended release of an ingredient in the delivery system. The tensile strength for a delivery system may be matched with a desirable release rate selected according to the type of the ingredient(s) to be encapsulated for the delivery system, the encapsulating material used, any other additives incorporated in the delivery system and/or a chewing gum composition using the delivery system as an ingredient, the desired rate of release of the ingredient, and the like. In some embodiments, the tensile strength of a delivery system which can be at least 6,500 psi, including 7500, 10,000, 20,000, 30,000, 40,000, 50,000, 60,000, 70,000, 80,000, 90,000, 100,000, 125,000, 135,000, 150,000, 165,000, 175,000, 180,000, 195,000, 200,000 and all ranges and subranges there between, for example, a tensile strength range of 6,500 to 200,000 psi.

In some embodiments, a delivery system for one or more ingredients can be provided based on the tensile strength of the delivery system having a specific tensile strength when compared to a standard. Thus, the design of the delivery system is not focused on one characteristic (e.g., molecular weight) of one of the materials (e.g., encapsulating material) used to produce the delivery system. In this manner, a delivery system can be formulated to express a desired release profile by adjusting and modifying the tensile strength through the specific selection of the ingredient(s), encapsulating material, additives, amount of the ingredient(s), amount of encapsulating material, relative amounts of ingredient(s) to encapsulating material, etc. If a desired tensile strength is chosen for a delivery system, any delivery system that has the desired tensile strength may be used without being limited to a particular encapsulating material and its molecular weight. The formulation process can be extended to encapsulating materials that exhibit similar physical and chemical properties as the encapsulating material forming part of the standard delivery system.

In some embodiments, a delivery system for delivering an ingredient may be formulated to ensure an effective sustained release of the ingredient based on the type and amount of the ingredient and the desired release rate for the ingredient. For example, it may be desirable to affect the controlled release of a high intensity sweetener from a chewing gum over a period of twenty-five to thirty minutes to ensure against a rapid burst of sweetness that may be offensive to some consumers. A shorter controlled release time may be desirable for other type of ingredients such as pharmaceuticals or therapeutic agents, which may be incorporated into the same chewing gum composition by using separate delivery systems for each of these ingredients. Delivery systems may be formulated with a particular tensile strength associated with a range of release rates based on a standard. The standard may comprise a series of known delivery systems having tensile strengths over a range extending, for example, from low to high tensile strength values. Each of the delivery systems of the standard will be associated with a particular release rate or ranges of release rates. Thus, for example, a delivery system can be formulated with a relatively slow release rate by a fabricating a delivering system having a relatively high tensile strength. Conversely, lower tensile strength compositions tend to exhibit relatively faster release rates.

In some embodiments, encapsulating material in a delivery system may be present in amounts of from about 0.2% to 10% by weight based on the total weight of the chewing gum composition, including 0.3, 0.5, 0.7, 0.9, 1.0, 1.25, 1.4, 1.7, 1.9, 2.2, 2.45, 2.75, 3.0, 3.5, 4.0, 4.25, 4.8, 5.0, 5.5, 6.0, 6.5, 7.0, 7.25, 7.75, 8.0, 8.3, 8.7, 9.0, 9.25, 9.5, 9.8 and all values and ranges there between, for example, from 1% to 5% by weight. The amount of the encapsulating material can depend in part on the amount of the ingredient(s) component that is encapsulated. The amount of the encapsulating material with respect to the weight of the delivery system, is from about 30% to 99%, including 35, 40, 45, 50, 55, 60, 65, 70, 75, 80, 85, 95, 97 and all values and ranges there between, for example, from about 60% to 90% by weight.

In some embodiments, the tensile strength of a delivery system may be selected from relatively high tensile strengths when a relatively slow rate of release for an ingredient in the delivery system is desired and relatively lower tensile strengths when a faster rate of release for an ingredient in the delivery system is desired. Thus, when employing a tensile strength of 50,000 psi for a delivery system, the release rate of the ingredient, will generally be lower than the release rate of the ingredient in a delivery system having a tensile strength of 10,000 psi regardless of the type of encapsulating material (e.g., polyvinyl acetate) chosen.

In some embodiments, the encapsulating material for a delivery system is polyvinyl acetate. A representative example of a polyvinyl acetate product suitable for use as an encapsulating material in the present invention is Vinnapas® B100 sold by Wacker Polymer Systems of Adrian, Mich. A delivery system utilizing polyvinyl acetate may be prepared by melting a sufficient amount of polyvinyl acetate at a temperature of about 65° C. to 120° C. for a short period of time, e.g., five minutes. The melt temperature will depend on the type and tensile strength of the polyvinyl acetate encapsulating material where higher tensile strength materials will generally melt at higher temperatures. Once the encapsulating material is melted, a suitable amount of an ingredient (e.g., high intensity sweetener such as aspartame) is added and blended into the molten mass thoroughly for an additional short period of mixing. The resulting mixture is a semi-solid mass, which is then cooled (e.g., at 0° C.) to obtain a solid, and then ground to a U.S. Standard sieve size of from about 30 to 200 (600 to 75 microns). The tensile strength of the resulting delivery system can readily be tested according to ASTM-D638.

For additional information regarding how tensile strength of a delivery system may be used to create managed release of one or more ingredients, see U.S. patent application Ser. No. 11/083,968 entitled "A Delivery System for Active Components as Part of an Edible Composition Having Preselected Tensile Strength" and filed on Mar. 21, 2005, and U.S. patent application Ser. No. 10/719,298 entitled "A Delivery System for Active Components as Part of an Edible Composition" and filed Nov. 21, 2003, the complete contents of both of which are incorporated herein by reference for all purposes.

Hydrophobicity

In some embodiments, the release of one or more ingredients from a delivery system may depend on more than tensile strength. For example, the release of the ingredients may be directly related to the tensile strength of the delivery system and the hydrophobicity (i.e., water resistance) of the encapsulating polymer or other material.

As a more specific example, when a delivery system is used in a chewing gum, moisture may be absorbed in the encapsulated ingredient(s) during mastication and chewing of the chewing gum. This may result in softening of the encapsulating material and releasing of the ingredient(s) during the mastication and chewing of the chewing gum. The softening of the encapsulation material depends on the hydrophobicity of the polymer used as the encapsulation material. In general, the higher the hydrophobicity of the polymer, the longer mastication time is needed for softening the polymer.

As one example, higher hydrophobic polymers such as ethylene-vinylacetate (EVA) copolymer can be used to increase or otherwise manage ingredient (e.g., sweetener) release times from encapsulations. The degree of hydrophobicity can be controlled by adjusting the ratio of ethylene and vinylacetate in the copolymer. In general, the higher the ethylene to vinylacetate ratio, the longer time it will take during consumption to soften the encapsulation particles, and the slower or more delayed will be the release rate of the ingredient. The lower the ethylene to vinylacetate ratio, the shorter time it will take during consumption to soften the encapsulation particles, and the faster or earlier will be the release rate of the ingredient.

As illustrated by the discussion above, in some embodiments, release of an ingredient from a delivery system can be managed or otherwise controlled by formulating the delivery system based on the hydrophobicity of the encapsulating material, e.g., the polymer, for the ingredient. Using highly hydrophobic polymers, the release times of the ingredient can be increased or delayed. In a similar manner, using encapsulating material that is less hydrophobic, the ingredient can be released more rapidly or earlier.

The hydrophobicity of a polymer can be quantified by the relative water-absorption measured according to ASTM D570-98. Thus, by selecting encapsulating material(s) for a delivery system with relatively lower water-absorption properties and adding that to a mixer, the release of the ingredient contained in the produced delivery system can be delayed compared to those encapsulating materials having higher water-absorption properties.

In some embodiments, polymers with water absorption of from about 50 to 100% (as measured according to ASTM D570-98) can be used. Moreover, to decrease the relative delivery rate, the encapsulating material can be selected such that the water absorption would be from about 15% to about 50% (as measured according to ASTM D570-98). Still further, in other embodiments, the water absorption properties of the encapsulating material can be selected to be from 0.0% to about 5% or up to about 15% (as measured according to ASTM D570-98). In other embodiments, mixtures of two or more delivery systems formulated with encapsulating material having different water-absorption properties can also be used in subsequent incorporation into a chewing gum composition.

Polymers with suitable hydrophobicity which may be used for delivery systems include homo- and co-polymers of, for example, vinyl acetate, vinyl alcohol, ethylene, acrylic acid, methacrylate, methacrylic acid and others. Suitable hydrophobic copolymers include the following non-limiting examples, vinyl acetate/vinyl alcohol copolymer, ethylene/vinyl alcohol copolymer, ethylene/acrylic acid copolymer, ethylene/methacrylate copolymer, ethylene/methacrylic acid copolymer.

In some examples, the hydrophobic encapsulating material in a delivery system may be present in amounts of from about 0.2% to 10% by weight based on the total weight of a chewing gum composition containing the delivery system, including 0.3, 0.5, 0.7, 0.9, 1.0, 1.25, 1.4, 1.7, 1.9, 2.2, 2.45, 2.75, 3.0, 3.5, 4.0, 4.25, 4.8, 5.0, 5.5, 6.0, 6.5, 7.0, 7.25, 7.75, 8.0, 8.3, 8.7, 9.0, 9.25, 9.5, 9.8 and all values and ranges there between, for example, from 1% to 5% by weight. The amount of the encapsulating material will, of course, depend in part on the amount of the ingredient that is encapsulated. The amount of the encapsulating material with respect to the weight of the delivery system, is from about 30% to 99%, including 35, 40, 45, 50, 55, 60, 65, 70, 75, 80, 85, 95, 97 and all values and ranges there between, for example, from about 60% to 90% by weight.

In formulating the delivery system based on the selection criteria of hydrophobicity of the encapsulating material, the encapsulated ingredient can be entirely encapsulated within the encapsulating material or incompletely encapsulated within the encapsulating material provided the resulting delivery system meets the criteria set forth hereinabove. The incomplete encapsulation can be accomplished by modifying and/or adjusting the manufacturing process to create partial coverage of the ingredient.

For example, if ethylene-vinyl acetate is the encapsulating material for an ingredient, the degree of hydrophobicity can be controlled by adjusting the ratio of ethylene and vinyl acetate in the copolymer. The higher the ethylene to vinylacetate ratio, the slower the release of the ingredient. Using vinylacetate/ethylene copolymer as an example, the ratio of the vinylacetate/ethylene in the copolymer can be from about 1 to about 60%, including ratios of 2.5, 5, 7.5, 9, 12, 18, 23, 25, 28, 30, 35, 42, 47, 52, 55, 58.5% and all values and ranges there between.

In some embodiments, a method of selecting a target delivery system containing an ingredient for a chewing gum composition is based on the hydrophobicity of the encapsulating material for the ingredient in the delivery system. The method generally includes preparing a targeted delivery system containing an ingredient to be encapsulated, an encapsulating material and optional additives, with the encapsulating material having a pre-selected or otherwise desired hydrophobicity. The hydrophobicity of the encapsulating material employed in the targeted delivery system can be selected to provide a desirable release rate of the ingredient. This selection of the encapsulating material is based on the hydrophobicity of sample delivery systems having the same or similar ingredient and known release rates of the ingredient. In a more preferred another embodiment of the invention, the method comprises (a) obtaining a plurality of sample delivery systems comprising at least one ingredient, at least one encapsulating material, and optional additives, wherein each of the delivery systems is prepared with different encapsulating materials having different hydrophobicities; (b) testing the sample delivery systems to determine the respective release rates of the ingredient(s); and (c) formulating a target delivery system containing the same ingredient(s) with a hydrophobic encapsulating material corresponding to a desired release rate of the ingredient(s) based on the obtained sample delivery systems.

The method of selecting at least one delivery system suitable for incorporation into a chewing gum composition preferably can begin by determining a desired release rate for an ingredient (i.e., a first active component). The determination of the desired release rate may be from known literature or technical references or by in vitro or in vivo testing. Once the desired release rate is determined, the desired hydrophobicity of the encapsulating material can be determined (i.e., a first hydrophobic encapsulating material) for a delivery system (i.e., first delivery system) that can release the first active component at the desired release. Once the delivery system is obtained which can deliver the first active component as required it is then selected for eventual inclusion in a chewing gum composition.

The method described above may then be repeated for a second active component and for additional active components as described via the determination and selection of a suitable delivery system.

For additional information regarding the relationship of hydrophobicity of an encapsulating material to the release of an ingredient from a delivery system, see U.S. Patent Application Ser. No. 60/683,634 entitled "Methods and Delivery Systems for Managing Release of One or More Ingredients in an Edible Composition" and filed on May 23, 2005, with the U.S. Patent and Trademark Office, the complete contents of which are incorporated herein by reference for all purposes Ratio of Ingredient to Encapsulating Material for Ingredient in Delivery System In general, the "loading" of an ingredient in a delivery system can impact the release profile of the ingredient when the ingredient is used in a chewing gum composition. Loading refers to the amount of one or more ingredients contained in the delivery relative to the amount of encapsulating material. More specifically, the ratio of the amount of one or more ingredients in a delivery system to the amount of encapsulating material in the delivery system can impact the release rate of the one or more ingredients. For example, the lower the ratio or loading of the amount of one or more ingredients in a delivery system to the amount of encapsulating material in the delivery system, the longer or more delayed will be the release of the one or more ingredients from the delivery system. The higher the ratio or loading of the amount of one or more ingredients in a delivery system to the amount of encapsulating material in the delivery system, the faster or earlier will be the release of the one or more ingredients from the delivery system. This principle can be further employed to manage the release profiles of the one or more ingredients by using higher loading of ingredients designed to be released early in combination with lower loading of ingredients designed to be released later. In some embodiments, the one or more ingredients can be the same or different.

As a more specific example, three delivery systems including aspartame encapsulated with a polyvinylacetate and a fat were created using a conventional mixing process wherein the polyvinyl acetate first was melted in a mixer. The aspartame and fat then were added and the three ingredients were mixed to create a homogenous mixture. The delivery systems had the following aspartame to polyvinyl to fat ratios: (1) 5:90:5; (2) 15:80:5, (3) 30:65:5. The molten delivery systems were cooled and sized by passing ground powder through a 420 micron screen. Three chewing gums where created, each using a different delivery system. It was determined that the chewing gum using the first ratio of the ingredients had a lower or slower release of aspartame that the chewing gums using the second or third ratios of the ingredients. Similarly, the gum using the second ratio of the ingredients had a lower or slower release of aspartame than the chewing gum using the third ratio of the ingredients.

For additional information regarding the relationship of the ratio of the amount ingredient in a delivery system to the amount of encapsulating material in the delivery system to the release of an ingredient from a delivery system, see U.S. patent application Ser. No. 11/134,371 entitled "A Delivery System For Active Components as Part of and Edible Composition Including a Ratio of Encapsulating Material and Active Component" and filed on May 23, 2005, with the U.S. Patent and Trademark Office, the complete contents of which are incorporated herein by reference for all purposes.

There are many types of ingredients for which managed release of the ingredients from a chewing gum composition may be desired. In addition, there are many groups of two or more ingredients for which managed release of the group of ingredients from a chewing gum composition may be desired.

Flavors

In some embodiments, flavorants may include those flavors known to the skilled artisan, such as natural and artificial flavors. These flavorings may be chosen from synthetic flavor oils and flavoring aromatics and/or oils, oleoresins and extracts derived from plants, leaves, flowers, fruits, and so forth, and combinations thereof. Nonlimiting representative flavor oils include spearmint oil, cinnamon oil, oil of wintergreen (methyl salicylate), peppermint oil, Japanese mint oil, clove oil, bay oil, anise oil, eucalyptus oil, thyme oil, cedar leaf oil, oil of nutmeg, allspice, oil of sage, mace, oil of bitter almonds, and cassia oil. Also useful flavorings are artificial, natural and synthetic fruit flavors such as vanilla, and citrus oils including lemon, orange, lime, grapefruit, yazu, sudachi, and fruit essences including apple, pear, peach, grape, blueberry, strawberry, raspberry, cherry, plum, pineapple, apricot, banana, melon, apricot, ume, cherry, raspberry, blackberry, tropical fruit, mango, mangosteen, pomegranate, papaya, watermelon, and so forth. Other potential flavors whose release profiles can be managed include a milk flavor, a butter flavor, a cheese flavor, a cream flavor, and a yogurt flavor; a vanilla flavor; tea or coffee flavors, such as a green tea flavor, a oolong tea flavor, a tea flavor, a cocoa flavor, a chocolate flavor, and a coffee flavor; mint flavors, such as a peppermint flavor, a spearmint flavor, and a Japanese mint flavor; spicy flavors, such as an asafetida flavor, an ajowan flavor, an anise flavor, an angelica flavor, a fennel flavor, an allspice flavor, a cinnamon flavor, a camomile flavor, a mustard flavor, a cardamom flavor, a caraway flavor, a cumin flavor, a clove flavor, a pepper flavor, a coriander flavor, a sassafras flavor, a savory flavor, a Zanthoxyli Fructus flavor, a perilla flavor, a juniper berry flavor, a ginger flavor, a star anise flavor, a horseradish flavor, a thyme flavor, a tarragon flavor, a dill flavor, a capsicum flavor, a nutmeg flavor, a basil flavor, a marjoram flavor, a rosemary flavor, a bayleaf flavor, and a wasabi (Japanese horseradish) flavor; alcoholic flavors, such as a wine flavor, a whisky flavor, a brandy flavor, a rum flavor, a gin flavor, and a liqueur flavor; floral flavors; and vegetable flavors, such as an onion flavor, a garlic flavor, a cabbage flavor, a carrot flavor, a celery flavor, mushroom flavor, and a tomato flavor. These flavoring agents may be used in liquid or solid form and may be used individually or in admixture. Commonly used flavors include mints such as peppermint, menthol, spearmint, artificial vanilla, cinnamon derivatives, and various fruit flavors, whether employed individually or in admixture. Flavors may also provide breath freshening properties, particularly the mint flavors when used in combination with the cooling agents, described herein below.

In some embodiments, other flavorings include aldehydes and esters such as cinnamyl acetate, cinnamaldehyde, citral diethylacetal, dihydrocarvyl acetate, eugenyl formate, p-methylamisol, and so forth may be used. Generally any flavoring or food additive such as those described in Chemicals Used in Food Processing, publication 1274, pages 63-258, by the National Academy of Sciences, may be used. This publication is incorporated herein by reference. These may include natural as well as synthetic flavors.

Further examples of aldehyde flavorings include but are not limited to acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, .e., melonal (melon), 2,6-dimethyloctanal (green fruit), and 2-dodecenal (citrus, mandarin), cherry, grape, blueberry, blackberry, strawberry shortcake, and mixtures thereof.

In some embodiments, a flavoring agent may be employed in either liquid form and/or dried form. When employed in the latter form, suitable drying means such as spray drying the liquid may be used. Alternatively, the flavoring agent may be absorbed onto water soluble materials, such as cellulose, starch, sugar, maltodextrin, gum arabic and so forth or may be encapsulated. In still other embodiments, the flavoring agent may be adsorbed onto silicas, zeolites, and the like.

In some embodiments, the flavoring agents may be used in many distinct physical forms. Without being limited thereto, such physical forms include free forms, such as spray dried, powdered, beaded forms, encapsulated forms, and mixtures thereof.

Illustrations of the encapsulation of flavors as well as other additional components can be found in the examples provided herein. Typically, encapsulation of a component will result in a delay in the release of the predominant amount of the component during consumption of a chewing gum composition that includes the encapsulated component (e.g., as part of a delivery system added as an ingredient to the chewing gum composition). In some embodiments, the release profile of the ingredient (e.g., the flavor, sweetener, etc.) can be managed by managing various characteristics of the ingredient, delivery system containing the ingredient, and/or the chewing gum composition containing the delivery system and/or how the delivery system is made. For example, characteristics might include one or more of the following: tensile strength of the delivery system, water solubility of the ingredient, water solubility of the encapsulating material, water solubility of the delivery system, ratio of ingredient to encapsulating material in the delivery system, average or maximum particle size of ingredient, average or maximum particle size of ground delivery system, the amount of the ingredient or the delivery system in the chewing gum composition, ratio of different polymers used to encapsulate one or more ingredients, hydrophobicity of one or more polymers used to encapsulate one or more ingredients, hydrophobicity of the delivery system, the type or amount of coating on the delivery system, the type or amount of coating on an ingredient prior to the ingredient being encapsulated, etc.

Sweetening Ingredients

The sweeteners involved may be selected from a wide range of materials including water-soluble sweeteners, water-soluble artificial sweeteners, water-soluble sweeteners derived from naturally occurring water-soluble sweeteners, dipeptide based sweeteners, and protein based sweeteners, including mixtures thereof. Without being limited to particular sweeteners, representative categories and examples include:

(a) water-soluble sweetening agents such as dihydrochalcones, monellin, steviosides, glycyrrhizin, dihydroflavenol, and sugar alcohols such as sorbitol, mannitol, maltitol, xylitol, erythritol, and L-aminodicarboxylic acid aminoalkenoic acid ester amides, such as those disclosed in U.S. Pat. No. 4,619,834, which disclosure is incorporated herein by reference, and mixtures thereof;

(b) water-soluble artificial sweeteners such as soluble saccharin salts, i.e., sodium or calcium saccharin salts, cyclamate salts, the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfame-K), the free acid form of saccharin, and mixtures thereof;

(c) dipeptide based sweeteners, such as L-aspartic acid derived sweeteners, such as L-aspartyl-L-phenylalanine methyl ester (Aspartame), N-[N-(3,3-dimethylbutyl)-L-α-aspartyl]-L-phenylalanine 1-methyl ester (Neotame), and materials described in U.S. Pat. No. 3,492,131, L-alphaaspartyl-N-(2,2,4,4-tetramethyl-3-thietanyl)-D-alaninamide hydrate (Alitame), methyl esters of L-aspartyl-L-phenylglycerine and L-aspartyl-L-2,5-dihydrophenyl-glycine, L-aspartyl-2,5-dihydro-L-phenylalanine; L-aspartyl-L-(1-cyclohexen)-alanine, and mixtures thereof;

(d) water-soluble sweeteners derived from naturally occurring water-soluble sweeteners, such as chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose; examples of chlorodeoxysucrose and chlorodeoxygalactosucrose derivatives include but are not limited to: 1-chloro-1'-deoxysucrose; 4-chloro-4-deoxy-alpha-D-galactopyranosyl-alpha-D-fructo furanoside, or 4-chloro-4-deoxygalactosucrose; 4-chloro-4-deoxy-alpha-D-galactopyranosyl-1-chloro-1-deoxy-beta-D-fructofuranoside, or 4,1'-dichloro-4,1'-dideoxygalactosucrose; 1',6'-dichloro 1',6'-dideoxysucrose; 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose; 4,6-dichloro-4,6-dideoxy-alpha-D-galactopyranosyl-6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galactopyranosyl-1,6-dichloro-1,6-dideoxy-beta-D-fructofuranoside, or 4,6,1',6'-tetrachloro4,6,1',6'-tetradeoxygalacto-sucrose; and 4,6,1',6'-tetradeoxy-sucrose, and mixtures thereof; and (e) protein based sweeteners such as thaumaoccous danielli (Thaumatin I and II) and talin.

The intense sweetening agents may be used in many distinct physical forms well-known in the art to provide an initial burst of sweetness and/or a prolonged sensation of sweetness. Without being limited thereto, such physical forms include free forms, spray dried forms, powdered forms, beaded forms, encapsulated forms, and mixtures thereof. In one embodiment, the sweetener is a high intensity sweetener such as aspartame, sucralose, and acesulfame potassium (e.g., Ace-K).

In some embodiments, the sweetener may be a polyol. Polyols can include, but are not limited to glycerol, sorbitol, maltitol, maltitol syrup, mannitol, isomalt, erythritol, xylitol, hydrogenated starch hydrolysates, polyglycitol syrups, polyglycitol powders, lactitol, and combinations thereof.

The active component (e.g., sweetener), which is part of the delivery system, may be used in amounts necessary to impart the desired effect associated with use of the active component (e.g., sweetness). In general, an effective amount of intense sweetener may be utilized to provide the level of sweetness desired, and this amount may vary with the sweetener selected. The intense sweetener may be present in amounts from about 0.001% to about 3%, by weight of the composition, depending upon the sweetener or combination of sweeteners used. The exact range of amounts for each type of sweetener may be selected by those skilled in the art.

Sensate Ingredients

Sensate compounds can include cooling agents, warming agents, tingling agents, effervescent agents, and combinations thereof. A variety of well known cooling agents may be employed. For example, among the useful cooling agents are included xylitol, erythritol, dextrose, sorbitol, menthane, menthone, ketals, menthone ketals, menthone glycerol ketals, substituted p-menthanes, acyclic carboxamides, mono menthyl glutarate, substituted cyclohexanamides, substituted cyclohexane carboxamides, substituted ureas and sulfonamides, substituted menthanols, hydroxymethyl and hydroxymethyl derivatives of p-menthane, 2-mercapto-cyclo-decanone, hydroxycarboxylic acids with 2-6 carbon atoms, cyclohexanamides, menthyl acetate, menthyl salicylate, N,2,3-trimethyl-2-isopropyl butanamide (WS-23), N-ethyl-p-menthane-3-carboxamide (WS-3), isopulegol, 3-(1-menthoxy)propane-1,2-diol, 3-(1-menthoxy)-2-methylpropane-1,2-diol, p-menthane-2,3-diol, p-menthane-3,8-diol, 6-isopropyl-9-methyl-1,4-dioxaspiro[4,5]decane-2-methanol, menthyl succinate and its alkaline earth metal salts, trimethylcyclohexanol, N-ethyl-2-isopropyl-5-methylcyclohexanecarboxamide, Japanese mint oil, peppermint oil, 3-(1-menthoxy)ethan-1-ol, 3-(1-menthoxy)propan-1-ol, 3-(1-menthoxy)butan-1-ol, 1-menthylacetic acid N-ethylamide, 1-menthyl-4-hydroxypentanoate, 1-menthyl-3-hydroxybutyrate, N,2,3-trimethyl-2-(1-methylethyl)-butanamide, n-ethyl-t-2-c-6 nonadienamide, N,N-dimethyl menthyl succinamide, substituted p-menthanes, substituted p-menthanecarboxamides, 2-isopropanyl-5-methylcyclohexanol (from Hisamitsu Pharmaceuticals, hereinafter "isopregol"); menthone glycerol ketals (FEMA 3807, tradename FRESCOLAT® type MGA); 3-1-menthoxypropane-1,2-diol (from Takasago, FEMA 3784); and menthyl lactate; (from Haarman & Reimer, FEMA 3748, tradename FRESCOLAT® type ML), WS-30, WS-14, Eucalyptus extract (p-Mehta-3,8-Diol), Menthol (its natural or synthetic derivatives), Menthol PG carbonate, Menthol EG carbonate, Menthol glyceryl ether, N-tertbutyl-p-menthane-3-carboxamide, P-menthane-3-carboxylic acid glycerol ester, Methyl-2-isopryl-bicyclo (2.2.1), Heptane-2-carboxamide; and Menthol methyl ether, and menthyl pyrrolidone carboxylate among others. These and other suitable cooling agents are further described in the following U.S. patents, all of which are incorporated in their entirety by reference hereto: U.S. Pat. Nos. 4,230,688; 4,032, 661; 4,459,425; 4,136,163; 5,266,592; 6,627,233.

In some embodiments, warming components may be selected from a wide variety of compounds known to provide the sensory signal of warming to the user. These compounds offer the perceived sensation of warmth, particularly in the oral cavity, and often enhance the perception of flavors, sweeteners and other organoleptic components. In some embodiments, useful warming compounds can include vanillyl alcohol n-butylether (TK-1000) supplied by Takasago Perfumary Company Limited, Tokyo, Japan, vanillyl alcohol n-propylether, vanillyl alcohol isopropylether, vanillyl alcohol isobutylether, vanillyl alcohol n-aminoether, vanillyl alcohol isoamyleather, vanillyl alcohol n-hexyleather, vanillyl alcohol methylether, vanillyl alcohol ethylether, gingerol, shogaol, paradol, zingerone, capsaicin, dihydrocapsaicin, nordihydrocapsaicin, homocapsaicin, homodihydrocapsaicin, ethanol, isopropyl alcohol, iso-amylalcohol, benzyl alcohol, glycerine, and combinations thereof.

In some embodiments, a tingling sensation can be provided. One such tingling sensation is provided by adding jambu, oleoresin, or spilanthol to some examples. In some embodiments, alkylamides extracted from materials such as jambu or sanshool can be included. Additionally, in some embodiments, a sensation is created due to effervescence. Such effervescence is created by combining an alkaline material with an acidic material. In some embodiments, an alkaline material can include alkali metal carbonates, alkali metal bicarbonates, alkaline earth metal carbonates, alkaline earth metal bicarbonates and mixtures thereof. In some embodiments, an acidic material can include acetic acid, adipic acid, ascorbic acid, butyric acid, citric acid, formic acid, fumaric acid, glyconic acid, lactic acid, phosphoric acid, malic acid, oxalic acid, succinic acid, tartaric acid and combinations thereof. Examples of "tingling" type sensates can be found in U.S. Pat. No. 6,780,443, the entire contents of which are incorporated herein by reference for all purposes.

Sensate components may also be referred to as "trigeminal stimulants" such as those disclosed in U.S. Patent Application No. 205/0202118, which is incorporated herein by reference. Trigeminal stimulants are defined as an orally consumed product or agent that stimulates the trigeminal nerve. Examples of cooling agents which are trigeminal stimulants include menthol, WS-3, N-substituted p-menthane carboxamide, acyclic carboxamides including WS-23, methyl succinate, menthone glycerol ketals, bulk sweeteners such as xylitol, erithyritol, dextrose, and sorbitol, and combinations thereof. Trigeminal stimulants can also include flavors, tingling agents, Jambu extract, vanillyl alkyl ethers, such as vanillyl n-butyl ether, spilanthol, Echinacea extract, Northern Prickly Ash extract, capsaicin, capsicum oleoresin, red pepper oleoresin, black pepper oleoresin, piperine, ginger oleoresin, gingerol, shoagol, cinnamon oleoresin, cassia oleoresin, cinnamic aldehyde, eugenol, cyclic acetal of vanillin and menthol glycerin ether, unsaturated amides, and combinations thereof.

Breath Freshening Ingredients

Breath fresheners can include essential oils as well as various aldehydes, alcohols, and similar materials. In some embodiments, essential oils can include oils of spearmint, peppermint, wintergreen, sassafras, chlorophyll, citral, geraniol, cardamom, clove, sage, carvacrol, eucalyptus, cardamom, magnolia bark extract, marjoram, cinnamon, lemon, lime, grapefruit, and orange. In some embodiments, aldehydes such as cinnamic aldehyde and salicylaldehyde can be used. Additionally, chemicals such as menthol, carvone, isogarrigol, and anethole can function as breath fresheners. Of these, the most commonly employed are oils of peppermint, spearmint and chlorophyll.

In addition to essential oils and chemicals derived from them, in some embodiments breath fresheners can include but are not limited to zinc citrate, zinc acetate, zinc fluoride, zinc ammonium sulfate, zinc bromide, zinc iodide, zinc chloride, zinc nitrate, zinc flurosilicate, zinc gluconate, zinc tartarate, zinc succinate, zinc formate, zinc chromate, zinc phenol sulfonate, zinc dithionate, zinc sulfate, silver nitrate, zinc salicylate, zinc glycerophosphate, copper nitrate, chlorophyll, copper chlorophyll, chlorophyllin, hydrogenated cottonseed oil, chlorine dioxide, beta cyclodextrin, zeolite, silica-based materials, carbon-based materials, enzymes such as laccase, and combinations thereof. In some embodiments, the release profiles of probiotics can be managed for a gum including, but not limited to lactic acid producing microorganisms such as *Bacillus coagulans, Bacillus subtilis, Bacillus laterosporus, Bacillus laevolacticus, Sporolactobacillus inulinus, Lactobacillus acidophilus, Lactobacillus curvatus, Lactobacillus plantarum, Lactobacillusjenseni, Lactobacillus casei, Lactobacillus fermentum, Lactococcus lactis, Pedioccocus acidilacti, Pedioccocus pentosaceus, Pedioccocus urinae, Leuconostoc mesenteroides, Bacillus coagulans, Bacillus subtilis, Bacillus laterosporus, Bacillus laevolacticus, Sporolactobacillus inulinus* and mixtures thereof. Breath fresheners are also known by the following trade names: Retsyn,™ Actizol,™ and Nutrazin.™ Examples of malodor-controlling compositions are also included in U.S. Pat. No. 5,300,305 to Stapler et al. and in U.S. Patent Application Publication Nos. 2003/0215417 and 2004/0081713 which are incorporated in their entirety herein by reference for all purposes.

Dental Care Ingredients

Dental care ingredients (also known as oral care ingredients) may include but are not limited to tooth whiteners, stain removers, oral cleaning, bleaching agents, desensitizing agents, dental remineralization agents, antibacterial agents, anticaries agents, plaque acid buffering agents, surfactants and anticalculus agents. Non-limiting examples of such ingredients can include, hydrolytic agents including proteolytic enzymes, abrasives such as hydrated silica, calcium carbonate, sodium bicarbonate and alumina, other active stain-removing components such as surface-active agents, including, but not limited to anionic surfactants such as sodium stearate, sodium palminate, sulfated butyl oleate, sodium oleate, salts of fumaric acid, glycerol, hydroxylated lecithin, sodium lauryl sulfate and chelators such as polyphosphates, which are typically employed as tartar control ingredients. In some embodiments, dental care ingredients can also include tetrasodium pyrophosphate and sodium tripolyphosphate, sodium bicarbonate, sodium acid pyrophosphate, sodium tripolyphosphate, xylitol, sodium hexametaphosphate.

In some embodiments, peroxides such as carbamide peroxide, calcium peroxide, magnesium peroxide, sodium peroxide, hydrogen peroxide, and peroxydiphospate are included. In some embodiments, potassium nitrate and potassium citrate are included. Other examples can include casein glycomacropeptide, calcium casein peptone-calcium phosphate, casein phosphopeptides, casein phosphopeptide-amorphous calcium phosphate (CPP-ACP), and amorphous calcium phosphate. Still other examples can include papaine, krillase, pepsin, trypsin, lysozyme, dextranase, mutanase, glycoamylase, amylase, glucose oxidase, and combinations thereof.

Further examples can include surfactants such as sodium stearate, sodium ricinoleate, and sodium lauryl sulfate surfactants for use in some embodiments to achieve increased prophylactic action and to render the dental care ingredients more cosmetically acceptable. Surfactants can preferably be detersive materials which impart to the composition detersive and foaming properties. Suitable examples of surfactants are water-soluble salts of higher fatty acid monoglyceride mono-sulfates, such as the sodium salt of the monosulfated monoglyceride of hydgrogenated coconut oil fatty acids, higher alkyl sulfates such as sodium lauryl sulfate, alkyl aryl sulfonates such as sodium dodecyl benzene sulfonate, higher alkyl sulfoacetates, sodium lauryl sulfoacetate, higher fatty acid esters of 1,2-dihydroxy propane sulfonate, and the substantially saturated higher aliphatic acyl amides of lower aliphatic amino carboxylic acid compounds, such as those having 12 to 16 carbons in the fatty acid, alkyl or acyl radicals, and the like. Examples of the last mentioned amides are N-lauroyl sarcosine, and the sodium, potassium, and ethanolamine salts of N-lauroyl, N-myristoyl, or N-palmitoyl sarcosine.

In addition to surfactants, dental care ingredients can include antibacterial agents such as, but not limited to, triclosan, chlorhexidine, zinc citrate, silver nitrate, copper, limonene, and cetyl pyridinium chloride. In some embodiments, additional anticaries agents can include fluoride ions or fluorine-providing components such as inorganic fluoride salts. In some embodiments, soluble alkali metal salts, for example, sodium fluoride, potassium fluoride, sodium fluorosilicate, ammonium fluorosilicate, sodium monofluorophosphate, as well as tin fluorides, such as stannous fluoride and stannous chloride can be included. In some embodiments, a fluorine-containing compound having a beneficial effect on the care and hygiene of the oral cavity, e.g., diminution of enamel solubility in acid and protection of the teeth against decay may also be included as an ingredient. Examples thereof include sodium fluoride, stannous fluoride, potassium fluoride, potassium stannous fluoride (SnF.sub.2-KF), sodium hexafluorostannate, stannous chlorofluoride, sodium fluorozirconate, and sodium monofluorophosphate. In some embodiments, urea is included.

Further examples are included in the following U.S. patents and U.S. published patent applications, the contents of all of which are incorporated in their entirety herein by reference for all purposes: U.S. Pat. No. 5,227,154 to Reynolds, U.S. Pat. No. 5,378,131 to Greenberg, U.S. Pat. No. 6,846,500 to Luo et al., U.S. Pat. No. 6,733,818 to Luo et al., U.S. Pat. No. 6,696,044 to Luo et al., U.S. Pat. No. 6,685,916 to Holme et al., U.S. Pat. No. 6,485,739 to Luo et al., U.S. Pat. No. 6,479,071 to Holme et al., U.S. Pat. No. 6,471,945 to Luo et al., U.S. Patent Publication Nos. 2005/0025721 to Holme et al., 2005/008732 to Gebreselassie et al., and 2004/0136928 to Holme et al.

Active Ingredients

Actives generally refer to those ingredients that are included in a delivery system and/or chewing gum composition for the desired end benefit they provide to the user. In some embodiments, actives can include medicaments, nutrients, nutraceuticals, herbals, nutritional supplements, pharmaceuticals, drugs, and the like and combinations thereof.

Examples of useful drugs include ace-inhibitors, antianginal drugs, anti-arrhythmias, anti-asthmatics, anti-cholesterolemics, analgesics, anesthetics, anti-convulsants, anti-depressants, anti-diabetic agents, anti-diarrhea preparations, antidotes, anti-histamines, anti-hypertensive drugs, anti-inflammatory agents, anti-lipid agents, anti-manics, anti-nauseants, anti-stroke agents, anti-thyroid preparations, anti-tumor drugs, anti-viral agents, acne drugs, alkaloids, amino acid preparations, anti-tussives, anti-uricemic drugs, anti-viral drugs, anabolic preparations, systemic and non-systemic anti-infective agents, anti-neoplastics, anti-parkinsonian agents, anti-rheumatic agents, appetite stimulants, biological response modifiers, blood modifiers, bone metabolism regulators, cardiovascular agents, central nervous system stimulates, cholinesterase inhibitors, contraceptives, decongestants, dietary supplements, dopamine receptor agonists, endometriosis management agents, enzymes, erectile dysfunction therapies such as sildenafil citrate, which is currently marketed as Viagra™, fertility agents, gastrointestinal agents, homeopathic remedies, hormones, hypercalcemia and hypocalcemia management agents, immunomodulators, immunosuppressives, migraine preparations, motion sickness treatments, muscle relaxants, obesity management agents, osteoporosis preparations, oxytocics, parasympatholytics, parasympathomimetics, prostaglandins, psychotherapeutic agents, respiratory agents, sedatives, smoking cessation aids such as bromocryptine or nicotine, sympatholytics, tremor preparations, urinary tract agents, vasodilators, laxatives, antacids, ion exchange resins, anti-pyretics, appetite suppressants, expectorants, anti-anxiety agents, anti-ulcer agents, anti-inflammatory substances, coronary dilators, cerebral dilators, peripheral vasodilators, psycho-tropics, stimulants, anti-hypertensive drugs, vasoconstrictors, migraine treatments, antibiotics, tranquilizers, anti-psychotics, anti-tumor drugs, anti-coagulants, anti-thrombotic drugs, hypnotics, anti-emetics, anti-nauseants, anti-convulsants, neuromuscular drugs, hyper- and hypo-glycemic agents, thyroid and anti-thyroid preparations, diuretics, anti-spasmodics, terine relaxants, anti-obesity drugs, erythropoietic drugs, anti-asthmatics, cough suppressants, mucolytics, DNA and genetic modifying drugs, and combinations thereof.

Examples of active ingredients contemplated for use in the present invention can include antacids, H2-antagonists, and analgesics. For example, antacid dosages can be prepared using the ingredients calcium carbonate alone or in combination with magnesium hydroxide, and/or aluminum hydroxide. Moreover, antacids can be used in combination with H2-antagonists.

Analgesics include opiates and opiate derivatives, such as Oxycontin™, ibuprofen, aspirin, acetaminophen, and combinations thereof that may optionally include caffeine.

Other drug active ingredients for use in embodiments can include anti-diarrheals such as Immodium™ AD, anti-histamines, anti-tussives, decongestants, vitamins, and breath fresheners. Also contemplated for use herein are anxiolytics such as Xanax™; anti-psychotics such as Clozaril™ and Haldol™; non-steroidal anti-inflammatories (NSAID's) such as ibuprofen, naproxen sodium, Voltaren™ and Lodine™, anti-histamines such as Claritin™, Hismanal™, Relafen™, and Tavist™; anti-emetics such as Kytril™ and Cesamet™; bronchodilators such as Bentolin™, Proventil™; anti-depressants such as Prozac™, Zoloft™, and Paxil™; anti-migraines such as Imigra™, ACE-inhibitors such as Vasotec™, Capoten™ and Zestril™; anti-Alzheimer's agents, such as Nicergoline™; and CaH-antagonists such as Procardia™, Adalat™, and Calan™.

The popular H2-antagonists which are contemplated for use in the present invention include cimetidine, ranitidine hydrochloride, famotidine, nizatidien, ebrotidine, mifentidine, roxatidine, pisatidine and aceroxatidine.

Active antacid ingredients can include, but are not limited to, the following: aluminum hydroxide, dihydroxyaluminum aminoacetate, aminoacetic acid, aluminum phosphate, dihydroxyaluminum sodium carbonate, bicarbonate, bismuth aluminate, bismuth carbonate, bismuth subcarbonate, bismuth subgallate, bismuth subnitrate, bismuth subsilysilate, calcium carbonate, calcium phosphate, citrate ion (acid or salt), amino acetic acid, hydrate magnesium aluminate sulfate, magaldrate, magnesium aluminosilicate, magnesium carbonate, magnesium glycinate, magnesium hydroxide, magnesium oxide, magnesium trisilicate, milk solids, aluminum mono-ordibasic calcium phosphate, tricalcium phosphate, potassium bicarbonate, sodium tartrate, sodium bicarbonate, magnesium aluminosilicates, tartaric acids and salts.

A variety of nutritional supplements may also be used as active ingredients including virtually any vitamin or mineral. For example, vitamin A, vitamin C, vitamin D, vitamin E, vitamin K, vitamin $B_6$, vitamin $B_{12}$, thiamine, riboflavin, biotin, folic acid, niacin, pantothenic acid, sodium, potassium, calcium, magnesium, phosphorus, sulfur, chlorine, iron, copper, iodine, zinc, selenium, manganese, choline, chromium, molybdenum, fluorine, cobalt and combinations thereof, may be used.

Examples of nutritional supplements that can be used as active ingredients are set forth in U.S. Patent Application Publication Nos. 2003/0157213 A1, 2003/0206993 and 2003/0099741 A1 which are incorporated in their entirety herein by reference for all purposes.

Various herbals may also be used as active ingredients such as those with various medicinal or dietary supplement properties. Herbals are generally aromatic plants or plant parts and or extracts thereof that can be used medicinally or for flavoring. Suitable herbals can be used singly or in various mixtures. Commonly used herbs include Echinacea, Goldenseal, Calendula, Rosemary, Thyme, Kava Kava, Aloe, Blood Root, Grapefruit Seed Extract, Black Cohosh, Ginseng, Guarana, Cranberry, Gingko Biloba, St. John's Wort, Evening Primrose Oil, Yohimbe Bark, Green Tea, Ma Huang, Maca, Bilberry, Lutein, and combinations thereof.

Effervescing System Ingredients

An effervescent system may include one or more edible acids and one or more edible alkaline materials. The edible acid(s) and the edible alkaline material(s) may react together to generate effervescence.

In some embodiments, the alkaline material(s) may be selected from, but is not limited to, alkali metal carbonates, alkali metal bicarbonates, alkaline earth metal carbonates, alkaline earth metal bicarbonates, and combinations thereof. The edible acid(s) may be selected from, but is not limited to, citric acid, phosphoric acid, tartaric acid, malic acid, ascorbic acid, and combinations thereof. In some embodiments, an effervescing system may include one or more other ingredients such as, for example, carbon dioxide, oral care ingredients, flavorants, etc.

For examples of use of an effervescing system in a chewing gum, refer to U.S. Provisional Patent No. 60/618,222 filed Oct. 13, 2004, and entitled "Effervescent Pressed Gum Tablet Compositions," the contents of which are incorporated herein by reference for all purposes. Other examples can be found in U.S. Pat. No. 6,235,318, the contents of which are incorporated herein by reference for all purposes.

Appetite Suppressor Ingredients

Appetite suppressors can be ingredients such as fiber and protein that function to depress the desire to consume food. Appetite suppressors can also include benzphetamine, diethylpropion, mazindol, phendimetrazine, phentermine, hoodia (P57), Olibra,™ ephedra, caffeine and combinations thereof. Appetite suppressors are also known by the following trade names: Adipex,™ Adipost,™ Bontril™ PDM, Bontril™ Slow Release, Didrex,™ Fastin,™ Ionamin,™ Mazanor,™ Melfiat,™ Obenix,™ Phendiet,™ Phendiet-105,™ Phentercot,™ Phentride,™ Plegine,™ Prelu-2,™ Pro-Fast,™ PT 105,™ Sanorex,™ Tenuate,™ Sanorex,™ Tenuate,™ Tenuate Dospan,™ Tepanil Ten-Tab,™ Teramine,™ and Zantryl.™ These and other suitable appetite suppressors are further described in the following U.S. patents, all of which are incorporated in their entirety by reference hereto: U.S. Pat. No. 6,838,431 to Portman, U.S. Pat. No. 6,716,815 to Portman, U.S. Pat. No. 6,558,690 to Portman, U.S. Pat. No. 6,468,962 to Portman, U.S. Pat. No. 6,436,899 to Portman.

Potentiator Ingredients

Potentiators can consist of materials that may intensify, supplement, modify or enhance the taste and/or aroma perception of an original material without introducing a characteristic taste and/or aroma perception of their own. In some embodiments, potentiators designed to intensify, supplement, modify, or enhance the perception of flavor, sweetness, tartness, umami, kokumi, saltiness and combinations thereof can be included.

In some embodiments, examples of suitable potentiators, also known as taste potentiators include, but are not limited to, neohesperidin dihydrochalcone, chlorogenic acid, alapyridaine, cynarin, miraculin, glupyridaine, pyridinium-betain compounds, glutamates, such as monosodium glutamate and monopotassium glutamate, neotame, thaumatin, tagatose, trehalose, salts, such as sodium chloride, monoammonium glycyrrhizinate, vanilla extract (in ethyl alcohol), sugar acids, potassium chloride, sodium acid sulfate, hydrolyzed vegetable proteins, hydrolyzed animal proteins, yeast extracts, adenosine monophosphate (AMP), glutathione, nucleotides, such as inosine monophosphate, disodium inosinate, xanthosine monophosphate, guanylate monophosphate, alapyridaine (N-(1-carboxyethyl)-6-(hydroxymethyl)pyridinium-3-ol inner salt, sugar beet extract (alcoholic extract), sugarcane leaf essence (alcoholic extract), curculin, strogin, mabinlin, gymnemic acid, 3-hydrobenzoic acid, 2,4-dihydrobenzoic acid, citrus aurantium, vanilla oleoresin, sugarcane leaf essence, maltol, ethyl maltol, vanillin, licorice glycyrrhizinates, compounds that respond to G-protein coupled receptors (T2Rs and T1Rs) and taste potentiator compositions that impart kokumi, as disclosed in U.S. Pat. No. 5,679, 397 to Kuroda et al., which is incorporated in its entirety herein by reference. "Kokumi" refers to materials that impart "mouthfulness" and "good body".

Sweetener potentiators, which are a type of taste potentiator, enhance the taste of sweetness. In some embodiments, exemplary sweetener potentiators include, but are not limited to, monoammonium glycyrrhizinate, licorice glycyrrhizinates, citrus aurantium, alapyridaine, alapyridaine (N-(1-carboxyethyl)-6-(hydroxymethyl)pyridinium-3-ol) inner salt, miraculin, curculin, strogin, mabinlin, gymnemic acid, cynarin, glupyridaine, pyridinium-betain compounds, sugar beet extract, neotame, thaumatin, neohesperidin dihydrochalcone, tagatose, trehalose, maltol, ethyl maltol, vanilla extract, vanilla oleoresin, vanillin, sugar beet extract (alcoholic extract), sugarcane leaf essence (alcoholic extract), compounds that respond to G-protein coupled receptors (T2Rs and T1Rs) and combinations thereof.

Additional examples of potentiators for the enhancement of salt taste include acidic peptides, such as those disclosed in U.S. Pat. No. 6,974,597, herein incorporated by reference. Acidic peptides include peptides having a larger number of acidic amino acids, such as aspartic acid and glutamic acid, than basic amino acids, such as lysine, arginine and histidine. The acidic peptides are obtained by peptide synthesis or by subjecting proteins to hydrolysis using endopeptidase, and if necessary, to deamidation. Suitable proteins for use in the production of the acidic peptides or the peptides obtained by subjecting a protein to hydrolysis and deamidation include plant proteins, (e.g. wheat gluten, corn protein (e.g., zein and gluten meal), soybean protein isolate), animal proteins (e.g., milk proteins such as milk casein and milk whey protein, muscle proteins such as meat protein and fish meat protein, egg white protein and collagen), and microbial proteins (e.g., microbial cell protein and polypeptides produced by microorganisms.)

The sensation of warming or cooling effects may also be prolonged with the use of a hydrophobic sweetener as described in U.S. Patent Application Publication 2003/0072842 A1 which is incorporated in its entirety herein by reference. For example, such hydrophobic sweeteners include those of the formulae I-XI as set forth below:

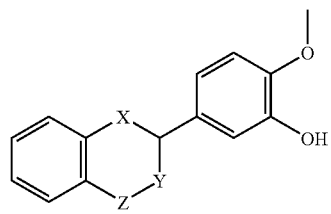

I wherein X, Y and Z are selected from the group consisting of $CH_2$, O and S;

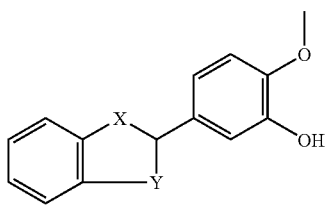

II wherein X and Y are selected from the group consisting of S and O;

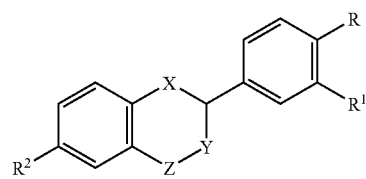

III wherein X is S or O; Y is O or $CH_2$; Z is $CH_2$, $SO_2$ or S; R is $OCH_3$, OH or H; $R^1$ is SH or OH and $R^2$ is H or OH;

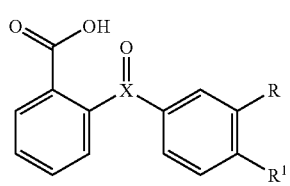

IV wherein X is C or S; R is OH or H and $R^1$ is $OCH_3$ or OH;

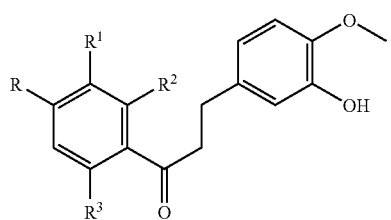

V wherein R, $R^2$ and $R^3$ are OH or H and $R^1$ is H or COOH;

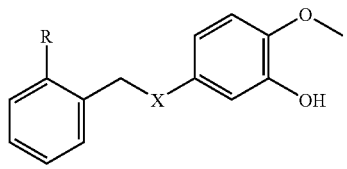

VI wherein X is O or $CH_2$ and R is COOH or H;

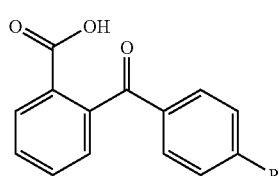

VII wherein R is $CH_3CH_2$, OH, $N(CH3)_2$ or Cl;

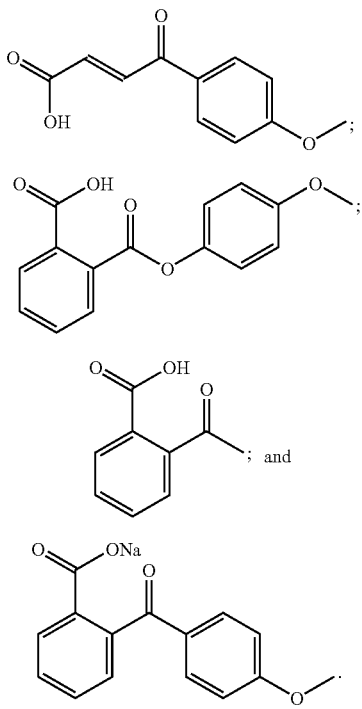

Perillartine may also be added as described in U.S. Pat. No. 6,159,509 also incorporated in its entirety herein by reference.

Food Acid Ingredients

Acids can include, but are not limited to acetic acid, adipic acid, ascorbic acid, butyric acid, citric acid, formic acid, fumaric acid, glyconic acid, lactic acid, phosphoric acid, malic acid, oxalic acid, succinic acid, tartaric acid and combinations thereof.

Micronutrient Ingredients

Micronutrients can include materials that have an impact on the nutritional well being of an organism even though the quantity required by the organism to have the desired effect is small relative to macronutrients such as protein, carbohydrate, and fat. Micronutrients can include, but are not limited to vitamins, minerals, enzymes, phytochemicals, antioxidants, and combinations thereof.

In some embodiments, vitamins can include fat soluble vitamins such as vitamin A, vitamin D, vitamin E, and vitamin K and combinations thereof. In some embodiments, vitamins can include water soluble vitamins such as vitamin C (ascorbic acid), the B vitamins (thiamine or $B_1$, riboflavin or $B_2$, niacin or $B_3$, pyridoxine or $B_6$, folic acid or $B_9$, cyanocobalimin or $B_{12}$, pantothenic acid, biotin), and combinations thereof.

In some embodiments minerals can include but are not limited to sodium, magnesium, chromium, iodine, iron, manganese, calcium, copper, fluoride, potassium, phosphorous, molybdenum, selenium, zinc, and combinations thereof.

In some embodiments micronutrients can include but are not limited to L-carnitine, choline, coenzyme Q10, alpha-lipoic acid, omega-3-fatty acids, pepsin, phytase, trypsin, lipases, proteases, cellulases, and combinations thereof.

Antioxidants can include materials that scavenge free radicals. In some embodiments, antioxidants can include but are not limited to ascorbic acid, citric acid, rosemary oil, vitamin A, vitamin E, vitamin E phosphate, tocopherols, di-alpha-tocopheryl phosphate, tocotrienols, alpha lipoic acid, dihydrolipoic acid, xanthophylls, beta cryptoxanthin, lycopene, lutein, zeaxanthin, astaxanthin, beta-carotene, carotenes, mixed carotenoids, polyphenols, flavonoids, and combinations thereof.

In some embodiments phytochemicals can include but are not limited to cartotenoids, chlorophyll, chlorophyllin, fiber, flavanoids, anthocyanins, cyaniding, delphinidin, malvidin, pelargonidin, peonidin, petunidin, flavanols, catechin, epicatechin, epigallocatechin, epigallocatechingallate, theaflavins, thearubigins, proanthocyanins, flavonols, quercetin, kaempferol, myricetin, isorhamnetin, flavononeshesperetin, naringenin, eriodictyol, tangeretin, flavones, apigenin, luteolin, lignans, phytoestrogens, resveratrol, isoflavones, daidzein, genistein, glycitein, soy isoflavones, and combinations thereof.

Mouth Moistening Ingredients

Mouth moisteners can include, but are not limited to, saliva stimulators such as acids and salts and combinations thereof. In some embodiments, acids can include acetic acid, adipic acid, ascorbic acid, butyric acid, citric acid, formic acid, fumaric acid, glyconic acid, lactic acid, phosphoric acid, malic acid, oxalic acid, succinic acid, tartaric acid and combinations thereof.

Mouth moisteners can also include hydrocolloid materials that hydrate and may adhere to oral surface to provide a sensation of mouth moistening. Hydrocolloid materials can include naturally occurring materials such as plant exudates, seed gums, and seaweed extracts or they can be chemically modified materials such as cellulose, starch, or natural gum derivatives. In some embodiments, hydrocolloid materials can include pectin, gum arabic, acacia gum, alginates, agar, carageenans, guar gum, xanthan gum, locust bean gum, gelatin, gellan gum, galactomannans, tragacanth gum, karaya gum, curdlan, konjac, chitosan, xyloglucan, beta glucan, furcellaran, gum ghatti, tamarin, bacterial gums, and combinations thereof. Additionally, in some embodiments, modified natural gums such as propylene glycol alginate, carboxymethyl locust bean gum, low methoxyl pectin, and their combinations can be included. In some embodiments, modified celluloses can be included such as microcrystalline cellulose, carboxymethlcellulose (CMC), methylcellulose (MC), hydroxypropylmethylcellulose (HPCM), and hydroxypropylcellulose (MPC), and combinations thereof.

Similarly, humectants which can provide a perception of mouth hydration can be included. Such humectants can include, but are not limited to glycerol, sorbitol, polyethylene glycol, erythritol, and xylitol. Additionally, in some embodiments, fats can provide a perception of mouth moistening. Such fats can include medium chain triglycerides, vegetable oils, fish oils, mineral oils, and combinations thereof.

Throat Care Ingredients

Throat soothing ingredients can include analgesics, anesthetics, demulcents, antiseptic, and combinations thereof. In some embodiments, analgesics/anesthetics can include menthol, phenol, hexylresorcinol, benzocaine, dyclonine hydrochloride, benzyl alcohol, salicyl alcohol, and combinations thereof. In some embodiments, demulcents can include but are not limited to slippery elm bark, pectin, gelatin, and combinations thereof. In some embodiments, antiseptic ingredients can include cetylpyridinium chloride, domiphen bromide, dequalinium chloride, and combinations thereof.

In some embodiments, antitussive ingredients such as chlophedianol hydrochloride, codeine, codeine phosphate, codeine sulfate, dextromethorphan, dextromethorphan hydrobromide, diphenhydramine citrate, and diphenhydramine hydrochloride, and combinations thereof can be included.

In some embodiments, throat soothing agents such as honey, propolis, aloe vera, glycerine, menthol and combinations thereof can be included. In still other embodiments, cough suppressants can be included. Such cough suppressants can fall into two groups: those that alter the consistency or production of phlegm such as mucolytics and expectorants; and those that suppress the coughing reflex such as codeine (narcotic cough suppressants), antihistamines, dextromethorphan and isoproterenol (non-narcotic cough suppressants). In some embodiments, ingredients from either or both groups can be included.

In still other embodiments, antitussives can include, but are not limited to, the group consisting of codeine, dextromethorphan, dextrorphan, diphenhydramine, hydrocodone, noscapine, oxycodone, pentoxyverine and combinations thereof. In some embodiments, antihistamines can include, but are not limited to, acrivastine, azatadine, brompheniramine, chlorpheniramine, clemastine, cyproheptadine, dexbrompheniramine, dimenhydrinate, diphenhydramine, doxylamine, hydroxyzine, meclizine, phenindamine, phenyltoloxamine, promethazine, pyrilamine, tripelennamine, triprolidine and combinations thereof. In some embodiments, non-sedating antihistamines can include, but are not limited to, astemizole, cetirizine, ebastine, fexofenadine, loratidine, terfenadine, and combinations thereof.

In some embodiments, expectorants can include, but are not limited to, ammonium chloride, guaifenesin, ipecac fluid extract, potassium iodide and combinations thereof. In some embodiments, mucolytics can include, but are not limited to, acetylcycsteine, ambroxol, bromhexine and combinations thereof. In some embodiments, analgesic, antipyretic and anti-inflammatory agents can include, but are not limited to, acetaminophen, aspirin, diclofenac, diflunisal, etodolac, fenoprofen, flurbiprofen, ibuprofen, ketoprofen, ketorolac, nabumetone, naproxen, piroxicam, caffeine and mixtures thereof. In some embodiments, local anesthetics can include, but are not limited to, lidocaine, benzocaine, phenol, dyclonine, benzonotate and mixtures thereof.

In some embodiments nasal decongestants and ingredients that provide the perception of nasal clearing can be included. In some embodiments, nasal decongestants can include but are not limited to phenylpropanolamine, pseudoephedrine, ephedrine, phenylephrine, oxymetazoline, and combinations thereof. In some embodiments ingredients that provide a perception of nasal clearing can include but are not limited to menthol, camphor, borneol, ephedrine, eucalyptus oil, peppermint oil, methyl salicylate, bornyl acetate, lavender oil, wasabi extracts, horseradish extracts, and combinations thereof. In some embodiments, a perception of nasal clearing can be provided by odoriferous essential oils, extracts from woods, gums, flowers and other botanicals, resins, animal secretions, and synthetic aromatic materials.

In some embodiments, one or more colors can be included. As classified by the United States Food, Drug, and Cosmetic Act (21 C.F.R. 73), colors can include exempt from certification colors (sometimes referred to as natural even though they can be synthetically manufactured) and certified colors (sometimes referred to as artificial), or combinations thereof. In some embodiments, exempt from certification or natural colors can include, but are not limited to annatto extract, (E160b), bixin, norbixin, astaxanthin, dehydrated beets (beet powder), beetroot red/betanin (E162), ultramarine blue, canthaxanthin (E161g), cryptoxanthin (E161c), rubixanthin (E161d), violanxanthin (E161e), rhodoxanthin (E161f), caramel (E150(a-d)), β-apo-8'-carotenal (E160e), β-carotene (E160a), alpha carotene, gamma carotene, ethyl ester of beta-apo-8 carotenal (E160f), flavoxanthin (E161a), lutein (E161b), cochineal extract (E120); carmine (E132), carmoisine/azorubine (E122), sodium copper chlorophyllin (E141), chlorophyll (E140), toasted partially defatted cooked cottonseed flour, ferrous gluconate, ferrous lactate, grape color extract, grape skin extract (enocianina), anthocyanins (E163), haematococcus algae meal, synthetic iron oxide, iron oxides and hydroxides (E172), fruit juice, vegetable juice, dried algae meal, tagetes (Aztec marigold) meal and extract, carrot oil, corn endosperm oil, paprika, paprika oleoresin, phaffia yeast, riboflavin (E101), saffron, titanium dioxide, turmeric (E100), turmeric oleoresin, amaranth (E123), capsanthin/capsorbin (E160c), lycopene (E160d), and combinations thereof.

In some embodiments, certified colors can include, but are not limited to, FD&C blue #1, FD&C blue #2, FD&C green #3, FD&C red #3, FD&C red #40, FD&C yellow #5 and FD&C yellow #6, tartrazine (E102), quinoline yellow (E104), sunset yellow (E110), ponceau (E124), erythrosine (E127), patent blue V (E131), titanium dioxide (E171), aluminum (E173), silver (E174), gold (E175), pigment rubine/lithol rubine BK (E180), calcium carbonate (E170), carbon black (E153), black PN/brilliant black BN (E151), green S/acid brilliant green BS (E142), and combinations thereof. In some embodiments, certified colors can include FD&C aluminum lakes. These consist of the aluminum salts of FD&C dyes extended on an insoluble substrate of alumina hydrate. Additionally, in some embodiments, certified colors can be included as calcium salts.

Multiple Ingredients

In some embodiments, a delivery system or chewing gum may include two or more ingredients for which managed release from the chewing gum during consumption of the chewing gum is desired. In some embodiments, the ingredients may be encapsulated or otherwise included separately in different delivery systems. Alternatively, in some embodiments the ingredients may be encapsulated or otherwise included in the same delivery system. As another possibility, one or more of the ingredients may be free (e.g., unencapsulated) while one or more other ingredients may be encapsulated.

A chewing gum may include a group of ingredients for which managed release of the group during consumption of the chewing gum is desired. Groups of two or more ingredients for which managed release from a chewing gum during consumption of the chewing gum may be desired include, but are not limited to: color and flavor, multiple flavors, multiple colors, cooling agent and flavor, warming agent and flavor, cooling agent and warming agent, cooling agent and high intensity sweetener, warming agent and high intensity sweetener, multiple cooling agents (e.g., WS-3 and WS-23, WS-3 and menthyl succinate), menthol and one or more cooling agents, menthol and one or more warming agents, multiple warming agents, high intensity sweetener(s) and tooth whitening active(s), high intensity sweetener(s) and breath freshening active(s), an ingredient with some bitterness and a bitterness suppressor for the ingredient, multiple high intensity sweeteners (e.g., ace-k and aspartame), multiple tooth whitening actives (e.g., an abrasive ingredient and an antimicrobial ingredient, a peroxide and a nitrate, a warming agent and a polyol, a cooling agent and a polyol, multiple polyols, a warming agent and micronutrient, a cooling agent and a micronutrient, a warming agent and a mouth moistening agent, a cooling agent and a mouth moistening agent, a warming agent and a throat care agent, a cooling agent and a throat care agent, a warming agent and a food acid, a cooling agent and food acid, a warming agent and an emulsifier/surfactant, a cooling agent and an emulsifier/surfactant, a warming agent and a color, a cooling agent and a color, a warming agent and a flavor potentiator, a cooling agent and a flavor potentiator, a warming agent with sweetness potentiator, a cooling agent with a sweetness potentiator, a warming agent and an appetite suppressant, a cooling agent and an appetite suppressant, a high intensity sweetener and a flavor, a cooling agent and a teeth whitening agent, a warming agent and a teeth whitening agent, a warming agent and breath freshening agent, a cooling agent and a breath freshening agent, a cooling agent and an effervescing system, a warming agent and an effervescing system, a warming agent and an antimicrobial agent, a cooling agent and an antimicrobial agent, multiple anticalculus ingredients, multiple remineralization ingredients, multiple surfactants, remineralization ingredients with demineralization ingredients, acidic ingredients with acid buffering ingredients, anticalculus ingredients with antibacterial ingredients, remineralization ingredients with anticalculus ingredients, anticalculus ingredients with remineralization ingredients with antibacterial ingredients, surfactant ingredients with anticalculus ingredients, surfactant ingredients with antibacterial ingredients, surfactant ingredients with remineralization ingredients, surfactants with anticalculus ingredients with antibacterial ingredients, multiple types of vitamins or minerals, multiple micronutrients, multiple acids, multiple antimicrobial ingredients, multiple breath freshening ingredients, breath freshening ingredients and antimicrobial ingredients, multiple appetite suppressors, acids and bases that react to effervesce, a bitter compound with a high intensity sweetener, a cooling agent and an appetite suppressant, a warming agent and an appetite suppressant, a high intensity sweetener and an appetite suppressant, a high intensity sweetener with an acid, a probiotic ingredient and a prebiotic ingredient, a vitamin and a mineral, a metabolic enhancement ingredient with a macronutrient, a metabolic enhancement ingredient with a micronutrient, an enzyme with a substrate, a high intensity sweetener with a sweetness potentiator, a cooling compound with a cooling potentiator, a flavor with a flavor potentiator, a warming compound with a warming potentiator, a flavor with salt, a high intensity sweetener with salt, an acid with salt, a cooling compound with salt, a warming compound with salt, a flavor with a surfactant, an astringent compound with an ingredient to provide a sensation of hydration, etc. In some embodiments, the multiple ingredients may be part of the same delivery system or may be part of different delivery systems. Different delivery systems may use the same or different encapsulating materials.

Illustrations of the encapsulation of multiple ingredients can be found in examples provided herein. Typically, encapsulation of the multiple ingredients will result in a delay in the release of the predominant amount of the multiple ingredients during consumption of a chewing gum that includes the encapsulated multiple ingredients (e.g., as part of a delivery system added as an ingredient to the chewing gum). This may be particularly helpful in situations wherein separate encapsulation of the ingredients may cause them to release with different release profiles. For example, different high intensity sweeteners may have different release profiles because they have different water solubilities or differences in other characteristics. Encapsulating them together may cause them to release more simultaneously.

In some embodiments, the release profile of the multiple ingredients can be managed for a gum by managing various characteristics of the multiple ingredients, the delivery system containing the multiple ingredients, and/or the chewing gum containing the delivery system and/or how the delivery system is made in a manner as previously discussed above.

The additional components, as described above, may be used in any region of the gum composition such as in the center-fill, the gum region or the coating as desired. Suitable amounts for the additional components are set forth in Table 1, below. The amounts in Table 1 generally apply to each of the additional components as they may be added to a gum composition in a free form, i.e., unencapsulated. In some embodiments, where the additional component is provided in an encapsulated form, an amount greater than those amounts as set forth in Table 1 may be used due to the modified release profile of the additional component. Also, because many of the additional components shown in Table 1 are optional, the amounts represent amounts used when the component is selected for inclusion in the composition. In other words, the lower limit of 0% is not included even though the additional component is an optional component.

The components listed in Table 1, below, may be added to any region of the center-fill gum in their encapsulated and/or unencapsulated forms, as well as in combination with any of the other optional components. For instance, a single component may be added to a center-fill gum in its encapsulated and unencapsulated forms. The two different forms of the component may be added to the same or different region of the center-fill gum in the same or different amounts.

In some embodiments, a single component may be added in two or more different encapsulated forms. In particular, two or more different encapsulating materials, such as different polymers, may be used to encapsulate two or more separate portions of the component. The different encapsulated forms of the same component may be added to the same or different region of the center-fill gum in the same or different amounts. Further, in some embodiments, an unencapsulated form of the same component may be added in combination with the two or more different encapsulated forms. The unencapsulated form of the component may be added to any region of the center-fill gum in the same or different amount from the encapsulated forms. Moreover, some embodiments may add an unencapsulated form of a similar component in combination with the two or more different encapsulated forms. For instance, two encapsulated forms of a single sweetener may be used in combination with an unencapsulated form of a different sweetener.

In some embodiments, combinations of two or more different components from Table 1, below, may be employed. In some embodiments, at least one of the components may be encapsulated, while at least one of the components may be unencapsulated. The multiple components may be the same type of component, e.g., two different sweeteners, or components from distinctly different categories, e.g., a sweetener and a warming agent. The different components may be added to the same or different regions of the center-fill gum in the same or different amounts.

Some embodiments may include multiple components from Table 1, below, each of which is encapsulated. The multiple encapsulated components may be included in the same or different regions of the gum in the same or different amounts. The multiple encapsulated components may be the same type of component or from distinctly different categories.

In some embodiments in which multiple encapsulated components are added to the center-fill gum composition, the multiple components may be encapsulated together or separately. In embodiments in which the multiple components are encapsulated together, the components may be mixed together and encapsulated by a single encapsulating material. In embodiments in which the multiple components are encapsulated separately, the material used to encapsulate the components may be the same or different.

TABLE 1

| Components | Coating | Centerfill | Gum Region |
|---|---|---|---|
| I. Sensates | | | |
| A. Cooling agents | | | |
| Menthol | 10-500 ppm | 10-500 ppm | 500-20,000 ppm |
| Xylitol | 5-80% | 5-95% | 5-80% |
| Erythritol | 5-80% | 5-95% | 5-80% |
| Menthane | 10-500 ppm | 10-500 ppm | 500-20,000 ppm |
| Menthone | 10-500 ppm | 10-500 ppm | 500-20,000 ppm |
| Menthyl acetate | 10-500 ppm | 10-500 ppm | 500-20,000 ppm |
| Menthyl salicylate | 10-500 ppm | 10-500 ppm | 500-20,000 ppm |
| WS-23 | 10-500 ppm | 10-500 ppm | 500-20,000 ppm |
| WS-3 | 10-500 ppm | 10-500 ppm | 500-20,000 ppm |
| Menthyl succinate | 10-500 ppm | 10-500 ppm | 500-20,000 ppm |
| 3,1-menthoxypropane 1,2-diol | 10-500 ppm | 10-500 ppm | 500-20,000 ppm |
| Glutarate esters | 10-500 ppm | 10-500 ppm | 500-20,000 ppm |
| dextrose | 10-500 ppm | 10-500 ppm | 500-20,000 ppm |
| sorbitol | 10-500 ppm | 10-500 ppm | 500-20,000 ppm |
| ketals | 10-500 ppm | 10-500 ppm | 500-20,000 ppm |
| menthone ketals | 10-500 ppm | 10-500 ppm | 500-20,000 ppm |
| menthone glycerol ketals | 10-500 ppm | 10-500 ppm | 500-20,000 ppm |
| substituted p-menthanes | 10-500 ppm | 10-500 ppm | 500-20,000 ppm |
| acyclic carboxamides | 10-500 ppm | 10-500 ppm | 500-20,000 ppm |
| mono menthyl glutarate | 10-500 ppm | 10-500 ppm | 500-20,000 ppm |
| substituted cyclohexanamides | 10-500 ppm | 10-500 ppm | 500-20,000 ppm |
| substituted cyclohexane carboxamides | 10-500 ppm | 10-500 ppm | 500-20,000 ppm |
| substituted ureas and sulfonamides | 10-500 ppm | 10-500 ppm | 500-20,000 ppm |
| substituted menthanols | 10-500 ppm | 10-500 ppm | 500-20,000 ppm |
| hydroxymethyl | 10-500 ppm | 10-500 ppm | 500-20,000 ppm |
| hydroxymethyl derivatives of p-menthane | 10-500 ppm | 10-500 ppm | 500-20,000 ppm |
| 2-mercapto-cyclo-decanone | 10-500 ppm | 10-500 ppm | 500-20,000 ppm |
| hydroxycarboxylic acids with 2-6 carbon atoms | 10-500 ppm | 10-500 ppm | 500-20,000 ppm |
| cyclohexanamides | 10-500 ppm | 10-500 ppm | 500-20,000 ppm |
| 1-isopulegol | 10-500 ppm | 10-500 ppm | 500-20,000 ppm |
| 3-(1-menthoxy)-2-methylpropane-1,2-diol | 10-500 ppm | 10-500 ppm | 500-20,000 ppm |
| p-menthane-2,3-diol | 10-500 ppm | 10-500 ppm | 500-20,000 ppm |
| p-menthane-3,8-diol | 10-500 ppm | 10-500 ppm | 500-20,000 ppm |
| 6-isopropyl-9-methyl-1,4-dioxaspiro[4,5]decane-2-methanol | 10-500 ppm | 10-500 ppm | 500-20,000 ppm |
| trimethylcyclohexanol | 10-500 ppm | 10-500 ppm | 500-20,000 ppm |
| N-ethyl-2-isopropyl-5-methylcyclohexanecarboxamide | 10-500 ppm | 10-500 ppm | 500-20,000 ppm |
| Japanese mint oil | 10-500 ppm | 10-500 ppm | 500-20,000 ppm |
| peppermint oil | 10-500 ppm | 10-500 ppm | 500-20,000 ppm |
| 3-(1-menthoxy)ethan-1-ol | 10-500 ppm | 10-500 ppm | 500-20,000 ppm |
| 3-(1-menthoxy)propan-1-ol | 10-500 ppm | 10-500 ppm | 500-20,000 ppm |
| 3-(1-menthoxy)butan-1-ol | 10-500 ppm | 10-500 ppm | 500-20,000 ppm |
| 1-menthylacetic acid N-ethylamide | 10-500 ppm | 10-500 ppm | 500-20,000 ppm |
| 1-menthyl-4-hydroxypentanoate | 10-500 ppm | 10-500 ppm | 500-20,000 ppm |
| 1-menthyl-3-hydroxybutyrate | 10-500 ppm | 10-500 ppm | 500-20,000 ppm |
| N,2,3-trimethyl-2-(1-methylethyl)-butanamide | 10-500 ppm | 10-500 ppm | 500-20,000 ppm |
| n-ethyl-t-2-c-6 nonadienamide | 10-500 ppm | 10-500 ppm | 500-20,000 ppm |
| N,N-dimethyl menthyl succinamide | 10-500 ppm | 10-500 ppm | 500-20,000 ppm |
| substituted p-menthane-carboxamides | 10-500 ppm | 10-500 ppm | 500-20,000 ppm |
| 2-isopropanyl-5-methylcyclohexanol | | | |
| menthyl lactate | 10-500 ppm | 10-500 ppm | 500-20,000 ppm |
| WS-30 | 10-500 ppm | 10-500 ppm | 500-20,000 ppm |
| WS-14 | 10-500 ppm | 10-500 ppm | 500-20,000 ppm |
| *Eucalyptus* extract | 10-500 ppm | 10-500 ppm | 500-20,000 ppm |
| Menthol PG carbonate | 10-500 ppm | 10-500 ppm | 500-20,000 ppm |
| Menthol EG carbonate | 10-500 ppm | 10-500 ppm | 500-20,000 ppm |
| Menthol glyceryl ether | 10-500 ppm | 10-500 ppm | 500-20,000 ppm |
| N-tertbutyl-p-menthane-3-carboxamide | 10-500 ppm | 10-500 ppm | 500-20,000 ppm |
| P-menthane-3-carboxylic acid glycerol ester | 10-500 ppm | 10-500 ppm | 500-20,000 ppm |

TABLE 1-continued

| Components | Coating | Centerfill | Gum Region |
|---|---|---|---|
| Methyl-2-isopryl-bicyclo (2.2.1) | 10-500 ppm | 10-500 ppm | 500-20,000 ppm |
| Heptane-2-carboxamide | 10-500 ppm | 10-500 ppm | 500-20,000 ppm |
| Menthol methyl ether | 10-500 ppm | 10-500 ppm | 500-20,000 ppm |
| Methyl glutarate | 10-500 ppm | 10-500 ppm | 500-20,000 ppm |
| menthyl pyrrolidone carboxylate | 10-500 ppm | 10-500 ppm | 500-20,000 ppm |
| WS-5 | 10-500 ppm | 10-500 ppm | 500-20,000 ppm |
| WS-15 | 10-500 ppm | 10-500 ppm | 500-20,000 ppm |
| B. Warming agents | | | |
| vanillyl alcohol n-butylether | 1-1000 ppm | 1-1500 ppm | 10-8000 ppm |
| vanillyl alcohol n-propylether | 1-1000 ppm | 1-1500 ppm | 10-8000 ppm |
| vanillyl alcohol isopropylether | 1-1000 ppm | 1-1500 ppm | 10-8000 ppm |
| vanillyl alcohol isobutylether | 1-1000 ppm | 1-1500 ppm | 10-8000 ppm |
| vanillyl alcohol n-aminoether | 1-1000 ppm | 1-1500 ppm | 10-8000 ppm |
| vanillyl alcohol isoamylether | 1-1000 ppm | 1-1500 ppm | 10-8000 ppm |
| vanillyl alcohol n-hexylether | 1-1000 ppm | 1-1500 ppm | 10-8000 ppm |
| vanillyl alcohol methylether | 1-1000 ppm | 1-1500 ppm | 10-8000 ppm |
| vanillyl alcohol ethylether | 1-1000 ppm | 1-1500 ppm | 10-8000 ppm |
| Gingerol | 1-1000 ppm | 1-1500 ppm | 10-8000 ppm |
| Shogaol | 1-1000 ppm | 1-1500 ppm | 10-8000 ppm |
| Paradol | 1-1000 ppm | 1-1500 ppm | 10-8000 ppm |
| Zingerone | 1-1000 ppm | 1-1500 ppm | 10-8000 ppm |
| Capsaicin | 1-1000 ppm | 1-1500 ppm | 10-8000 ppm |
| dihydrocapsaicin | 1-1000 ppm | 1-1500 ppm | 10-8000 ppm |
| nordihydrocapsaicin | 1-1000 ppm | 1-1500 ppm | 10-8000 ppm |
| Homocapsaicin | 1-1000 ppm | 1-1500 ppm | 10-8000 ppm |
| homodihydrocapsaicin | 1-1000 ppm | 1-1500 ppm | 10-8000 ppm |
| Ethanol | 1-1000 ppm | 1-1500 ppm | 10-8000 ppm |
| isopropyl alcohol | 1-1000 ppm | 1-1500 ppm | 10-8000 ppm |
| iso-amylalcohol | 1-1000 ppm | 1-1500 ppm | 10-8000 ppm |
| benzyl alcohol | 1-1000 ppm | 1-1500 ppm | 10-8000 ppm |
| Glycerine | 1-1000 ppm | 1-1500 ppm | 10-8000 ppm |
| Chloroform | 1-1000 ppm | 1-1500 ppm | 10-8000 ppm |
| Eugenol | 1-1000 ppm | 1-1500 ppm | 10-8000 ppm |
| cinnamon oil | 1-1000 ppm | 1-1500 ppm | 10-8000 ppm |
| cinnamic aldehyde | 1-1000 ppm | 1-1500 ppm | 10-8000 ppm |
| C. Tingling agents | | | |
| Jambu Oleoresin or para cress | 5-500 ppm | 5-500 ppm | 50-5000 ppm |
| Japanese pepper extract | 5-500 ppm | 5-500 ppm | 50-5000 ppm |
| black pepper extract | 5-500 ppm | 5-500 ppm | 50-5000 ppm |
| *Echinacea* extract | 5-500 ppm | 5-500 ppm | 50-5000 ppm |
| Northern Prickly Ash extract | 5-500 ppm | 5-500 ppm | 50-5000 ppm |
| red pepper oleoresin | 5-500 ppm | 5-500 ppm | 50-5000 ppm |
| effervescing agents | 5-500 ppm | 5-500 ppm | 50-5000 ppm |
| Spilanthol | 5-500 ppm | 5-500 ppm | 50-5000 ppm |
| Sanshool | 5-500 ppm | 5-500 ppm | 50-5000 ppm |
| II. Flavors | | | |
| spearmint oil | 0.01-10.0% | 0.01-10.0% | 0.5-30.0% |
| cinnamon oil | 0.01-10.0% | 0.01-10.0% | 0.5-30.0% |
| oil of wintergreen | 0.01-10.0% | 0.01-10.0% | 0.5-30.0% |
| peppermint oil | 0.01-10.0% | 0.01-10.0% | 0.5-30.0% |
| clove oil | 0.01-10.0% | 0.01-10.0% | 0.5-30.0% |
| bay oil | 0.01-10.0% | 0.01-10.0% | 0.5-30.0% |
| anise oil | 0.01-10.0% | 0.01-10.0% | 0.5-30.0% |
| *eucalyptus* oil | 0.01-10.0% | 0.01-10.0% | 0.5-30.0% |
| thyme oil | 0.01-10.0% | 0.01-10.0% | 0.5-30.0% |
| cedar leaf oil | 0.01-10.0% | 0.01-10.0% | 0.5-30.0% |
| oil of nutmeg | 0.01-10.0% | 0.01-10.0% | 0.5-30.0% |
| Allspice | 0.01-10.0% | 0.01-10.0% | 0.5-30.0% |
| oil of sage | 0.01-10.0% | 0.01-10.0% | 0.5-30.0% |
| Mace | 0.01-10.0% | 0.01-10.0% | 0.5-30.0% |
| oil of bitter almonds | 0.01-10.0% | 0.01-10.0% | 0.5-30.0% |
| cassia oil | 0.01-10.0% | 0.01-10.0% | 0.5-30.0% |
| Vanilla | 0.01-10.0% | 0.01-10.0% | 0.5-30.0% |
| Lemon | 0.01-10.0% | 0.01-10.0% | 0.5-30.0% |
| Orange | 0.01-10.0% | 0.01-10.0% | 0.5-30.0% |
| Lime | 0.01-10.0% | 0.01-10.0% | 0.5-30.0% |
| Grapefruit | 0.01-10.0% | 0.01-10.0% | 0.5-30.0% |
| Apple | 0.01-10.0% | 0.01-10.0% | 0.5-30.0% |
| Pear | 0.01-10.0% | 0.01-10.0% | 0.5-30.0% |
| Peach | 0.01-10.0% | 0.01-10.0% | 0.5-30.0% |
| Grape | 0.01-10.0% | 0.01-10.0% | 0.5-30.0% |
| Strawberry | 0.01-10.0% | 0.01-10.0% | 0.5-30.0% |

TABLE 1-continued

| Components | Coating | Centerfill | Gum Region |
|---|---|---|---|
| Raspberry | 0.01-10.0% | 0.01-10.0% | 0.5-30.0% |
| Cherry | 0.01-10.0% | 0.01-10.0% | 0.5-30.0% |
| Plum | 0.01-10.0% | 0.01-10.0% | 0.5-30.0% |
| Pineapple | 0.01-10.0% | 0.01-10.0% | 0.5-30.0% |
| Apricot | 0.01-10.0% | 0.01-10.0% | 0.5-30.0% |
| Watermelon | 0.01-10.0% | 0.01-10.0% | 0.5-30.0% |
| Chocolate | 0.01-10.0% | 0.01-10.0% | 0.5-30.0% |
| Cola | 0.01-10.0% | 0.01-10.0% | 0.5-30.0% |
| Maple | 0.01-10.0% | 0.01-10.0% | 0.5-30.0% |
| dulce de leche | 0.01-10.0% | 0.01-10.0% | 0.5-30.0% |
| Raisin | 0.01-10.0% | 0.01-10.0% | 0.5-30.0% |
| Caramel | 0.01-10.0% | 0.01-10.0% | 0.5-30.0% |
| cinnamyl acetate | 0.01-10.0% | 0.01-10.0% | 0.5-30.0% |
| cinnamaldehyde | 0.01-10.0% | 0.01-10.0% | 0.5-30.0% |
| citral diethylacetal | 0.01-10.0% | 0.01-10.0% | 0.5-30.0% |
| dihydrocarvyl acetate | 0.01-10.0% | 0.01-10.0% | 0.5-30.0% |
| eugenyl formate | 0.01-10.0% | 0.01-10.0% | 0.5-30.0% |
| p-methylamisol | 0.01-10.0% | 0.01-10.0% | 0.5-30.0% |
| acetaldehyde | 0.01-10.0% | 0.01-10.0% | 0.5-30.0% |
| Benzaldehyde | 0.01-10.0% | 0.01-10.0% | 0.5-30.0% |
| anisic aldehyde | 0.01-10.0% | 0.01-10.0% | 0.5-30.0% |
| cinnamic aldehyde | 0.01-10.0% | 0.01-10.0% | 0.5-30.0% |
| Citral | 0.01-10.0% | 0.01-10.0% | 0.5-30.0% |
| Neral | 0.01-10.0% | 0.01-10.0% | 0.5-30.0% |
| decanal | 0.01-10.0% | 0.01-10.0% | 0.5-30.0% |
| ethyl vanillin | 0.01-10.0% | 0.01-10.0% | 0.5-30.0% |
| Heliotrope | 0.01-10.0% | 0.01-10.0% | 0.5-30.0% |
| vanillin | 0.01-10.0% | 0.01-10.0% | 0.5-30.0% |
| alpha-amyl cinnamaldehyde | 0.01-10.0% | 0.01-10.0% | 0.5-30.0% |
| butyraldehyde | 0.01-10.0% | 0.01-10.0% | 0.5-30.0% |
| valeraldehyde | 0.01-10.0% | 0.01-10.0% | 0.5-30.0% |
| citronellal | 0.01-10.0% | 0.01-10.0% | 0.5-30.0% |
| decanal | 0.01-10.0% | 0.01-10.0% | 0.5-30.0% |
| aldehyde C-8 | 0.01-10.0% | 0.01-10.0% | 0.5-30.0% |
| aldehyde C-9 | 0.01-10.0% | 0.01-10.0% | 0.5-30.0% |
| aldehyde C-12 | 0.01-10.0% | 0.01-10.0% | 0.5-30.0% |
| 2-ethyl butyraldehyde | 0.01-10.0% | 0.01-10.0% | 0.5-30.0% |
| Hexenal | 0.01-10.0% | 0.01-10.0% | 0.5-30.0% |
| tolyl aldehyde | 0.01-10.0% | 0.01-10.0% | 0.5-30.0% |
| veratraldehyde | 0.01-10.0% | 0.01-10.0% | 0.5-30.0% |
| 2,6-dimethyl-5-heptenal | 0.01-10.0% | 0.01-10.0% | 0.5-30.0% |
| 2,6-dimethyloctanal | 0.01-10.0% | 0.01-10.0% | 0.5-30.0% |
| 2-dodecenal | 0.01-10.0% | 0.01-10.0% | 0.5-30.0% |
| strawberry shortcake | 0.01-10.0% | 0.01-10.0% | 0.5-30.0% |
| Pomegranate | 0.01-10.0% | 0.01-10.0% | 0.5-30.0% |
| Beef | 0.01-10.0% | 0.01-10.0% | 0.5-30.0% |
| Chicken | 0.01-10.0% | 0.01-10.0% | 0.5-30.0% |
| Cheese | 0.01-10.0% | 0.01-10.0% | 0.5-30.0% |
| Onion | 0.01-10.0% | 0.01-10.0% | 0.5-30.0% |
| III. Tastes | | | |
| A. Sweeteners | | | |
| sucrose | 5-100% | 5-100% | 5-80% |
| Dextrose | 5-100% | 5-100% | 5-80% |
| Maltose | 5-100% | 5-100% | 5-80% |
| Dextrin | 5-100% | 5-100% | 5-80% |
| Xylose | 5-100% | 5-100% | 5-80% |
| Ribose | 5-100% | 5-100% | 5-80% |
| Glucose | 5-100% | 5-100% | 5-80% |
| Mannose | 5-100% | 5-100% | 5-80% |
| Galactose | 5-100% | 5-100% | 5-80% |
| fructose | 5-100% | 5-100% | 5-80% |
| invert sugar | 5-100% | 5-100% | 5-80% |
| fructo oligo saccharide syrups | 5-100% | 5-100% | 5-80% |
| partially hydrolyzed starch | 5-100% | 5-100% | 5-80% |
| corn syrup solids | 5-100% | 5-100% | 5-80% |
| Sorbitol | 5-100% | 5-100% | 5-80% |
| Xylitol | 5-100% | 5-100% | 5-80% |
| Mannitol | 5-100% | 5-100% | 5-80% |
| Galactitol | 5-100% | 5-100% | 5-80% |
| Maltitol | 5-100% | 5-100% | 5-80% |
| Isomalt | 5-100% | 5-100% | 5-80% |
| Lactitol | 5-100% | 5-100% | 5-80% |
| Erythritol | 5-100% | 5-100% | 5-80% |
| hydrogenated starch hydrolysate | 5-100% | 5-100% | 5-80% |
| stevia | 10-20,000 ppm | 10-20,000 ppm | 10-20,000 ppm |

TABLE 1-continued

| Components | Coating | Centerfill | Gum Region |
|---|---|---|---|
| dihydrochalcones | 10-20,000 ppm | 10-20,000 ppm | 10-20,000 ppm |
| Monellin | 10-20,000 ppm | 10-20,000 ppm | 10-20,000 ppm |
| Steviosides | 10-20,000 ppm | 10-20,000 ppm | 10-20,000 ppm |
| Glycyrrhizin | 10-20,000 ppm | 10-20,000 ppm | 10-20,000 ppm |
| Dihydroflavenol | 10-20,000 ppm | 10-20,000 ppm | 10-20,000 ppm |
| L-aminodicarboxylic acid aminoalkenoic acid ester amides | 10-20,000 ppm | 10-20,000 ppm | 10-20,000 ppm |
| sodium or calcium saccharin salts | 10-20,000 ppm | 10-20,000 ppm | 10-20,000 ppm |
| cyclamate salts | 10-20,000 ppm | 10-20,000 ppm | 10-20,000 ppm |
| sodium, ammonium or calcium salt of 3,4-dihydro-6-methyl-1,2,3-oxathiazine-4-one-2,2-dioxide | 10-20,000 ppm | 10-20,000 ppm | 10-20,000 ppm |
| Acesulfame-K | 10-20,000 ppm | 10-20,000 ppm | 10-20,000 ppm |
| free acid form of saccharin | 10-20,000 ppm | 10-20,000 ppm | 10-20,000 ppm |
| Aspartame | 10-20,000 ppm | 10-20,000 ppm | 10-20,000 ppm |
| Alitame | 10-20,000 ppm | 10-20,000 ppm | 10-20,000 ppm |
| Neotame | 10-20,000 ppm | 10-20,000 ppm | 10-20,000 ppm |
| methyl esters of L-aspartyl-L-phenylglycerine and L-aspartyl-L-2,5-dihydrophenyl-glycine | 10-20,000 ppm | 10-20,000 ppm | 10-20,000 ppm |
| L-aspartyl-2,5-dihydro-L-phenylalanine | 10-20,000 ppm | 10-20,000 ppm | 10-20,000 ppm |
| L-aspartyl-L-(1-cyclohexen)-alanine | 10-20,000 ppm | 10-20,000 ppm | 10-20,000 ppm |
| Sucralose | 10-20,000 ppm | 10-20,000 ppm | 10-20,000 ppm |
| 1-chloro-1'-deoxysucrose | 10-20,000 ppm | 10-20,000 ppm | 10-20,000 ppm |
| 4-chloro-4-deoxy-alpha-D-galactopyranosyl-alpha-D-fructofuranoside | 10-20,000 ppm | 10-20,000 ppm | 10-20,000 ppm |
| 4-chloro-4-deoxygalactosucrose | 10-20,000 ppm | 10-20,000 ppm | 10-20,000 ppm |
| 4-chloro-4-deoxy-alpha-D-galactopyranosyl-1-chloro-1-deoxy-beta-D-fructo-furanoside | 10-20,000 ppm | 10-20,000 ppm | 10-20,000 ppm |
| 4,1'-dichloro-4,1'-dideoxygalactosucrose | 10-20,000 ppm | 10-20,000 ppm | 10-20,000 ppm |
| 1',6'-dichloro1',6'-dideoxysucrose | 10-20,000 ppm | 10-20,000 ppm | 10-20,000 ppm |
| 4-chloro-4-deoxy-alpha-D-galactopyranosyl-1,6-dichloro-1,6-dideoxy-beta-D-fructofuranoside | 10-20,000 ppm | 10-20,000 ppm | 10-20,000 ppm |
| 4,1',6'-trichloro-4,1',6'-trideoxygalactosucrose | 10-20,000 ppm | 10-20,000 ppm | 10-20,000 ppm |
| 4,6-dichloro-4,6-dideoxy-alpha-D-galactopyranosyl-6-chloro-6-deoxy-beta-D-fructofuranoside | 10-20,000 ppm | 10-20,000 ppm | 10-20,000 ppm |
| 4,6,6'-trichloro-4,6,6'-trideoxygalactosucrose | 10-20,000 ppm | 10-20,000 ppm | 10-20,000 ppm |
| 6,1',6'-trichloro-6,1',6'-trideoxysucrose | 10-20,000 ppm | 10-20,000 ppm | 10-20,000 ppm |
| 4,6-dichloro-4,6-dideoxy-alpha-D-galacto-pyranosyl-1,6-dichloro-1,6-dideoxy-beta-D-fructofuranoside | 10-20,000 ppm | 10-20,000 ppm | 10-20,000 ppm |
| 4,6,1',6'-tetrachloro4,6,1',6'-tetradeoxygalacto-sucrose | 10-20,000 ppm | 10-20,000 ppm | 10-20,000 ppm |
| 4,6,1',6'-tetradeoxy-sucrose | 10-20,000 ppm | 10-20,000 ppm | 10-20,000 ppm |
| Thaumatin I and II | 10-20,000 ppm | 10-20,000 ppm | 10-20,000 ppm |
| Monatin | 10-20,000 ppm | 10-20,000 ppm | 10-20,000 ppm |
| B. Sour | | | |
| acetic acid | 0.00005-10% | 0.00005-10% | 0.00005-10% |
| adipic acid | 0.00005-10% | 0.00005-10% | 0.00005-10% |
| ascorbic acid | 0.00005-10% | 0.00005-10% | 0.00005-10% |
| butyric acid | 0.00005-10% | 0.00005-10% | 0.00005-10% |
| citric acid | 0.00005-10% | 0.00005-10% | 0.00005-10% |
| formic acid | 0.00005-10% | 0.00005-10% | 0.00005-10% |
| fumaric acid | 0.00005-10% | 0.00005-10% | 0.00005-10% |
| glyconic acid | 0.00005-10% | 0.00005-10% | 0.00005-10% |
| lactic acid | 0.00005-10% | 0.00005-10% | 0.00005-10% |
| phosphoric acid | 0.00005-10% | 0.00005-10% | 0.00005-10% |
| malic acid | 0.00005-10% | 0.00005-10% | 0.00005-10% |

TABLE 1-continued

| Components | Coating | Centerfill | Gum Region |
|---|---|---|---|
| oxalic acid | 0.00005-10% | 0.00005-10% | 0.00005-10% |
| succinic acid | 0.00005-10% | 0.00005-10% | 0.00005-10% |
| tartaric acid | 0.00005-10% | 0.00005-10% | 0.00005-10% |
| C. Bitter/Astringent | | | |
| Quinine | 0.01-100 ppm | 0.01-100 ppm | 0.01-100 ppm |
| Naringin | 0.01-100 ppm | 0.01-100 ppm | 0.01-100 ppm |
| Quassia | 0.01-100 ppm | 0.01-100 ppm | 0.01-100 ppm |
| phenyl thiocarbamide (PTC) | 0.01-100 ppm | 0.01-100 ppm | 0.01-100 ppm |
| 6-n-propylthiouracil (Prop) | 0.01-100 ppm | 0.01-100 ppm | 0.01-100 ppm |
| Alum | 0.01-100 ppm | 0.01-100 ppm | 0.01-100 ppm |
| Salicin | 0.01-100 ppm | 0.01-100 ppm | 0.01-100 ppm |
| Caffeine | 0.01-100 ppm | 0.01-100 ppm | 0.01-100 ppm |
| D. Salty | | | |
| sodium chloride | 0.01-1% | 0.01-1% | 0.01-1% |
| calcium chloride | 0.01-1% | 0.01-1% | 0.01-1% |
| potassium chloride | 0.01-1% | 0.01-1% | 0.01-1% |
| l-lysine | 0.01-1% | 0.01-1% | 0.01-1% |
| IV. Functional agents | | | |
| A. Surfactants | | | |
| salts of fatty acids selected from the group consisting of $C_8$-$C_{24}$ | 0.001-2% | 0.001-2% | 0.001-2% |
| palmitoleic acid | 0.001-2% | 0.001-2% | 0.001-2% |
| oleic acid | 0.001-2% | 0.001-2% | 0.001-2% |
| eleosteric acid | 0.001-2% | 0.001-2% | 0.001-2% |
| butyric acid | 0.001-2% | 0.001-2% | 0.001-2% |
| caproic acid | 0.001-2% | 0.001-2% | 0.001-2% |
| caprylic acid | 0.001-2% | 0.001-2% | 0.001-2% |
| capric acid | 0.001-2% | 0.001-2% | 0.001-2% |
| lauric acid | 0.001-2% | 0.001-2% | 0.001-2% |
| myristic acid | 0.001-2% | 0.001-2% | 0.001-2% |
| palmitic acid | 0.001-2% | 0.001-2% | 0.001-2% |
| stearic acid | 0.001-2% | 0.001-2% | 0.001-2% |
| ricinoleic acid | 0.001-2% | 0.001-2% | 0.001-2% |
| arachidic acid | 0.001-2% | 0.001-2% | 0.001-2% |
| behenic acid | 0.001-2% | 0.001-2% | 0.001-2% |
| lignoceric acid | 0.001-2% | 0.001-2% | 0.001-2% |
| cerotic acid | 0.001-2% | 0.001-2% | 0.001-2% |
| sulfated butyl oleate | 0.001-2% | 0.001-2% | 0.001-2% |
| medium and long chain fatty acid esters | 0.001-2% | 0.001-2% | 0.001-2% |
| sodium oleate | 0.001-2% | 0.001-2% | 0.001-2% |
| salts of fumaric acid | 0.001-2% | 0.001-2% | 0.001-2% |
| potassium glomate | 0.001-2% | 0.001-2% | 0.001-2% |
| organic acid esters of mono- and diglycerides | 0.001-2% | 0.001-2% | 0.001-2% |
| stearyl monoglyceridyl citrate | 0.001-2% | 0.001-2% | 0.001-2% |
| Succistearin | 0.001-2% | 0.001-2% | 0.001-2% |
| dioctyl sodium sulfosuccinate | 0.001-2% | 0.001-2% | 0.001-2% |
| glycerol tristearate | 0.001-2% | 0.001-2% | 0.001-2% |
| Lecithin | 0.001-2% | 0.001-2% | 0.001-2% |
| hydroxylated lecithin | 0.001-2% | 0.001-2% | 0.001-2% |
| sodium lauryl sulfate | 0.001-2% | 0.001-2% | 0.001-2% |
| acetylated monoglycerides | 0.001-2% | 0.001-2% | 0.001-2% |
| succinylated monoglycerides | 0.001-2% | 0.001-2% | 0.001-2% |
| monoglyceride citrate | 0.001-2% | 0.001-2% | 0.001-2% |
| ethoxylated mono- and diglycerides | 0.001-2% | 0.001-2% | 0.001-2% |
| sorbitan monostearate | 0.001-2% | 0.001-2% | 0.001-2% |
| calcium stearyl-2-lactylate | 0.001-2% | 0.001-2% | 0.001-2% |
| sodium stearyl lactylate | 0.001-2% | 0.001-2% | 0.001-2% |
| lactylated fatty acid esters of glycerol and propylene glycerol | 0.001-2% | 0.001-2% | 0.001-2% |
| glycerol-lactoesters of C8-C24 fatty acids | 0.001-2% | 0.001-2% | 0.001-2% |
| polyglycerol esters of C8-C24 fatty acids | 0.001-2% | 0.001-2% | 0.001-2% |
| propylene glycol alginate | 0.001-2% | 0.001-2% | 0.001-2% |
| sucrose C8-C24 fatty acid esters | 0.001-2% | 0.001-2% | 0.001-2% |
| diacetyl tartaric and citric acid esters of mono- and diglycerides | 0.001-2% | 0.001-2% | 0.001-2% |
| Triacetin | 0.001-2% | 0.001-2% | 0.001-2% |
| sarcosinate surfactants | 0.001-2% | 0.001-2% | 0.001-2% |
| isethionate surfactants | 0.001-2% | 0.001-2% | 0.001-2% |

TABLE 1-continued

| Components | Coating | Centerfill | Gum Region |
|---|---|---|---|
| tautate surfactants | 0.001-2% | 0.001-2% | 0.001-2% |
| Pluronics | 0.001-2% | 0.001-2% | 0.001-2% |
| polyethylene oxide condensates of alkyl phenols | 0.001-2% | 0.001-2% | 0.001-2% |
| products derived from the condensation of ethylene oxide with the reaction product of propylene oxide and ethylene diamine | 0.001-2% | 0.001-2% | 0.001-2% |
| ethylene oxide condensates of aliphatic alcohols | 0.001-2% | 0.001-2% | 0.001-2% |
| long chain tertiary amine oxides | 0.001-2% | 0.001-2% | 0.001-2% |
| long chain tertiary phosphine oxides | 0.001-2% | 0.001-2% | 0.001-2% |
| long chain dialkyl sulfoxides | 0.001-2% | 0.001-2% | 0.001-2% |
| B. Breath freshening agents | | | |
| spearmint oil | 0.001-10% | 0.001-10% | 0.001-10% |
| peppermint oil | 0.001-10% | 0.001-10% | 0.001-10% |
| wintergreen oil | 0.001-10% | 0.001-10% | 0.001-10% |
| *sassafras* oil | 0.001-10% | 0.001-10% | 0.001-10% |
| chlorophyll oil | 0.001-10% | 0.001-10% | 0.001-10% |
| citral oil | 0.001-10% | 0.001-10% | 0.001-10% |
| geraniol oil | 0.001-10% | 0.001-10% | 0.001-10% |
| cardamom oil | 0.001-10% | 0.001-10% | 0.001-10% |
| clove oil | 0.001-10% | 0.001-10% | 0.001-10% |
| sage oil | 0.001-10% | 0.001-10% | 0.001-10% |
| carvacrol oil | 0.001-10% | 0.001-10% | 0.001-10% |
| *eucalyptus* oil | 0.001-10% | 0.001-10% | 0.001-10% |
| cardamom oil | 0.001-10% | 0.001-10% | 0.001-10% |
| magnolia bark extract oil | 0.001-10% | 0.001-10% | 0.001-10% |
| marjoram oil | 0.001-10% | 0.001-10% | 0.001-10% |
| cinnamon oil | 0.001-10% | 0.001-10% | 0.001-10% |
| lemon oil | 0.001-10% | 0.001-10% | 0.001-10% |
| lime oil | 0.001-10% | 0.001-10% | 0.001-10% |
| grapefruit oil | 0.001-10% | 0.001-10% | 0.001-10% |
| orange oil | 0.001-10% | 0.001-10% | 0.001-10% |
| cinnamic aldehyde | 0.001-10% | 0.001-10% | 0.001-10% |
| Salicylaldehyde | 0.001-10% | 0.001-10% | 0.001-10% |
| Menthol | 0.001-10% | 0.001-10% | 0.001-10% |
| Carvone | 0.001-10% | 0.001-10% | 0.001-10% |
| iso-garrigol | 0.001-10% | 0.001-10% | 0.001-10% |
| anethole | 0.001-10% | 0.001-10% | 0.001-10% |
| zinc citrate | 0.01-25% | 0.01-25% | 0.1-15% |
| zinc acetate | 0.01-25% | 0.01-25% | 0.1-15% |
| zinc fluoride | 0.01-25% | 0.01-25% | 0.1-15% |
| zinc ammonium sulfate | 0.01-25% | 0.01-25% | 0.1-15% |
| zinc bromide | 0.01-25% | 0.01-25% | 0.1-15% |
| zinc iodide | 0.01-25% | 0.01-25% | 0.1-15% |
| zinc chloride | 0.01-25% | 0.01-25% | 0.1-15% |
| zinc nitrate | 0.01-25% | 0.01-25% | 0.1-15% |
| zinc flurosilicate | 0.01-25% | 0.01-25% | 0.1-15% |
| zinc gluconate | 0.01-25% | 0.01-25% | 0.1-15% |
| zinc tartarate | 0.01-25% | 0.01-25% | 0.1-15% |
| zinc succinate | 0.01-25% | 0.01-25% | 0.1-15% |
| zinc formate | 0.01-25% | 0.01-25% | 0.1-15% |
| zinc chromate | 0.01-25% | 0.01-25% | 0.1-15% |
| zinc phenol sulfonate | 0.01-25% | 0.01-25% | 0.1-15% |
| zinc dithionate | 0.01-25% | 0.01-25% | 0.1-15% |
| zinc sulfate | 0.01-25% | 0.01-25% | 0.1-15% |
| silver nitrate | 0.01-25% | 0.01-25% | 0.1-15% |
| zinc salicylate | 0.01-25% | 0.01-25% | 0.1-15% |
| zinc glycerophosphate | 0.01-25% | 0.01-25% | 0.1-15% |
| copper nitrate | 0.01-25% | 0.01-25% | 0.1-15% |
| Chlorophyll | 0.01-25% | 0.01-25% | 0.1-15% |
| copper chlorophyll | 0.01-25% | 0.01-25% | 0.1-15% |
| Chlorophyllin | 0.01-25% | 0.01-25% | 0.1-15% |
| hydrogenated cottonseed oil | 0.5-5% | 0.5-70% | 0.5-15% |
| chlorine dioxide | 0.025-0.50% | 0.025-0.50% | 0.025-0.50% |
| beta cyclodextrin | 0.1-5% | 0.1-5% | 0.1-5% |
| Zeolite | 0.1-5% | 0.1-5% | 0.1-5% |
| silica-based materials | 0.1-5% | 0.1-5% | 0.1-5% |
| carbon-based materials | 0.1-5% | 0.1-5% | 0.1-5% |
| enzymes such as laccase, papain, krillase, amylase, glucose oxidase | 0.1-5% | 0.1-5% | 0.1-5% |

TABLE 1-continued

| Components | Coating | Centerfill | Gum Region |
|---|---|---|---|
| C. Anti-microbial agents | | | |
| Cetylpyridinium chloride | 0.01-1% | 0.01-1% | 0.01-1% |
| zinc compounds | 0.01-25% | 0.01-25% | 0.1-15% |
| copper compounds | 0.01-25% | 0.01-25% | 0.1-15% |
| D. Antibacterial agents | | | |
| Chlorhexidine | 0.0025-2% | 0.0025-2% | 0.0025-2% |
| Alexidine | 0.0025-2% | 0.0025-2% | 0.0025-2% |
| quaternary ammonium salts | 0.0025-2% | 0.0025-2% | 0.0025-2% |
| benzethonium chloride | 0.0025-2% | 0.0025-2% | 0.0025-2% |
| cetyl pyridinium chloride | 0.0025-2% | 0.0025-2% | 0.0025-2% |
| 2,4,4'-trichloro-2'-hydroxy-diphenyl ether (triclosan) | 0.0025-2% | 0.0025-2% | 0.0025-2% |
| E. Anti-calculus agents | | | |
| Pyrophosphates | 1-6% | 1-6% | 1-6% |
| Triphosphates | 0.1-10% | 0.1-10% | 0.1-10% |
| Polyphosphates | 0.1-10% | 0.1-10% | 0.1-10% |
| polyphosphonates | 0.1-10% | 0.1-10% | 0.1-10% |
| dialkali metal pyrophosphate salt | 1-6% | 1-6% | 1-6% |
| tetra alkali polyphosphate salt | 0.1-10% | 0.1-10% | 0.1-10% |
| tetrasodium pyrophosphate | 1-6% | 1-6% | 1-6% |
| tetrapotassium pyrophosphate | 1-6% | 1-6% | 1-6% |
| sodium tripolyphosphate | 0.1-10% | 0.1-10% | 0.1-10% |
| F. Anti-plaque agents | | | |
| Chlorhexidine | 0.0025-2% | 0.0025-2% | 0.0025-2% |
| Triclosan | 0.01-2% | 0.01-2% | 0.01-2% |
| Hexetidine | 0.01-2% | 0.01-2% | 0.01-2% |
| zinc citrate | 0.01-25% | 0.01-25% | 0.1-15% |
| essential oils | 0.001-10% | 0.001-10% | 0.001-10% |
| sodium lauryl sulfate | 0.001-2% | 0.001-2% | 0.001-2% |
| G. Fluoride compounds | | | |
| sodium fluoride | 0.01-1% | 0.01-1% | 0.01-1% |
| sodium monofluorophosphate | 0.01-1% | 0.01-1% | 0.01-1% |
| stannous fluoride | 0.01-1% | 0.01-1% | 0.01-1% |
| H. Quaternary ammonium compounds | | | |
| Benzalkonium Chloride | 0.01-1% | 0.01-1% | 0.01-1% |
| Benzethonium Chloride | 0.01-1% | 0.01-1% | 0.01-1% |
| Cetalkonium Chloride | 0.01-1% | 0.01-1% | 0.01-1% |
| Cetrimide | 0.01-1% | 0.01-1% | 0.01-1% |
| Cetrimonium Bromide | 0.01-1% | 0.01-1% | 0.01-1% |
| Cetylpyridinium Chloride | 0.01-1% | 0.01-1% | 0.01-1% |
| Glycidyl Trimethyl Ammonium Chloride | 0.01-1% | 0.01-1% | 0.01-1% |
| Stearalkonium Chloride | 0.01-1% | 0.01-1% | 0.01-1% |
| I. Remineralization agents | | | |
| phosphopeptide-amorphous calcium phosphate | 0.1-5% | 0.1-5% | 0.1-5% |
| casein phosphoprotein-calcium phosphate complex | 0.1-5% | 0.1-5% | 0.1-5% |
| casein phosphopeptide-stabilized calcium phosphate | 0.1-5% | 0.1-5% | 0.1-5% |
| J. Pharmaceutical actives | | | |
| drugs or medicaments | 0.0001-10% | 0.0001-10% | 0.0001-10% |
| vitamins and other dietary supplements | 0.0001-10% | 0.0001-10% | 0.0001-10% |
| Minerals | 0.0001-10% | 0.0001-10% | 0.0001-10% |
| Caffeine | 0.0001-10% | 0.0001-10% | 0.0001-10% |
| Nicotine | 0.0001-10% | 0.0001-10% | 0.0001-10% |
| fruit juices | 2-10% | 2-60% | 1-15% |
| K. Micronutrients | | | |
| vitamin A | 0.0001-10% | 0.0001-10% | 0.0001-10% |
| vitamin D | 0.0001-10% | 0.0001-10% | 0.0001-10% |
| vitamin E | 0.0001-10% | 0.0001-10% | 0.0001-10% |
| vitamin K | 0.0001-10% | 0.0001-10% | 0.0001-10% |

TABLE 1-continued

| Components | Coating | Centerfill | Gum Region |
|---|---|---|---|
| vitamin C (ascorbic acid) | 0.0001-10% | 0.0001-10% | 0.0001-10% |
| B vitamins (thiamine or B1, riboflavoin or B2, niacin or B3, pyridoxine or B6, folic acid or B9, cyanocobalimin or B12, pantothenic acid, biotin) | 0.0001-10% | 0.0001-10% | 0.0001-10% |
| Sodium | 0.0001-10% | 0.0001-10% | 0.0001-10% |
| Magnesium | 0.0001-10% | 0.0001-10% | 0.0001-10% |
| Chromium | 0.0001-10% | 0.0001-10% | 0.0001-10% |
| Iodine | 0.0001-10% | 0.0001-10% | 0.0001-10% |
| Iron | 0.0001-10% | 0.0001-10% | 0.0001-10% |
| Manganese | 0.0001-10% | 0.0001-10% | 0.0001-10% |
| Calcium | 0.0001-10% | 0.0001-10% | 0.0001-10% |
| Copper | 0.0001-10% | 0.0001-10% | 0.0001-10% |
| Fluoride | 0.0001-10% | 0.0001-10% | 0.0001-10% |
| Potassium | 0.0001-10% | 0.0001-10% | 0.0001-10% |
| Phosphorous | 0.0001-10% | 0.0001-10% | 0.0001-10% |
| Molybdenum | 0.0001-10% | 0.0001-10% | 0.0001-10% |
| Selenium | 0.0001-10% | 0.0001-10% | 0.0001-10% |
| Zinc | 0.0001-10% | 0.0001-10% | 0.0001-10% |
| L-carnitine | 0.0001-10% | 0.0001-10% | 0.0001-10% |
| Choline | 0.0001-10% | 0.0001-10% | 0.0001-10% |
| coenzyme Q10 | 0.0001-10% | 0.0001-10% | 0.0001-10% |
| alpha-lipoic acid | 0.0001-10% | 0.0001-10% | 0.0001-10% |
| omega-3-fatty acids | 0.0001-10% | 0.0001-10% | 0.0001-10% |
| Pepsin | 0.0001-10% | 0.0001-10% | 0.0001-10% |
| Phytase | 0.0001-10% | 0.0001-10% | 0.0001-10% |
| Trypsin | 0.0001-10% | 0.0001-10% | 0.0001-10% |
| Lipases | 0.0001-10% | 0.0001-10% | 0.0001-10% |
| Proteases | 0.0001-10% | 0.0001-10% | 0.0001-10% |
| Cellulases | 0.0001-10% | 0.0001-10% | 0.0001-10% |
| ascorbic acid | 0.0001-10% | 0.0001-10% | 0.0001-10% |
| citric acid | 0.0001-10% | 0.0001-10% | 0.0001-10% |
| rosemary oil | 0.0001-10% | 0.0001-10% | 0.0001-10% |
| vitamin A | 0.0001-10% | 0.0001-10% | 0.0001-10% |
| vitamin E phosphate | 0.0001-10% | 0.0001-10% | 0.0001-10% |
| Tocopherols | 0.0001-10% | 0.0001-10% | 0.0001-10% |
| di-alpha-tocopheryl phosphate | 0.0001-10% | 0.0001-10% | 0.0001-10% |
| Tocotrienols | 0.0001-10% | 0.0001-10% | 0.0001-10% |
| alpha lipoic acid | 0.0001-10% | 0.0001-10% | 0.0001-10% |
| dihydrolipoic acid | 0.0001-10% | 0.0001-10% | 0.0001-10% |
| Xanthophylls | 0.0001-10% | 0.0001-10% | 0.0001-10% |
| beta cryptoxanthin | 0.0001-10% | 0.0001-10% | 0.0001-10% |
| Lycopene | 0.0001-10% | 0.0001-10% | 0.0001-10% |
| Lutein | 0.0001-10% | 0.0001-10% | 0.0001-10% |
| Zeaxanthin | 0.0001-10% | 0.0001-10% | 0.0001-10% |
| beta-carotene | 0.0001-10% | 0.0001-10% | 0.0001-10% |
| Carotenes | 0.0001-10% | 0.0001-10% | 0.0001-10% |
| mixed carotenoids | 0.0001-10% | 0.0001-10% | 0.0001-10% |
| Polyphenols | 0.0001-10% | 0.0001-10% | 0.0001-10% |
| Flavonoids | 0.0001-10% | 0.0001-10% | 0.0001-10% |
| Cartotenoids | 0.0001-10% | 0.0001-10% | 0.0001-10% |
| Chlorophyll | 0.0001-10% | 0.0001-10% | 0.0001-10% |
| Chlorophyllin | 0.0001-10% | 0.0001-10% | 0.0001-10% |
| Fiber | 0.0001-10% | 0.0001-10% | 0.0001-10% |
| Anthocyanins | 0.0001-10% | 0.0001-10% | 0.0001-10% |
| Cyaniding | 0.0001-10% | 0.0001-10% | 0.0001-10% |
| Delphinidin | 0.0001-10% | 0.0001-10% | 0.0001-10% |
| Malvidin | 0.0001-10% | 0.0001-10% | 0.0001-10% |
| Pelargonidin | 0.0001-10% | 0.0001-10% | 0.0001-10% |
| Peonidin | 0.0001-10% | 0.0001-10% | 0.0001-10% |
| Petunidin | 0.0001-10% | 0.0001-10% | 0.0001-10% |
| Flavanols | 0.0001-10% | 0.0001-10% | 0.0001-10% |
| Flavonols | 0.0001-10% | 0.0001-10% | 0.0001-10% |
| Catechin | 0.0001-10% | 0.0001-10% | 0.0001-10% |
| Epicatechin | 0.0001-10% | 0.0001-10% | 0.0001-10% |
| Epigallocatechin | 0.0001-10% | 0.0001-10% | 0.0001-10% |
| epigallocatechingallate | 0.0001-10% | 0.0001-10% | 0.0001-10% |
| Theaflavins | 0.0001-10% | 0.0001-10% | 0.0001-10% |
| Thearubigins | 0.0001-10% | 0.0001-10% | 0.0001-10% |
| proanthocyanins | 0.0001-10% | 0.0001-10% | 0.0001-10% |
| Quercetin | 0.0001-10% | 0.0001-10% | 0.0001-10% |
| Kaempferol | 0.0001-10% | 0.0001-10% | 0.0001-10% |
| Myricetin | 0.0001-10% | 0.0001-10% | 0.0001-10% |
| Isorhamnetin | 0.0001-10% | 0.0001-10% | 0.0001-10% |
| flavononeshesperetin | 0.0001-10% | 0.0001-10% | 0.0001-10% |
| Naringenin | 0.0001-10% | 0.0001-10% | 0.0001-10% |

TABLE 1-continued

| Components | Coating | Centerfill | Gum Region |
|---|---|---|---|
| Eriodictyol | 0.0001-10% | 0.0001-10% | 0.0001-10% |
| Tangeretin | 0.0001-10% | 0.0001-10% | 0.0001-10% |
| Flavones | 0.0001-10% | 0.0001-10% | 0.0001-10% |
| Apigenin | 0.0001-10% | 0.0001-10% | 0.0001-10% |
| Luteolin | 0.0001-10% | 0.0001-10% | 0.0001-10% |
| Lignans | 0.0001-10% | 0.0001-10% | 0.0001-10% |
| Phytoestrogens | 0.0001-10% | 0.0001-10% | 0.0001-10% |
| Resveratrol | 0.0001-10% | 0.0001-10% | 0.0001-10% |
| Isoflavones | 0.0001-10% | 0.0001-10% | 0.0001-10% |
| Daidzein | 0.0001-10% | 0.0001-10% | 0.0001-10% |
| Genistein | 0.0001-10% | 0.0001-10% | 0.0001-10% |
| soy isoflavones | 0.0001-10% | 0.0001-10% | 0.0001-10% |
| L. Throat care actives | | | |
| (1) analgesics, anesthetics, antipyretic and anti-inflammatory agents | | | |
| Menthol | 10-500 ppm | 10-500 ppm | 500-20,000 ppm |
| Phenol | 0.1-10% | 0.1-50% | 0.1-20% |
| Hexylresorcinol | 0.1-10% | 0.1-50% | 0.1-20% |
| Benzocaine | 0.1-10% | 0.1-50% | 0.1-20% |
| dyclonine hydrochloride | 0.1-10% | 0.1-50% | 0.1-20% |
| benzyl alcohol | 0.1-10% | 0.1-50% | 0.1-20% |
| salicyl alcohol | 0.1-10% | 0.1-50% | 0.1-20% |
| Acetaminophen | 0.1-10% | 0.1-50% | 0.1-20% |
| Aspirin | 0.1-10% | 0.1-50% | 0.1-20% |
| Diclofenac | 0.1-10% | 0.1-50% | 0.1-20% |
| Diflunisal | 0.1-10% | 0.1-50% | 0.1-20% |
| Etodolac | 0.1-10% | 0.1-50% | 0.1-20% |
| Fenoprofen | 0.1-10% | 0.1-50% | 0.1-20% |
| Flurbiprofen | 0.1-10% | 0.1-50% | 0.1-20% |
| Ibuprofen | 0.1-10% | 0.1-50% | 0.1-20% |
| Ketoprofen | 0.1-10% | 0.1-50% | 0.1-20% |
| Ketorolac | 0.1-10% | 0.1-50% | 0.1-20% |
| Nabumetone | 0.1-10% | 0.1-50% | 0.1-20% |
| Naproxen | 0.1-10% | 0.1-50% | 0.1-20% |
| Piroxicam | 0.1-10% | 0.1-50% | 0.1-20% |
| caffeine | 0.0001-10% | 0.0001-10% | 0.0001-10% |
| Lidocaine | 0.1-10% | 0.1-50% | 0.1-20% |
| Benzocaine | 0.1-10% | 0.1-50% | 0.1-20% |
| Phenol | 0.1-10% | 0.1-50% | 0.1-20% |
| Dyclonine | 0.1-10% | 0.1-50% | 0.1-20% |
| benzonotate | 0.1-10% | 0.1-50% | 0.1-20% |
| (2) demulcents | | | |
| slippery elm bark | 0.1-10% | 0.1-10% | 0.1-10% |
| Pectin | 0.1-10% | 0.1-10% | 0.1-10% |
| Gelatin | 0.1-10% | 0.1-10% | 0.1-10% |
| (3) antiseptics | | | |
| Cetylpyridinium chloride | 0.01-1% | 0.01-1% | 0.01-1% |
| domiphen bromide | 0.01-1% | 0.01-1% | 0.01-1% |
| dequalinium chloride | 0.01-1% | 0.01-1% | 0.01-1% |
| (4) antitussives | | | |
| chlophedianol hydrochloride | 0.0001-2% | 0.0001-2% | 0.0001-2% |
| Codeine | 0.0001-2% | 0.0001-2% | 0.0001-2% |
| codeine phosphate | 0.0001-2% | 0.0001-2% | 0.0001-2% |
| codeine sulfate | 0.0001-2% | 0.0001-2% | 0.0001-2% |
| dextromethorphan | 0.0001-2% | 0.0001-2% | 0.0001-2% |
| dextromethorphan hydrobromide | 0.0001-2% | 0.0001-2% | 0.0001-2% |
| diphenhydramine citrate | 0.0001-2% | 0.0001-2% | 0.0001-2% |
| diphenhydramine hydrochloride | 0.0001-2% | 0.0001-2% | 0.0001-2% |
| Dextrorphan | 0.0001-2% | 0.0001-2% | 0.0001-2% |
| diphenhydramine | 0.0001-2% | 0.0001-2% | 0.0001-2% |
| Hydrocodone | 0.0001-2% | 0.0001-2% | 0.0001-2% |
| Noscapine | 0.0001-2% | 0.0001-2% | 0.0001-2% |
| Oxycodone | 0.0001-2% | 0.0001-2% | 0.0001-2% |
| pentoxyverine | 0.0001-2% | 0.0001-2% | 0.0001-2% |
| (5) throat soothing agents | | | |
| Honey | 0.5-25% | 0.5-90% | 0.5-15% |
| Propolis | 0.1-10% | 0.1-10% | 0.1-10% |
| aloe vera | 0.1-10% | 0.1-10% | 0.1-10% |
| Glycerine | 0.1-10% | 0.1-10% | 0.1-10% |
| menthol | 10-500 ppm | 10-500 ppm | 500-20,000 ppm |

TABLE 1-continued

| Components | Coating | Centerfill | Gum Region |
|---|---|---|---|
| (6) cough suppressants | | | |
| codeine | 0.0001-2% | 0.0001-2% | 0.0001-2% |
| Antihistamines | 0.0001-2% | 0.0001-2% | 0.0001-2% |
| dextromethorphan | 0.0001-2% | 0.0001-2% | 0.0001-2% |
| isoproterenol | 0.0001-2% | 0.0001-2% | 0.0001-2% |
| (7) expectorants | | | |
| ammonium chloride | 0.0001-2% | 0.0001-2% | 0.0001-2% |
| Guaifenesin | 0.0001-2% | 0.0001-2% | 0.0001-2% |
| ipecac fluid extract | 0.0001-2% | 0.0001-2% | 0.0001-2% |
| potassium iodide | 0.0001-2% | 0.0001-2% | 0.0001-2% |
| (8) mucolytics | | | |
| Acetylcycsteine | 0.0001-2% | 0.0001-2% | 0.0001-2% |
| Ambroxol | 0.0001-2% | 0.0001-2% | 0.0001-2% |
| bromhexine | 0.0001-2% | 0.0001-2% | 0.0001-2% |
| (9) antihistamines | | | |
| Acrivastine | 0.05-10% | 0.05-10% | 0.05-10% |
| Azatadine | 0.05-10% | 0.05-10% | 0.05-10% |
| brompheniramine | 0.05-10% | 0.05-10% | 0.05-10% |
| chlorpheniramine | 0.05-10% | 0.05-10% | 0.05-10% |
| Clemastine | 0.05-10% | 0.05-10% | 0.05-10% |
| Cyproheptadine | 0.05-10% | 0.05-10% | 0.05-10% |
| dexbrompheniramine | 0.05-10% | 0.05-10% | 0.05-10% |
| Dimenhydrinate | 0.05-10% | 0.05-10% | 0.05-10% |
| diphenhydramine | 0.05-10% | 0.05-10% | 0.05-10% |
| Doxylamine | 0.05-10% | 0.05-10% | 0.05-10% |
| Hydroxyzine | 0.05-10% | 0.05-10% | 0.05-10% |
| Meclizine | 0.05-10% | 0.05-10% | 0.05-10% |
| Phenindamine | 0.05-10% | 0.05-10% | 0.05-10% |
| phenyltoloxamine | 0.05-10% | 0.05-10% | 0.05-10% |
| Promethazine | 0.05-10% | 0.05-10% | 0.05-10% |
| Pyrilamine | 0.05-10% | 0.05-10% | 0.05-10% |
| Tripelennamine | 0.05-10% | 0.05-10% | 0.05-10% |
| triprolidine | 0.05-10% | 0.05-10% | 0.05-10% |
| Astemizole | 0.05-10% | 0.05-10% | 0.05-10% |
| Cetirizine | 0.05-10% | 0.05-10% | 0.05-10% |
| Ebastine | 0.05-10% | 0.05-10% | 0.05-10% |
| Fexofenadine | 0.05-10% | 0.05-10% | 0.05-10% |
| Loratidine | 0.05-10% | 0.05-10% | 0.05-10% |
| Terfenadine | 0.05-10% | 0.05-10% | 0.05-10% |
| (10) nasal decongestants | | | |
| phenylpropanolamine | 0.1-10% | 0.1-50% | 0.1-20% |
| pseudoephedrine | 0.1-10% | 0.1-50% | 0.1-20% |
| Ephedrine | 0.1-10% | 0.1-50% | 0.1-20% |
| Phenylephrine | 0.1-10% | 0.1-50% | 0.1-20% |
| Oxymetazoline | 0.1-10% | 0.1-50% | 0.1-20% |
| Menthol | 0.1-10% | 0.1-50% | 0.1-20% |
| Camphor | 0.1-10% | 0.1-50% | 0.1-20% |
| Borneol | 0.1-10% | 0.1-50% | 0.1-20% |
| Ephedrine | 0.1-10% | 0.1-50% | 0.1-20% |
| *eucalyptus* oil | 0.001-10% | 0.001-10% | 0.001-10% |
| peppermint oil | 0.001-10% | 0.001-10% | 0.001-10% |
| methyl salicylate | 0.001-10% | 0.001-10% | 0.001-10% |
| bornyl acetate | 0.001-10% | 0.001-10% | 0.001-10% |
| lavender oil | 0.001-10% | 0.001-10% | 0.001-10% |
| wasabi extracts | 0.001-10% | 0.001-10% | 0.001-10% |
| horseradish extracts | 0.001-10% | 0.001-10% | 0.001-10% |
| M. Tooth whitening/Stain removing agents | | | |
| Surfactants | 0.001-2% | 0.001-2% | 0.001-2% |
| Chelators | 0.1-10% | 0.1-10% | 0.1-10% |
| Abrasives | 0.1-5% | 0.1-5% | 0.1-5% |
| oxidizing agents | 0.1-5% | 0.1-5% | 0.1-5% |
| hydrolytic agents | 0.1-5% | 0.1-5% | 0.1-5% |

TABLE 1-continued

| Components | Coating | Centerfill | Gum Region |
|---|---|---|---|
| N. Energy boosting agents | | | |
| Caffeine | 0.0001-10% | 0.0001-10% | 0.0001-10% |
| Vitamins | 0.0001-10% | 0.0001-10% | 0.0001-10% |
| Minerals | 0.0001-10% | 0.0001-10% | 0.0001-10% |
| amino acids | 0.0001-10% | 0.0001-10% | 0.0001-10% |
| ginseng extract | 0.0001-10% | 0.0001-10% | 0.0001-10% |
| ginko extract | 0.0001-10% | 0.0001-10% | 0.0001-10% |
| guarana extract | 0.0001-10% | 0.0001-10% | 0.0001-10% |
| green tea extract | 0.0001-10% | 0.0001-10% | 0.0001-10% |
| Taurine | 0.0001-10% | 0.0001-10% | 0.0001-10% |
| kola nut extract | 0.0001-10% | 0.0001-10% | 0.0001-10% |
| yerba mate leaf | 0.0001-10% | 0.0001-10% | 0.0001-10% |
| Niacin | 0.0001-10% | 0.0001-10% | 0.0001-10% |
| *rhodiola* root extract | 0.0001-10% | 0.0001-10% | 0.0001-10% |
| O. Concentration boosting agents | | | |
| Caffeine | 0.0001-10% | 0.0001-10% | 0.0001-10% |
| ginko extract | 0.0001-10% | 0.0001-10% | 0.0001-10% |
| gotu cola (*centella asiatica*) | 0.0001-10% | 0.0001-10% | 0.0001-10% |
| German chamomile | 0.0001-10% | 0.0001-10% | 0.0001-10% |
| *avina sativa* | 0.0001-10% | 0.0001-10% | 0.0001-10% |
| phosphatidyl serine | 0.0001-10% | 0.0001-10% | 0.0001-10% |
| *aspalathus linearis* | 0.0001-10% | 0.0001-10% | 0.0001-10% |
| Pregnenolone | 0.0001-10% | 0.0001-10% | 0.0001-10% |
| *rhodiola* root extract | 0.0001-10% | 0.0001-10% | 0.0001-10% |
| Theanine | 0.0001-10% | 0.0001-10% | 0.0001-10% |
| Vinpocetine | 0.0001-10% | 0.0001-10% | 0.0001-10% |
| P. Appetite suppressants | | | |
| Caffeine | 0.0001-10% | 0.0001-10% | 0.0001-10% |
| guarana extract | 0.0001-10% | 0.0001-10% | 0.0001-10% |
| hoodia gordonii | 0.0001-10% | 0.0001-10% | 0.0001-10% |
| Glucomannan | 0.0001-10% | 0.0001-10% | 0.0001-10% |
| Calcium | 0.0001-10% | 0.0001-10% | 0.0001-10% |
| *garcinia cambogia* extract | 0.0001-10% | 0.0001-10% | 0.0001-10% |
| n-acetyl-tyrosine | 0.0001-10% | 0.0001-10% | 0.0001-10% |
| soy phospholipids | 0.0001-10% | 0.0001-10% | 0.0001-10% |
| V. Colors | | | |
| Annatto extract | 0.5-10% | 0.5-20% | 0.5-10% |
| Beta-carotene | 0.5-10% | 0.5-20% | 0.5-10% |
| Canthaxanthin | 0.5-10% | 0.5-20% | 0.5-10% |
| Grape color extract | 0.5-10% | 0.5-20% | 0.5-10% |
| Turmeric oleoresin | 0.5-10% | 0.5-20% | 0.5-10% |
| B-Apo-8'-carotenal | 0.5-10% | 0.5-20% | 0.5-10% |
| Beet powder | 0.5-10% | 0.5-20% | 0.5-10% |
| Caramel color | 0.5-10% | 0.5-20% | 0.5-10% |
| Carmine | 0.5-10% | 0.5-20% | 0.5-10% |
| Cochineal extract | 0.5-10% | 0.5-20% | 0.5-10% |
| Grape skin extract | 0.5-10% | 0.5-20% | 0.5-10% |
| Saffron | 0.5-10% | 0.5-20% | 0.5-10% |
| Tumeric | 0.5-10% | 0.5-20% | 0.5-10% |
| Titanium dioxide | 0.05-2% | 0.05-2% | 0.05-2% |
| F.D. & C. Blue No. 1 | 0.05-2% | 0.05-2% | 0.05-2% |
| F.D. & C. Blue No. 2 | 0.05-2% | 0.05-2% | 0.05-2% |
| F.D. & C. Green No. 1 | 0.05-2% | 0.05-2% | 0.05-2% |
| F.D. & C. Red No. 40 | 0.05-2% | 0.05-2% | 0.05-2% |
| F.D. & C. Red No. 3 | 0.05-2% | 0.05-2% | 0.05-2% |
| F.D. & C. Yellow No. 6 | 0.05-2% | 0.05-2% | 0.05-2% |
| F.D. & C. Yellow No. 5 | 0.05-2% | 0.05-2% | 0.05-2% |

The features and advantages of the present invention are more fully shown by the following examples which are provided for purposes of illustration, and are not to be construed as limiting the invention in any way.

EXAMPLES

The following examples A-X as set forth in Tables 2-10 are directed to inventive gum compositions of some embodiments. The remaining examples 1-78 are directed to optional modified release components which may be incorporated in the gum compositions in any of the liquid-fill region, gum region or coating.

Examples A-H

TABLE 2

Gum Region Composition

% by weight

| Component | A | B | C | D | E | F | G | H |
|---|---|---|---|---|---|---|---|---|
| Gum base* | 28-42 | 28-42 | 28-42 | 28-42 | 28-42 | 28-42 | 28-42 | 28-42 |
| Lecithin | 0.1-0.25 | 0.1-0.25 | 0.05-0.1 | 0.05-0.1 | 0.05-0.1 | 0.05-0.1 | 0.05-0.1 | 0.05-0.1 |
| Maltitol | 52-55 | 45-50 | 46-50 | 50-54 | 52-57 | 45-55 | 47-52 | 50-55 |
| Sorbitol | 0 | 0-10 | 5-10 | 0-5 | 0-5 | 5-10 | 0-5 | 0-5 |
| Lycasin ™ | 0 | 0 | 0.25-0.5 | 0.25-0.5 | 0.25-0.5 | 0.1-0.25 | 0.1-0.25 | 0.1-0.25 |
| Flavors | 2.50-3 | 2.50-3 | 2-2.26 | 2-2.26 | 2-2.26 | 2-2.50 | 2-2.50 | 2-2.50 |
| Cooling agent | 0.08-0.1 | 0.08-0.1 | 0 | 0 | 0 | 0.08-0.1 | 0.08-0.1 | 0.08-0.1 |
| Acidulants | 1.2-1.7 | 1.2-1.7 | 0 | 0 | 0 | 0.7-1.2 | 0.7-1.2 | 0.7-1.2 |
| Intense sweetener | 3.4-3.9 | 3.4-3.9 | 3.4-3.9 | 2.9-3.4 | 2.9-3.4 | 2.9-3.4 | 2.9-3.4 | 3.4-3.9 |

*gum base may include 3% to 11% by weight of a filler such as, for example, talc, dicalcium phosphate, and calcium carbonate (the amount of filler in the gum base is based on the weight percent of the gum region composition, for example, in the above compositions A-H, if a gum region composition includes 5% filler, the amount of gum base will be 5% less than the range recited in the table, i.e., from 23-37%)

TABLE 3

Liquid-fill Composition

% by weight

| Component | A | B | C | D | E | F | G | H |
|---|---|---|---|---|---|---|---|---|
| Glycerin | 63.00 | 63.00 | 63.00 | 30.00 | 63.00 | 63.00 | 1.50 | 63.00 |
| Lycasin ™ | 29.26 | 29.26 | 29.49 | 56.00 | 29.49 | 29.17 | 65.22 | 29.17 |
| Sorbitol solution | 3.25 | 3.25 | 3.28 | 7.50 | 3.28 | 3.24 | 28.60 | 3.24 |
| Sodium carboxymethyl cellulose | 0.08 | 0.008 | 0.15 | 0.25 | 0.15 | 0.20 | 0.20 | 0.20 |
| Color | 0.004 | 0.004 | 0.0004 | 0.004 | 0.0004 | 0.004 | 0.004 | 0.004 |
| Flavors | 1.30 | 1.30 | 4.00 | 4.00 | 4.00 | 0.30 | 1.40 | 0.30 |
| Cooling agent | 0.06 | 0.06 | 0.06 | 0.06 | 0.06 | 0.06 | 0.06 | 0.06 |
| Citric acid | 3.00 | 3.00 | 0 | 2.17 | 0 | 3.00 | 3.00 | 3.00 |
| Intense sweetener | 0.05 | 0.05 | 0.02 | 0.02 | 0.02 | 0.02 | 0.02 | 0.02 |

TABLE 4

Coating Composition

% by weight

| Component | A | B | C | D | E | F | G | H |
|---|---|---|---|---|---|---|---|---|
| Maltitol | 95.02 | 95.02 | 95.36 | 95.36 | 95.36 | 95.02 | 95.02 | 95.02 |
| Bleached gum Arabic | 3.32 | 3.32 | 3.32 | 3.32 | 3.32 | 3.32 | 3.32 | 3.32 |
| Titanium dioxide | 0.36 | 0.36 | 0.36 | 0.36 | 0.36 | 0.36 | 0.36 | 0.36 |
| Flavors | 1.07 | 1.07 | 0.51 | 0.51 | 0.51 | 1.07 | 1.07 | 1.07 |
| Cooling agent | 0.08 | 0.08 | 0.15 | 0.15 | 0.15 | 0.08 | 0.08 | 0.08 |
| Intense sweetener | 0.08 | 0.08 | 0.23 | 0.23 | 0.23 | 0.08 | 0.08 | 0.08 |
| Color | 0 | 0 | 0 | 0 | 0 | 0 | 0 | 0 |
| Candelilla wax | 0.08 | 0.08 | 0.08 | 0.08 | 0.08 | 0.08 | 0.08 | 0.08 |

Gum pieces including three regions: liquid fill, gum region and coating are prepared according to the compositions in Tables 2-4 above with each region according to the corresponding components for compositions A-H.

The compositions for the gum regions are prepared by first combining talc, where present, with the gum base under heat at about 85° C. This combination is then mixed with the maltitol, lecithin and other polyols for six minutes. The flavor blends which include a pre-mix of the flavors and cooling agents are added and mixed for 1 minute. Finally, the acids and intense sweeteners are added and mixed for 5 minutes.

The liquid fill composition is then prepared by first preparing a pre-mix of the sodium carboxymethyl cellulose, glycerine, and polyols. This pre-mix is then combined with the colors, flavors, cooling agents, acids and intense sweeteners and mixed.

The gum region and liquid-fill compositions are then extruded together and formed into tablets by the process described above at paragraphs [0031] to [0034] above. The gum pieces each have a total weight of approximately 2.2 g. In the final gum pieces, the gum region is about 62% by weight, the liquid-fill is about 8% by weight, and the coating is about 30% by weight.

The colors, flavors, cooling agents, acids and sweeteners used in the liquid-fill, gum region and coating compositions set forth above may be specifically selected from any of those components provided in Table 1 herein. Further, any of these components may be used in their encapsulated and/or unencapsulated forms.

Gum pieces that are prepared by compositions A-H demonstrate no noticeable loss of liquidity of the liquid-fill after accelerated aging at 37° C. for a three week period.

Gum pieces including three regions, i.e., liquid fill, gum region and coating, are prepared according to the compositions in Tables 5-7 above, with each region according to the corresponding component for compositions I-P.

Examples I-P

TABLE 5

Gum Region Composition

% by weight

| Component | I | J | K | L | M | N | O | P |
|---|---|---|---|---|---|---|---|---|
| Gum base - with SBR | 28-42 | 0 | 28-42 | 0 | 28-42 | 0 | 28-42 | 28-42 |
| Gum base - with polyisobutylene | 0 | 28-42 | 0 | 28-42 | 0 | 28-42 | 0 | 0 |
| Lecithin | 0.25 | 0.25 | 0.05 | 0.05 | 0.05 | 0.05 | 0.05 | 0.05 |
| Maltitol | 52-55 | 45-50 | 46-50 | 50-54 | 52-57 | 45-55 | 47-52 | 50-55 |
| Sorbitol | 0 | 0-10 | 5-10 | 0-5 | 0-5 | 5-10.00 | 0-5 | 0-5 |
| Lycasin ™ | 0 | 0 | 0.25 | 0.25 | 0.25 | 0.25 | 0.25 | 0.25 |
| Flavors | 2.50 | 2.50 | 2.26 | 2.26 | 2.26 | 2.5 | 2.5 | 2.5 |
| Cooling agent | 0.08 | 0.08 | 0 | 0 | 0 | 0.08 | 0.08 | 0.08 |
| Acidulants | 1.2 | 1.2 | 0 | 0 | 0 | 1.2 | 1.2 | 1.2 |
| Intense sweetener | 3.40 | 3.40 | 3.40 | 3.40 | 3.40 | 3.40 | 3.40 | 3.40 |
| Caffeine | 0 | 0 | 0 | 14.66 | 0 | 0 | 0 | 0 |
| Vitamin C | 0 | 0 | 0 | 0 | 0 | 7.00 | 0 | 0 |

TABLE 6

Liquid-fill Composition

% by weight

| Component | I | J | K | L | M | N | O | P |
|---|---|---|---|---|---|---|---|---|
| Glycerin | 63.00 | 62.95 | 63.00 | 63.00 | 62.95 | 63.00 | 58.00 | 63.00 |
| Lycasin ™ | 29.26 | 29.26 | 29.49 | 29.49 | 29.49 | 29.17 | 29.17 | 29.17 |
| Sorbitol solution | 3.25 | 3.25 | 3.28 | 3.28 | 3.28 | 3.24 | 3.24 | 3.24 |
| Sodium carboxymethyl cellulose | 0.08 | 0.008 | 0.15 | 0.15 | 0.15 | 0.20 | 0.20 | 0.20 |
| Color | 0.004 | 0.004 | 0.0004 | 0.0004 | 0.0004 | 0.004 | 0.004 | 0.004 |
| Flavors | 1.30 | 1.30 | 4.00 | 4.00 | 4.00 | 0.30 | 0.30 | 0.30 |
| Cooling agent | 0.06 | 0.06 | 0.06 | 0.06 | 0.06 | 0.06 | 0.06 | 0.06 |
| Citric acid | 3.00 | 3.00 | 0 | 0 | 0 | 3.00 | 3.00 | 3.00 |
| Intense sweetener | 0.05 | 0.05 | 0.02 | 0.02 | 0.02 | 0.02 | 0.02 | 0.02 |
| Dextromethorphan hydrobromide | 0 | 0 | 0 | 0 | 0 | 0 | 5 | 0 |
| Xanthan gum | 0 | 0.05 | 0 | 0 | 0.05 | 0 | 0 | 0 |

TABLE 7

Coating Composition

% by weight

| Component | I | J | K | L | M | N | O | P |
|---|---|---|---|---|---|---|---|---|
| Maltitol | 87.52 | 95.02 | 94.36 | 87.86 | 95.36 | 95.02 | 95.02 | 94.02 |
| Bleached gum Arabic | 3.32 | 3.32 | 3.32 | 3.32 | 3.32 | 3.32 | 3.32 | 3.32 |
| Titanium dioxide | 0.36 | 0.36 | 0.36 | 0.36 | 0.36 | 0.36 | 0.36 | 0.36 |
| Flavors | 1.07 | 1.07 | 0.51 | 0.51 | 0.51 | 1.07 | 1.07 | 1.07 |
| Cooling agent | 0.08 | 0.08 | 0.15 | 0.15 | 0.15 | 0.08 | 0.08 | 0.08 |
| Intense sweetener | 0.08 | 0.08 | 0.23 | 0.23 | 0.23 | 0.08 | 0.08 | 0.08 |
| Color | 0 | 0 | 0 | 0 | 0 | 0 | 0 | 0 |
| Candelilla wax | 0.08 | 0.08 | 0.08 | 0.08 | 0.08 | 0.08 | 0.08 | 0.08 |
| Gelatin (40% solution) | 7.5 | 0 | 0 | 7.5 | 0 | 0 | 0 | 0 |
| Polyvinyl alcohol | 0 | 0 | 1.0 | 0 | 0 | 0 | 0 | 1.0 |

The gum pieces of examples I-P are prepared by the same method set forth for examples A-H, above, with changes as set forth below. The individual gum pieces are approximately 2.2 g.

For examples J and M, the addition of xanthan gum may be added to the liquid-fill as part of the sodium carboxymethyl cellulose (CMC) pre-mix which may include CMC, glycerin and polyols.

For examples L and N, the caffeine and vitamin C, respectively, may be added and mixed with the maltitol, lecithin and other polyols.

For example O, the dextromethorphan hydrobromide may be added with the colors, flavors, cooling agents, acids and intense sweeteners prior to mixing.

For examples K and P the polyvinyl acetate (PVA) may be added as a pre-coating prior to the addition of the remaining coating ingredients. This may form a layer of PVA immediately in contact with and completely surrounding the gum region.

The colors, flavors, cooling agents, acids and sweeteners used in the liquid-fill, gum region and coating compositions set forth above may be specifically selected from any of those components provided in Table 1 herein. Further, any of these components may be used in their encapsulated and/or unencapsulated forms.

These gum pieces exhibit stability similar to that of compositions A-H.

TABLE 8

Gum Region Composition

| Component | % by weight | | | | | | | |
|---|---|---|---|---|---|---|---|---|
| | Q | R | S | T | U | V | W | X |
| Gum base* | 28-42 | 28-42 | 28-42 | 28-42 | 28-42 | 28-42 | 28-42 | 28-42 |
| Lecithin | 0.25 | 0.25 | 0.05 | 0.05 | 0.05 | 0.05 | 0.05 | 0.05 |
| Maltitol | 52-55 | 45-50 | 46-50 | 50-54 | 52-57 | 45-55 | 47-52 | 50-55 |
| Sorbitol | 0 | 0-10 | 5-10 | 0-5 | 0-5 | 5-10 | 0-5 | 0-5 |
| Lycasin ™ | 0 | 0 | 0.25 | 0.25 | 0.25 | 0.25 | 0.25 | 0.25 |
| Flavors | 2.50 | 2.50 | 2.26 | 2.26 | 2.26 | 2.50 | 2.50 | 2.50 |
| Cooling agent | 0.08 | 0.08 | 0 | 0 | 0 | 0.08 | 0.08 | 0.08 |
| Acidulants | 1.2 | 1.2 | 0 | 0 | 0 | 1.2 | 1.2 | 1.2 |
| Intense sweetener | 3.40 | 3.40 | 3.40 | 3.40 | 3.40 | 3.40 | 3.40 | 3.40 |

*gum base may include 3% to 11% by weight of a filler such as, for example, talc, dicalcium phosphate, and calcium carbonate (the amount of filler in the gum base is based on the weight percent of the gum region composition, for example, in the above compositions A-H, if a gum region composition includes 5% filler, the amount of gum base will be 5% less than the range recited in the table, i.e., from 23-37%)

TABLE 9(1)

Liquid-fill Composition

| Component | % by weight | | | | | | | |
|---|---|---|---|---|---|---|---|---|
| | Q1 | R1 | S1 | T1 | U1 | V1 | W1 | X1 |
| Glycerin | 40 | 30 | 1 | 1.5 | 1 | 1.5 | 1.5 | 0 |
| Lycasin | 52.256 | 62.328 | 64.7696 | 69.2696 | 94.7696 | 47.416 | 0 | 76.416 |
| Sorbitol solution | 3.25 | 3.25 | 30 | 25 | 0 | 47.5 | 94.916 | 20 |
| Sodium carboxymethyl cellulose | 0.08 | 0.008 | 0.15 | 0.15 | 0.15 | 0.20 | 0.20 | 0.20 |
| Color | 0.004 | 0.004 | 0.0004 | 0.0004 | 0.0004 | 0.004 | 0.004 | 0.004 |
| Flavors[1] | 1.30 | 1.30 | 4.00 | 4.00 | 4.00 | 0.30 | 0.30 | 0.30 |
| Cooling agent | 0.06 | 0.06 | 0.06 | 0.06 | 0.06 | 0.06 | 0.06 | 0.06 |
| Citric acid | 3.00 | 3.00 | 0 | 0 | 0 | 3.00 | 3.00 | 3.00 |
| Intense sweetener | 0.05 | 0.05 | 0.02 | 0.02 | 0.02 | 0.02 | 0.02 | 0.02 |

[1]peppermint, spearmint, wintergreen

TABLE 9(2)

Liquid-fill Composition

| Component | % by weight | | | | | | | |
|---|---|---|---|---|---|---|---|---|
| | Q2 | R2 | S2 | T2 | U2 | V2 | W2 | X2 |
| Glycerin | 40 | 30 | 1 | 1.5 | 1 | 1.5 | 1.5 | 0 |
| Lycasin | 52.156 | 62.228 | 64.7196 | 69.2696 | 94.7696 | 47.286 | 0 | 76.331 |
| Sorbitol solution | 3.25 | 3.25 | 30 | 25 | 0 | 47.5 | 94.916 | 20 |
| Sodium carboxymethyl cellulose | 0.08 | 0.008 | 0.15 | 0.15 | 0.15 | 0.20 | 0.20 | 0.20 |
| Xanthan gum | 0.1 | 0.1 | 0.05 | 0 | 0 | 0.05 | 0.1 | 0.025 |
| Color | 0.004 | 0.004 | 0.0004 | 0.0004 | 0.0004 | 0.004 | 0.004 | 0.004 |
| Fruit flavors[1] | 1.30 | 1.30 | 4.00 | 4.00 | 4.00 | 0.30 | 0.30 | 0.30 |
| Cooling agent | 0.06 | 0.06 | 0.06 | 0.06 | 0.06 | 0.06 | 0.06 | 0.06 |
| Citric acid | 3.00 | 3.00 | 0 | 0 | 0 | 3.00 | 3.00 | 3.00 |
| Intense sweetener | 0.05 | 0.05 | 0.02 | 0.02 | 0.02 | 0.01 | 0.075 | 0.08 |

[1]lime, blackberry

TABLE 10

Coating Composition

| Component | % by weight | | | | | | | |
|---|---|---|---|---|---|---|---|---|
| | Q | R | S | T | U | V | W | X |
| Maltitol | 90.85 | 94.13 | 91.67 | 88.67 | 94.17 | 95.33 | 95.33 | 95.33 |
| Bleached gum Arabic | 6.72 | 0 | 7 | 10 | 0 | 0 | 1.5 | 1.5 |
| Gelatin | 0 | 4.2 | 0 | 0 | 4.5 | 3 | 1.5 | 1.5 |
| Titanium dioxide | 1.12 | 0.36 | 0.36 | 0.36 | 0.36 | 0.36 | 0.36 | 0.36 |
| Flavors | 1.07 | 1.07 | 0.51 | 0.51 | 0.51 | 1.07 | 1.07 | 1.07 |
| Cooling agent | 0.08 | 0.08 | 0.15 | 0.15 | 0.15 | 0.08 | 0.08 | 0.08 |
| Intense sweetener | 0.08 | 0.08 | 0.23 | 0.23 | 0.23 | 0.08 | 0.08 | 0.08 |
| Color | 0 | 0 | 0 | 0 | 0 | 0 | 0 | 0 |
| Candelilla wax | 0.08 | 0.08 | 0.08 | 0.08 | 0.08 | 0.08 | 0.08 | 0.08 |

Gum pieces including three regions: liquid fill, gum region and coating are prepared according to the compositions in Tables 8-10 above with each region according to the corresponding components for compositions Q-X, with the liquid fill being chosen from either table 8(1) or 8(2).

The gum pieces of examples Q-X are prepared by the same method set forth for examples A-H, above, with changes as set forth below. The individual gum pieces are approximately 2.2 g.

The colors, flavors, cooling agents, acids and sweeteners used in the liquid-fill, gum region and coating compositions set forth above may be specifically selected from any of those components provided in Table 1 herein. Further, any of these components may be used in their encapsulated and/or unencapsulated forms.

These gum pieces exhibit stability similar to that of compositions A-H.

The following examples 1-78 include a variety of single component delivery systems which may be used in any region of the gum compositions of some embodiments. The modified-release ingredients may be added to the center-fill, gum region and/or coating of the center-fill gum. For instance, the components of examples 1-78 could be added to any of the liquid-fill, gum region or coating compositions of examples A-X above to form center-fill chewing gums having modified release characteristics.

Some examples may include multiple modified release components from examples 1-78 in the same or different regions of the center-fill gum. When multiple modified release components are used in a center-fill gum, the components may be the same type, e.g., multiple modified release sweeteners (example 29), or different types, e.g., modified release sweeteners with a modified release cooling agent (example 31). Moreover, in some examples, one or more of the modified release components from examples 1-78 may be included in any region of the center-fill gum in combination with the same component in its free, or unencapsulated, form. The free and modified release forms of the component may be added to the same or different regions of the center-fill gum. For instance, the spray-dried strawberry flavor of example 8, below, could be included in a center-fill composition in combination with a gum region containing unencapsulated strawberry flavor.

INGREDIENT EXAMPLES

Ingredient Examples of Single Ingredients in a Delivery System

Example 1

Encapsulation of Glycyrrhizin—Polyvinyl Acetate Matrix

Composition:

| Ingredient | Weight percent |
|---|---|
| Polyvinyl Acetate | 75.00% |
| Hydrogenated Oil | 3.75% |
| Glycerol Monostearate | 1.25% |
| Glycyrrhizin | 20.00% |
| Total | 100.00% |

Procedure: Polyvinyl acetate is melted at a temperature of about 90° C. in a high shear mixer such as extruder (single or twin screw) or sigma or Banbury mixer. The hydrogenated oil and Glycerol monstearate are then added to molten polyvinyl acetate. Glycyrrhizin is then added to the resulting mixture and mixed under high shear to completely disperse the ingredients. The resulting gilled polymer melt is cooled and ground to produce a powdered material with a particle size of less than 420 microns. The encapsulated Gylcyrrhizin matrix is stored in air tight containers with low humidity below 35° C.

Example 2

Encapsulation of Xylitol—Polyvinyl Acetate Matrix

Composition:

| Ingredient | Weight percent |
|---|---|
| Polyvinyl Acetate | 55.00% |
| Hydrogenated Oil | 3.75% |
| Glycerol Monostearate | 1.25% |
| Xylitol | 40.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Gylcerol monostearate are then added to the molten polyvinyl acetate. Xylitol is then added to the resulting mixture and mixed under high shear to completely disperse the ingredients. The resulting filled polymer melt is cooled and ground to produce a powdered material with a particle size of less than 420 microns. The encapsulate xylitol matrix is stored in air tight containers with low humidity below 35° C.

Example 3

Encapsulation of Erythritol

Composition:

| Ingredient | Weight percent |
|---|---|
| Polyvinyl Acetate | 55.00% |
| Hydrogenated Oil | 3.75% |
| Glycerol Monostearate | 1.25% |
| Erythritol | 40.00% |
| Total | 100.00% |

Procedure: Polyvinyl acetate is melted at a temperature of about 110° C. in a high shear mixer such a extruder (single or twin screw) or sigma or Banbury mixer. The hydrogenated oil and Glycerol monostearate are then added to the molten polyvinyl acetate. Erythritol are then added to the resulting mixture and mixed under high shear to completely disperse the ingredients. The resulting filled polymer melt is cooled and ground to produce a powdered material with a particle size of less than 420 microns. The erythritol encapsulation matrix is stored in air tight containers with low humidity below 35° C.

Example 4

Encapsulation of Adipic Acid—Polyvinyl Acetate Matrix

Composition:

| Ingredient | Weight percent |
|---|---|
| Polyvinyl Acetate | 60.00% |
| Hydrogenated Oil | 3.75% |
| Glycerol Monostearate | 1.25% |
| Adipic acid | 35.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. Adipic acid is then added to the resulting mixture and mixed under high shear to completely disperse the ingredients. The resulting filled polymer melt is cooled and ground to produce a powdered material with a particle size of less than 420 microns. The encapsulated adipic acid matrix is stored in air tight containers with low humidity below 35° C.

Example 5

Encapsulation of Citric Acid—Polyvinyl Acetate Matrix

Composition:

| Ingredient | Weight percent |
|---|---|
| Polyvinyl Acetate | 55.00% |
| Hydrogenated Oil | 3.75% |
| Glycerol Monostearate | 1.25% |
| Citric Acid | 40.00% |
| Total | 100.00% |

Procedure: Polyvinyl acetate is melted at a temperature of about 110° C. in a high shear mixer such as extruder (single and twin screw) or sigma or Banbury mixer. The hydrogenated oil and Glycerol monostearate are then added to the molten polyvinyl acetate. Citric acid is then added to then resulting mixture and mixed under high shear to completely disperse the ingredients. The resulting filled polymer melt is cooled and ground to produce a powdered material with a particle size of less than 420 microns. The encapsulated citric acid matrix is stored in air tight containers with low humidity below 35° C.

Example 6

Encapsulation of Malic Acid—Polyvinyl Acetate

Composition:

| Ingredient | Weight percent |
|---|---|
| Polyvinyl Acetate | 55.00% |
| Hydrogenated Oil | 3.75% |
| Glycerol Monostearate | 1.25% |
| Malic acid | 40.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. Malic acid are then added to the resulting mixture and mixed under high shear to completely disperse the ingredients. The resulting filled polymer melt is cooled and ground to produce a powdered material with a particle size of less than 420 microns. The malic acid encapsulation matrix is stored in air tight containers with low humidity below 35° C.

Example 7

Encapsulation of Spray Dried Peppermint Flavor—Polyvinyl Acetate

Composition:

| Ingredient | Weight percent |
|---|---|
| Polyvinyl Acetate | 75.00% |
| Hydrogenated Oil | 3.75% |
| Glycerol Monostearate | 1.25% |
| Spray dried peppermint flavor | 20.00% |
| Total | 100.00% |

Procedure: Polyvinyl acetate is melted at a temperature of about 90° C. in a high shear mixer such as extruder (single or twin screw) or sigma or Banbury mixer. The hydrogenated oil and Glycerol monostearate are then added to the molten polyvinyl acetate. Spray dried peppermint flavor is then added to the resulting mixture and mixed under high shear to completely disperse the ingredients. The resulting filled polymer melt is cooled and ground to produce a powdered material with a particle size of less than 420 microns. The encapsulated peppermint flavor in Polyvinyl acetate matrix is stored in air tight containers with low humidity below 35° C.

Example 8

Encapsulation of Spray Dried Strawberry Flavor—Polyvinyl Acetate

Composition:

| Ingredient | Weight percent |
| --- | --- |
| Polyvinyl Acetate | 55.00% |
| Hydrogenated Oil | 3.75% |
| Glycerol Monostearate | 1.25% |
| Spray dried strawberry flavor | 40.00% |
| Total | 100.00% |

Procedure: Polyvinyl acetate is melted at a temperature of about 90° C. in a high shear mixer such as extruder (single or twin screw) or sigma or Banbury mixer. The hydrogenated oil and Glycerol monostearate are then added to the molten polyvinyl acetate. Spray dried strawberry flavor is then added to the resulting mixture and mixed under high shear to completely disperse the ingredients. The resulting filled polymer melt is cooled and ground to produce a powdered material with a particle size of less than 420 microns. The encapsulated strawberry flavor is stored in air tight containers with low humidity below 35° C.

Example 9

Encapsulation of Monosodium Glutamate

Composition:

| Ingredient | Weight percent |
| --- | --- |
| Polyvinyl Acetate | 55.00% |
| Hydrogenated Oil | 3.75% |
| Glycerol Monostearate | 1.25% |
| Monosodium glutamate | 40.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. Monosodium glutamate is then added to the resulting mixture and mixed under high shear to completely disperse the ingredients. The resulting filled polymer melt is cooled and ground to produce a powdered material with a particle size of less than 420 microns. The encapsulation matrix is stored in air air tight containers with low humidity below 35° C.

Example 10

Encapsulation of Salt—Polyvinyl Acetate Matrix

Composition:

| Ingredient | Weight percent |
| --- | --- |
| Polyvinyl Acetate | 60.00% |
| Hydrogenated Oil | 3.75% |
| Glycerol Monostearate | 1.25% |
| Sodium chloride | 35.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. Sodium chloride is then added to the resulting mixture and mixed under high shear to completely disperse the ingredients. The resulting filled polymer melt is cooled and ground to produce a powdered material with a particle size of less than 420 microns. The encapsulated matrix is stored in air tight containers with low humidity below 35° C.

Example 11

Encapsulation of Sodium Acid Sulfate—Polyvinyl Acetate Matrix

Composition:

| Ingredient | Weight percent |
| --- | --- |
| Polyvinyl Acetate | 55.00% |
| Hydrogenated Oil | 3.75% |
| Glycerol Monostearate | 1.25% |
| Sodium acid sulfate | 40.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. Sodium acid sulfate is then added to the resulting mixture and mixed under high shear to completely disperse the ingredients. The resulting filled polymer melt is cooled and ground to produce a powdered material with a particle size of less than 420 microns. The encapsulated matrix is stored in air tight containers with low humidity below 35° C.

Example 12

Encapsulation of WS-3 in Polyvinyl Acetate

Composition:

| Ingredient | Weight percent |
| --- | --- |
| Polyvinyl Acetate | 65.00% |
| Hydrogenated Oil | 3.75% |

-continued

| Ingredient | Weight percent |
| --- | --- |
| Glycerol Monostearate | 1.25% |
| Cooling sensate WS-3 | 30.00% |
| Total | 100.00% |

Procedure: Polyvinyl acetate is melted at a temperature of about 80° C. in a high shear mixer such as extruder (single or twin screw) or sigma or Banbury mixer. The hydrogenated oil and Glycerol monostearate are then added to the molten polyvinyl acetate. WS-3 is then added to the resulting mixture and mixed under high shear to completely disperse the ingredients. The resulting encapsulation is cooled and ground to produce a powdered material with a particle size of less than 420 microns. The malic acid encapsulation matrix is stored in air tight containers with low humidity below 35° C.

Example 13

Encapsulation of WS-23—Polyvinyl Acetate Matrix

Composition:

| Ingredient | Weight percent |
| --- | --- |
| Polyvinyl Acetate | 65.00% |
| Hydrogenated Oil | 3.75% |
| Glycerol Monostearate | 1.25% |
| Cooling sensate WS-23 | 30.00% |
| Total | 100.00% |

Procedure: Polyvinyl acetate is melted at a temperature of about 90° C. in a high shear mixer such as extruder (single or twin screw) or sigma or Banbury mixer. The hydrogenated oil and Glycerol monostearate are then added to the molten polyvinyl acetate. WS-23 is then added to the resulting mixture and mixed under high shear to completely disperse the ingredients. The resulting filled polymer melt is cooled and ground to produce a powdered material with a particle size of less than 420 microns. The encapsulated matrix is stored in air tight containers with low humidity below 35° C.

Example 14

Encapsulation of Menthol—in Polyvinyl Acetate Matrix

Composition:

| Ingredient | Weight percent |
| --- | --- |
| Polyvinyl Acetate | 75.00% |
| Hydrogenated Oil | 3.75% |
| Glycerol Monostearate | 1.25% |
| Menthol | 20.00% |
| Total | 100.00% |

Procedure: Polyvinyl acetate is melted at a temperature of about 90° C. in a high shear mixer such as extruder (single or twin screw) or sigma or Banbury mixer. The hydrogenated oil and Glycerol monostearate are then added to the molten polyvinyl acetate. Menthol crystals is then added to the resulting mixture and mixed under high shear to completely disperse the ingredients. The resulting polymer melt is cooled and ground to produce a powdered material with a particle size of less than 420 microns. The encapsulated menthol matrix is stored in air tight containers with low humidity below 35° C.

Example 15

Encapsulation of Caffeine—Polyvinyl Acetate Matrix

Composition:

| Ingredient | Weight percent |
| --- | --- |
| Polyvinyl Acetate | 75.00% |
| Hydrogenated Oil | 3.75% |
| Glycerol Monostearate | 1.25% |
| Caffeine | 20.00% |
| Total | 100.00% |

Procedure: Polyvinyl acetate is melted at a temperature of about 90° C. in a high shear mixer such as extruder (single or twin screw) or sigma or Banbury mixer. The hydrogenated oil and Glycerol monostearate are then added to the molten polyvinyl acetate. Caffeine is then added to the resulting mixture and mixed under high shear to completely disperse the ingredients. The resulting filled polymer melt is cooled and ground to produce a powdered material with a particle size of less than 420 microns. The encapsulated caffeine matrix is stored in air tight containers with low humidity below 35° C.

Example 16

Encapsulation of Ascorbic Acid—Polyvinyl Acetate Matrix

Composition:

| Ingredient | Weight percent |
| --- | --- |
| Polyvinyl Acetate | 75.00% |
| Hydrogenated Oil | 3.75% |
| Glycerol Monostearate | 1.25% |
| Ascorbic Acid | 20.00% |
| Total | 100.00% |

Procedure: Polyvinyl acetate is melted at a temperature of about 90° C. in a high shear mixer such as extruder (single or twin screw) or sigma or Banbury mixer. The hydrogenated oil and Glycerol monostearate are then added to the molten polyvinyl acetate. Ascorbic Acid is then added to the resulting mixture and mixed under high shear to completely disperse the ingredients. The resulting polymer melt is cooled and ground to produce a powdered material with a particle size of less than 420 microns. The encapsulated Ascorbic Acid matrix is stored in air tight containers with low humidity below 35° C.

Example 17

Encapsulation of Calcium Lactate—Polyvinyl Acetate Matrix

Composition:

| Ingredient | Weight percent |
|---|---|
| Polyvinyl Acetate | 75.00% |
| Hydrogenated Oil | 3.75% |
| Glycerol Monostearate | 1.25% |
| Calcium Lactate | 20.00% |
| Total | 100.00% |

Procedure: Polyvinyl acetate is melted at a temperature of about 90° C. in a high shear mixer such as extruder (single or twin screw) or sigma or Banbury mixer. The hydrogenated oil and Glycerol monostearate are then added to the molten polyvinyl acetate. Calcium Lactate is then added to the resulting mixture and mixed under high shear to completely disperse the ingredients. The resulting polymer melt is cooled and ground to produce a powdered material with a particle size of less than 420 microns. The encapsulated Calcium Lactate matrix is stored in air tight containers with low humidity below 35° C.

Example 18

Encapsulation of Zinc Citrate—Polyvinyl Acetate Matrix

Composition:

| Ingredient | Weight percent |
|---|---|
| Polyvinyl Acetate | 75.00% |
| Hydrogenated Oil | 3.75% |
| Glycerol Monostearate | 1.25% |
| Zinc Citrate | 20.00% |
| Total | 100.00% |

Procedure: Polyvinyl acetate is melted at a temperature of about 90° C. in a high shear mixer such as extruder (single or twin screw) or sigma or Banbury mixer. The hydrogenated oil and Glycerol monostearate are then added to the molten polyvinyl acetate. Zinc Citrate is then added to the resulting mixture and mixed under high shear to completely disperse the ingredients. The resulting polymer melt is cooled and ground to produce a powdered material with a particle size of less than 420 microns. The encapsulated Zinc Citrate matrix is stored in air tight containers with low humidity below 35° C.

Example 19

Encapsulation of Niacin—Polyvinyl Acetate Matrix

Composition:

| Ingredient | Weight percent |
|---|---|
| Polyvinyl Acetate | 75.00% |
| Hydrogenated Oil | 3.75% |
| Glycerol Monostearate | 1.25% |
| Niacin | 20.00% |
| Total | 100.00% |

Procedure: Polyvinyl acetate is melted at a temperature of about 90° C. in a high shear mixer such as extruder (single or twin screw) or sigma or Banbury mixer. The hydrogenated oil and Glycerol monostearate are then added to the molten polyvinyl acetate. Niacin is then added to the resulting mixture and mixed under high shear to completely disperse the ingredients. The resulting polymer melt is cooled and ground to produce a powdered material with a particle size of less than 420 microns. The encapsulated Niacin matrix is stored in air tight containers with low humidity below 35° C.

Example 20

Encapsulation of Pyridoxine—Polyvinyl Acetate Matrix

Composition:

| Ingredient | Weight percent |
|---|---|
| Polyvinyl Acetate | 75.00% |
| Hydrogenated Oil | 3.75% |
| Glycerol Monostearate | 1.25% |
| Pyridoxine | 20.00% |
| Total | 100.00% |

Procedure: Polyvinyl acetate is melted at a temperature of about 90° C. in a high shear mixer such as extruder (single or twin screw) or sigma or Banbury mixer. The hydrogenated oil and Glycerol monostearate are then added to the molten polyvinyl acetate. Pyridoxine is then added to the resulting mixture and mixed under high shear to completely disperse the ingredients. The resulting polymer melt is cooled and ground to produce a powdered material with a particle size of less than 420 microns. The encapsulated Pyridoxine matrix is stored in air tight containers with low humidity below 35° C.

Example 21

Encapsulation of Thiamine—Polyvinyl Acetate Matrix

Composition:

| Ingredient | Weight percent |
|---|---|
| Polyvinyl Acetate | 75.00% |
| Hydrogenated Oil | 3.75% |
| Glycerol Monostearate | 1.25% |
| Thiamine | 20.00% |
| Total | 100.00% |

Procedure: Polyvinyl acetate is melted at a temperature of about 90° C. in a high shear mixer such as extruder (single or twin screw) or sigma or Banbury mixer. The hydrogenated oil and Glycerol monostearate are then added to the molten polyvinyl acetate. Thiamine is then added to the resulting mixture and mixed under high shear to completely disperse the ingredients. The resulting polymer melt is cooled and ground to produce a powdered material with a particle size of less than 420 microns. The encapsulated matrix is stored in air tight containers with low humidity below 35° C.

Example 22

Encapsulation of Riboflavin—Polyvinyl Acetate Matrix

Composition:

| Ingredient | Weight percent |
|---|---|
| Polyvinyl Acetate | 75.00% |
| Hydrogenated Oil | 3.75% |
| Glycerol Monostearate | 1.25% |
| Riboflavin | 20.00% |
| Total | 100.00% |

Procedure: Polyvinyl acetate is melted at a temperature of about 90° C. in a high shear mixer such as extruder (single or twin screw) or sigma or Banbury mixer. The hydrogenated oil and Glycerol monostearate are then added to the molten polyvinyl acetate. Riboflavin is then added to the resulting mixture and mixed under high shear to completely disperse the ingredients. The resulting encapsulation is cooled and ground to produce a powdered material with a particle size of less than 420 microns. The encapsulated Riboflavin matrix is stored in air tight containers with low humidity below 35° C.

Example 23

Encapsulation of Sucralose—Polyvinyl Acetate Matrix (Sucralose 20%)

Composition:

| Ingredient | Weight percent |
|---|---|
| Polyvinyl Acetate | 77.00% |
| Hydrogenated Oil | 3.00% |
| Sucralose | 20.00% |
| Total | 100.00% |

Procedure: Polyvinyl acetate is melted at a temperature of about 85° C. in a high shear mixer such as extruder (single or twin screw) or sigma or Banbury mixer. The hydrogenated oil is added to the molten polyvinyl acetate. Sucralose is then added to the resulting mixture and mixed under high shear to completely disperse the ingredients. The resulting filled polymer melt is cooled and ground to produce a powdered material with a particle size of less than 590 microns. The encapsulated sucralose matrix is stored in air tight containers with low humidity below 35° C.

Example 24

Multiple Encapsulation of Sucralose/Polyvinyl Acetate Matrix (from Example 23)

Composition:

| Ingredient | Grams |
|---|---|
| Center Cores | |
| Sucralose/Polymer Matrix (from Example 23) | 700.0 |
| Coating Solution | |
| Purified Water | 1168.0 |
| Gum Arabic | 293.0 |
| Total Coating solution | 1461.0 |

Procedure: Wurster process is used to encapsulate Sucralose/Polymer Matrix. Coating solution using the above mentioned recipe is prepared by stirring water and gum at 35° C. for 2 hrs. 700 gms of Sucralose/Polymer Matrix are suspended in a fluidizing air stream which provide generally cyclic flow in from of a spray nozzle. The spray nozzle sprays an atomized flow of 1461 gms of the coating solution for 115 minutes. The coated particles are then dried in the fluidized chamber for 50 minutes and stored below 35° C. under dry conditions.

Example 25 A

High Tensile Strength Encapsulation of Aspartame—Polyvinyl Acetate Matrix (Aspartame 30%). Particle Size Less than 420 Microns Composition:

| Ingredient | Weight percent |
|---|---|
| Polyvinyl Acetate | 65.00% |
| Hydrogenated Oil | 3.75% |
| Glycerol Monostearate | 1.25% |
| Aspartame | 30.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. Aspartame is then added to the resulting mixture and mixed under high shear to completely disperse the ingredients. The resulting high tensile strength/low fat content encapsulation is cooled and ground to produce a powdered material with a particle size of less than 420 microns.

Example 25 B

Low Tensile Strength Encapsulation of Aspartame—Polyvinyl Acetate Matrix (Aspartame 30%)

Composition:

| Ingredient | Weight percent |
| --- | --- |
| Polyvinyl Acetate | 50.00% |
| Hydrogenated Oil | 10.00% |
| Glycerol Monostearate | 10.00% |
| Aspartame | 30.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. Aspartame is then added to the resulting mixture and mixed under high shear to completely disperse the ingredients. The resulting low Tensile Strength encapsulation is cooled and ground to produce a powdered material with a particle size of less than 420 microns.

Example 25C

High Tensile Strength Encapsulation of Aspartame—Polyvinyl Acetate Matrix (Aspartame 30%). Particle Size Less than 177 Microns Composition:

| Ingredient | Weight percent |
| --- | --- |
| Polyvinyl Acetate | 65.00% |
| Hydrogenated Oil | 3.75% |
| Glycerol Monostearate | 1.25% |
| Aspartame | 30.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. Aspartame is then added to the resulting mixture and mixed under high shear to completely disperse the ingredients. The resulting high tensile strength/low fat content encapsulation is cooled and ground to produce a powdered material with a particle size of less than 177 microns.

Example 26

Encapsulation of AceK—Polyvinyl Acetate Matrix (AceK 30%)

Composition:

| Ingredient | Weight percent |
| --- | --- |
| Polyvinyl Acetate | 65.00% |
| Hydrogenated Oil | 3.75% |
| Glycerol Monostearate | 1.25% |
| AceK | 30.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. AceK is then added to the resulting mixture and mixed under high shear to completely disperse the ingredients. The resulting filled polymer is cooled and ground to produce a powdered material with a particle size of less than 420 microns. The encapsulated AceK matrix is stored in air tight containers with low humidity below 35° C.

Example 27

Encapsulation of Neotame—Polyvinyl Acetate Matrix (Neotame 10%)

Composition:

| Ingredient | Weight percent |
| --- | --- |
| Polyvinyl Acetate | 75.00% |
| Hydrogenated Oil | 10.00% |
| Glycerol Monostearate | 5.00% |
| Neotame | 10.00% |
| Total | 100.00% |

Procedure: Polyvinyl acetate is melted at a temperature of about 80° C. in a high shear mixer such as extruder (single or twin screw) or sigma or Banbury mixer. The hydrogenated oil and Glycerol monostearate are then added to the molten polyvinyl acetate. Neotame is then added to the resulting mixture and mixed under high shear to completely disperse the ingredients. The resulting filled polymer melt is cooled and ground to produce a powdered with a particle size of less than 420 microns. The encapsulated Neotame polymer encapsulation particles are stored in air tight containers with low humidity below 35° C.

Example 28

Encapsulation of Pectin in Polyvinyl Acetate Matrix (Pectin 30%)

Composition:

| Ingredient | Weight percent |
|---|---|
| Polyvinyl Acetate | 65.00% |
| Hydrogenated Oil | 3.75% |
| Glycerol Monostearate | 1.25% |
| Pectin | 30.00% |
| Total | 100.00% |

Procedure: Polyvinyl acetate is melted at a temperature of about 90° C. in a high shear mixer such as extruder (single or twin screw) or sigma or Banbury mixer. The hydrogenated oil and Glycerol monostearate are then added to the molten polyvinyl acetate. Pectin is then added to the resulting mixture and mixed under high shear to completely disperse the ingredients. The resulting filled polymer melt is cooled and ground to produce a powdered material with a particle size of less than 420 microns. The encapsulated pectin polymer encapsulation particles are stored in air tight containers with low humidity below 35° C.

Ingredient Examples of Multiple Ingredients in a Delivery System

Example 29

Encapsulation of Aspartame, Ace-K, and Sucralose

Composition:

| Ingredient | Weight percent |
|---|---|
| Polyvinyl Acetate | 55.00% |
| Hydrogenated Oil | 3.75% |
| Glycerol Monostearate | 1.25% |
| Aspartame | 20.00% |
| AceK | 10.00% |
| Sucralose | 10.00% |
| Total | 100.00% |

Procedure: Polyvinyl acetate is melted at a temperature of about 90° C. in a high shear mixer such as extruder (single or twin screw) or sigma or Banbury mixer. The hydrogenated oil and Glycerol monostearate are then added to the molten polyvinyl acetate. Aspartame, Ace-K, and Sucralose are then added to the resulting mixture and mixed under high shear to completely disperse the ingredients. The resulting filled polymer melt is cooled and ground to produce a powdered with a particle size of less than 420 microns. The encapsulated sweeteners are stored in air tight containers with low humidity below 35° C.

Example 30

Encapsulation of Aspartame, Ace-K, and Glycyrrhizin

Composition:

| Ingredient | Weight percent |
|---|---|
| Polyvinyl Acetate | 55.00% |
| Hydrogenated Oil | 3.75% |
| Glycerol Monostearate | 1.25% |
| Aspartame | 20.00% |
| Ace-K | 10.00% |
| Glycyrrhizin | 10.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. Aspartame, Ace-K, and Glycyrrhizin are then added to the resulting mixture and mixed under high shear to completely disperse the ingredients. The resulting filled polymer melt is cooled and ground to produce a powdered material with a particle size of less than 420 microns. The encapsulated sweeteners are stored in air tight containers with low humidity below 35° C.

Example 31

Encapsulation of Aspartame, Ace-K, and Menthol

Composition:

| Ingredient | Weight percent |
|---|---|
| Polyvinyl Acetate | 55.00% |
| Hydrogenated Oil | 3.75% |
| Glycerol Monostearate | 1.25% |
| Aspartame | 20.00% |
| Ace-K | 10.00% |
| Menthol | 10.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. Aspartame, Ace-K, and Menthol are then added to the resulting mixture and mixed under high shear to completely disperse the ingredients. The resulting filled polymer melt is cooled and ground to produce a powdered with a particle size of less than 420 microns. The encapsulated sweeteners are stored in air tight containers with low humidity below 35° C.

Example 32

Encapsulation of Aspartame, Ace-K, and Adipic Acid

Composition:

| Ingredient | Weight percent |
|---|---|
| Polyvinyl Acetate | 55.00% |
| Hydrogenated Oil | 3.75% |
| Glycerol Monostearate | 1.25% |
| Aspartame | 10.00% |
| Ace-K | 5.00% |
| Adipic acid | 25.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. Aspartame, Ace-K, and Adipic Acid are then added to the resulting mixture and mixed under high shear to completely disperse the ingredients. The resulting filled polymer melt is cooled and ground to produce a powdered material with a particle size of less than 420 microns. The encapsulated sweeteners are stored in air tight containers with low humidity below 35° C.

Example 33

Encapsulation of Adipic, Citric, and Malic Acid

Composition:

| Ingredient | Weight percent |
|---|---|
| Polyvinyl Acetate | 55.00% |
| Hydrogenated Oil | 3.75% |
| Glycerol Monostearate | 1.25% |
| Adipic Acid | 10.00% |
| Citric Acid | 20.00% |
| Malic Acid | 10.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. Adipic, Citric, and Malic Acid are then added to the resulting mixture and mixed under high shear to completely disperse the ingredients. The resulting filled polymer melt is cooled and ground to produce a powdered with a particle size of less than 420 microns. The encapsulated sweeteners are stored in air tight containers with low humidity below 35° C.

Example 34

Encapsulation of Sucralose, and Citric Acid

Composition:

| Ingredient | Weight percent |
|---|---|
| Polyvinyl Acetate | 55.00% |
| Hydrogenated Oil | 3.75% |
| Glycerol Monostearate | 1.25% |
| Sucralose | 10.00% |
| Citric Acid | 30.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. Sucralose and Citric Acid are then added to the resulting mixture and mixed under high shear to completely disperse the ingredients. The resulting filled polymer melt is cooled and ground to produce a powdered material with a particle size of less than 420 microns. The encapsulation is stored in air tight containers with low humidity below 35° C.

Example 35

Encapsulation of Sucralose and Adipic Acid

Composition:

| Ingredient | Weight percent |
|---|---|
| Polyvinyl Acetate | 55.00% |
| Hydrogenated Oil | 3.75% |
| Glycerol Monostearate | 1.25% |
| Sucralose | 10.00% |
| Adipic Acid | 30.00% |
| Total | 100.00% |

Procedure: Polyvinyl acetate is melted at a temperature of about 90° C. in a high shear mixer such as extruder (single or twin screw) or sigma or Banbury mixer. The hydrogenated oil and Glycerol monostearate are then added to the molten polyvinyl acetate. Sucralose and Adipic Acid are then added to the resulting mixture and mixed under high shear to completely disperse the ingredients. The resulting filled polymer melt is cooled and ground to produce a powdered with a particle size of less than 420 microns. The encapsulation is stored in air tight containers with low humidity below 35° C.

Example 36

Encapsulation of Aspartame and Salt

Composition:

| Ingredient | Weight percent |
|---|---|
| Polyvinyl Acetate | 55.00% |
| Hydrogenated Oil | 3.75% |
| Glycerol Monostearate | 1.25% |
| Aspartame | 20.00% |
| Salt | 20.00% |
| Total | 100.00% |

Procedure: Polyvinyl acetate is melted at a temperature of about 90° C. in a high shear mixer such as extruder (single or twin screw) or sigma or Banbury mixer. The hydrogenated oil and Glycerol monostearate are then added to the molten polyvinyl acetate. Aspartame and Salt are then added to the resulting mixture and mixed under high shear to completely disperse the ingredients. The resulting filled polymer melt is cooled and ground to produce a powdered material with a particle size of less than 420 microns. The encapsulation is stored in air tight containers with low humidity below 35° C.

Example 37

Encapsulation of Aspartame with WS-3

Composition:

| Ingredient | Weight percent |
|---|---|
| Polyvinyl Acetate | 65.00% |
| Hydrogenated Oil | 3.75% |
| Glycerol Monostearate | 1.25% |
| Aspartame | 20.00% |
| WS-3 | 10.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. Aspartame and WS-3 are then added to the resulting mixture and mixed under high shear to completely disperse the ingredients. The resulting filled polymer melt is cooled and ground to produce a powdered material with a particle size of less than 420 microns. The encapsulation is stored in air tight containers with low humidity below 35° C.

Example 38

Encapsulation of Sucralose with WS-23

Composition:

| Ingredient | Weight percent |
|---|---|
| Polyvinyl Acetate | 75.00% |
| Hydrogenated Oil | 3.75% |
| Glycerol Monostearate | 1.25% |
| Sucralose | 10.00% |
| WS-23 | 10.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. Sucralose and WS-23 are then added to the resulting mixture and mixed under high shear to completely disperse the ingredients. The resulting filled polymer melt is cooled and ground to produce a powdered material with a particle size of less than 420 microns. The encapsulation is stored in air tight containers with low humidity below 35° C.

Example 39

Encapsulation of Sucralose and Menthol

Composition:

| Ingredient | Weight percent |
|---|---|
| Polyvinyl Acetate | 70.00% |
| Hydrogenated Oil | 3.75% |
| Glycerol Monostearate | 1.25% |
| Sucralose | 10.00% |
| Menthol | 15.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. Sucralose and Menthol are then added to the resulting mixture and mixed under high shear to completely disperse the ingredients. The resulting filled polymer melt is cooled and ground to produce a powdered material with a particle size of less than 420 microns. The encapsulation is stored in air tight containers with low humidity below 35° C.

Example 40

Encapsulation of Aspartame and Neotame

Composition:

| Ingredient | Weight percent |
|---|---|
| Polyvinyl Acetate | 60.00% |
| Hydrogenated Oil | 3.75% |
| Glycerol Monostearate | 1.25% |
| Aspartame | 30.00% |
| Neotame | 5.00% |
| Total | 100.00% |

Procedure: Polyvinyl acetate is melted at a temperature of about 80° C. in a high shear mixer such as extruder (single or twin screw) or sigma or Banbury mixer. The hydrogenated oil and Glycerol monostearate are then added to the molten polyvinyl acetate. Aspartame and Neotame are then added to the resulting mixture and mixed under high shear to completely disperse the ingredients. The resulting encapsulation is cooled and ground to produce a powdered material with a particle size of less than 420 microns. The encapsulation matrix is stored in air tight containers with low humidity below 35° C.

Example 41

Encapsulation of Aspartame and Adenosine Monophosphate (Bitterness Inhibitor)

Composition:

| Ingredient | Weight percent |
| --- | --- |
| Polyvinyl Acetate | 65.00% |
| Hydrogenated Oil | 3.75% |
| Glycerol Monostearate | 1.25% |
| Aspartame | 20.00% |
| Adenosine monophosphate (AMP) | 10.00% |
| Total | 100.00% |

Procedure: Polyvinyl acetate is melted at a temperature of about 90° C. in a high shear mixer such as extruder (single or twin screw) or sigma or Banbury mixer. The hydrogenated oil and Glycerol monostearate are then added to the molten polyvinyl acetate. Aspartame and AMP are then added to the resulting mixture and mixed under high shear to completely disperse the ingredients. The resulting filled polymer melt is cooled and ground to produce a powdered material with the particle size of less than 420 microns. The encapsulation is stored in air tight containers with low humidity below 35° C.

Example 42

Encapsulation of Aspartame and Caffeine

Composition:

| Ingredient | Weight percent |
| --- | --- |
| Polyvinyl Acetate | 60.00% |
| Hydrogenated Oil | 3.75% |
| Glycerol Monostearate | 1.25% |
| Aspartame | 20.00% |
| Caffeine | 15.00% |
| Total | 100.00% |

Procedure: Polyvinyl acetate is melted at a temperature of about 90° C. in a high shear mixer such as extruder (single or twin screw) or sigma or Banbury mixer. The hydrogenated oil and Glycerol monostearate are then added to the molten polyvinyl acetate. Aspartame and Caffeine are then added to the resulting mixture and mixed under high shear to completely disperse the ingredients. The resulting filled polymer melt is cooled and ground to produce a powdered material with the particle size of less than 420 microns. The encapsulation is stored in air tight containers with low humidity below 35° C.

Example 43

Encapsulation of Sucralose and Calcium Lactate

Composition:

| Ingredient | Weight percent |
| --- | --- |
| Polyvinyl Acetate | 55.00% |
| Hydrogenated Oil | 3.75% |
| Glycerol Monostearate | 1.25% |
| sucralose | 10.00% |
| Calcium Lactate | 30.00% |
| Total | 100.00% |

Procedure: Polyvinyl acetate is melted at a temperature of about 90° C. in a high shear mixer such as extruder (single or twin screw) or sigma or Banbury mixer. The hydrogenated oil and Glycerol monostearate are then added to the molten polyvinyl acetate. Aspartame and Calcium Lactate are then added to the resulting mixture and mixed under high shear to completely disperse the ingredients. The resulting filled polymer melt is cooled and ground to produce a powdered material with the particle size of less than 420 microns. The encapsulation is stored in air tight containers with low humidity below 35° C.

Example 44

Encapsulation of Sucralose and Vitamin C

Composition:

| Ingredient | Weight percent |
| --- | --- |
| Polyvinyl Acetate | 65.00% |
| Hydrogenated Oil | 3.75% |
| Glycerol Monostearate | 1.25% |
| Sucralose | 10.00% |
| Ascorbic Acid (Vitamin C) | 20.00% |
| Total | 100.00% |

Procedure: Polyvinyl acetate is melted at a temperature of about 90° C. in a high shear mixer such as extruder (single or twin screw) or sigma or Banbury mixer. The hydrogenated oil and Glycerol monostearate are then added to the molten polyvinyl acetate. Sucralose and Ascorbic Acid is then added to the resulting mixture and mixed under high shear to completely disperse the ingredients. The resulting filled polymer melt is cooled and ground to produce a powdered material with the particle size of less than 420 microns. The encapsulation is stored in air tight containers with low humidity below 35° C.

Example 45

Encapsulation of Aspartame and Niacin

Composition:

| Ingredient | Weight percent |
|---|---|
| Polyvinyl Acetate | 65.00% |
| Hydrogenated Oil | 3.75% |
| Glycerol Monostearate | 1.25% |
| Aspartame | 15.00% |
| Niacin | 15.00% |
| Total | 100.00% |

Procedure: Polyvinyl acetate is melted at a temperature of about 90° C. in a high shear mixer such as extruder (single or twin screw) or sigma or Banbury mixer. The hydrogenated oil and Glycerol monostearate are then added to the molten polyvinyl acetate. Aspartame and Niacin are then added to the resulting mixture and mixed under high shear to completely disperse the ingredients. The resulting polymer melt is cooled and ground to produce a powdered material with the particle size of less than 420 microns. The encapsulation is stored in air tight containers with low humidity below 35° C.

Example 46

Encapsulation of Sucralose and Folic Acid

Composition:

| Ingredient | Weight percent |
|---|---|
| Polyvinyl Acetate | 75.00% |
| Hydrogenated Oil | 3.75% |
| Glycerol Monostearate | 1.25% |
| Sucralose | 10.00% |
| Folic Acid | 10.00% |
| Total | 100.00% |

Procedure: Polyvinyl acetate is melted at a temperature of about 90° C. in a high shear mixer such as extruder (single or twin screw) or sigma or Banbury mixer. The hydrogenated oil and Glycerol monostearate are then added to the molten polyvinyl acetate. Sucralose and Folic Acid are then added to the resulting mixture and mixed under high shear to completely disperse the ingredients. The resulting polymer melt is cooled and ground to produce a powdered material with the particle size of less than 420 microns. The encapsulation is stored in air tight containers with low humidity below 35° C.

Example 47

Encapsulation of Mixed Aspartame and AceK—Polyvinyl Acetate Matrix (Actives=30%)

Composition:

| Ingredient | Weight percent |
|---|---|
| Polyvinyl Acetate | 65.00% |
| Hydrogenated Oil | 3.75% |
| Glycerol Monostearate | 1.25% |
| Aspartame | 21.00% |
| AceK | 9.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. Aspartame and AceK (60/40) are then added to the resulting mixture and mixed under high shear to completely disperse the ingredients. The resulting filled polymer melt is cooled and ground to produce a powdered material with the particle size of less than 420 microns. The mixed Aspartame and AceK encapsulation matrix is stored in air tight containers with low humidity below 35° C.

Example 48

Encapsulation of Mixed WS-3 and WS-23—Polyvinyl Acetate Matrix

Composition:

| Ingredient | Weight percent |
|---|---|
| Polyvinyl Acetate | 65.00% |
| Hydrogenated Oil | 3.75% |
| Glycerol Monostearate | 1.25% |
| Cooling sensate WS-3 | 15.00% |
| Cooling sensate WS-23 | 15.00% |
| Total | 100.00% |

Procedure: Polyvinyl acetate is melted at a temperature of about 80° C. in a high shear mixer such as extruder (single or twin screw) or sigma or Banbury mixer. The hydrogenated oil and Glycerol monostearate are then added to the molten polyvinyl acetate. WS-3 and WS-23 are then added to the resulting mixture and mixed under high shear to completely disperse the ingredients. The resulting filled polymer melt is cooled and ground to produce a powdered material with the particle size of less than 420 microns. The mixed WS-3 and WS-23 encapsulation matrix is stored in air tight containers with low humidity below 35° C.

Example 49

Encapsulation of Mixed Aspartame and Calciumcarbonate—Polyvinyl Acetate Matrix Composition:

| Ingredient | Weight percent |
| --- | --- |
| Polyvinyl Acetate | 60.00% |
| Hydrogenated Oil | 3.75% |
| Glycerol Monostearate | 1.25% |
| Aspartame | 20.00% |
| Calciumcarbonate | 15.00% |
| Total | 100.00% |

Procedure: Polyvinyl acetate is melted at a temperature of about 80° C. in a high shear mixer such as extruder (single or twin screw) or sigma or Banbury mixer. The hydrogenated oil and Glycerol monostearate are then added to the molten polyvinyl acetate. Aspartame and calcium carbonate are then added to the resulting mixture and mixed under high shear to completely disperse the ingredients. The resulting filled polymer melt is cooled and ground to produce a powdered material with the particle size of less than 420 microns. The mixed aspartame and calcium carbonate encapsulation matrix is stored in air tight containers with low humidity below 35° C.

Example 50

Encapsulation of Mixed Aspartame and Talc—Polyvinyl Acetate Matrix

Composition:

| Ingredient | Weight percent |
| --- | --- |
| Polyvinyl Acetate | 60.00% |
| Hydrogenated Oil | 3.75% |
| Glycerol Monostearate | 1.25% |
| Aspartame | 20.00% |
| Talc | 15.00% |
| Total | 100.00% |

Procedure: Polyvinyl acetate is melted at a temperature of about 80° C. in a high shear mixer such as extruder (single or twin screw) or sigma or Banbury mixer. The hydrogenated oil and Glycerol monostearate are then added to the molten polyvinyl acetate. Aspartame and Talc are then added to the resulting mixture and mixed under high shear to completely disperse the ingredients. The resulting filled polymer melt is cooled and ground to produce a powdered material with the particle size of less than 420 microns. The mixed aspartame and talc encapsulation matrix is stored in air tight containers with low humidity below 35° C.

Ingredient Examples of Single Oral Care Ingredients in a Delivery System

Example 51

Encapsulation of Sodium Tripolyphosphate (Sodiumtirployphosphate)—Polyvinyl Acetate Matrix Composition:

| Ingredient | Weight percent |
| --- | --- |
| Polyvinyl Acetate | 55.00% |
| Hydrogenated Oil | 3.75% |
| Glycerol Monostearate | 1.25% |
| Sodiumtripolyphosphate | 40.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. Sodiumtriphosphate is then added to the resulting mixture and mixed under high shear to completely disperse the ingredients. The resulting filled polymer melt is cooled and ground to produce a powdered material with the particle size of less than 420 microns. The encapsulation matrix is stored in air tight containers with low humidity below 35° C.

Example 52

Encapsulation of Sodium Fluoride (NaF)—Polyvinyl Acetate Matrix

Composition:

| Ingredient | Weight percent |
| --- | --- |
| Polyvinyl Acetate | 65.00% |
| Hydrogenated Oil | 3.75% |
| Glycerol Monostearate | 1.25% |
| Sodium Fluoride | 30.00% |
| Total | 100.00% |

Procedure: Polyvinyl acetate is melted at a temperature of about 80° C. in a high shear mixer such as extruder (single or twin screw) or sigma or Banbury mixer. The hydrogenated oil and Glycerol monostearate are then added to the molten polyvinyl acetate. NaF is then added to the resulting mixture and mixed under high shear to completely disperse the ingredients. The resulting filled polymer melt is cooled and ground to produce a powdered material with the particle size of less than 420 microns. The encapsulation matrix is stored in air tight containers with low humidity below 35° C.

Example 53

Encapsulation of Calcium Peroxide—Polyvinyl Acetate Matrix

Composition:

| Ingredient | Weight percent |
|---|---|
| Polyvinyl Acetate | 55.00% |
| Hydrogenated Oil | 3.75% |
| Glycerol Monostearate | 1.25% |
| Calcium Peroxide | 40.00% |
| Total | 100.00% |

Procedure: Polyvinyl acetate is melted at a temperature of about 80° C. in a high shear mixer such as extruder (single or twin screw) or sigma or Banbury mixer. The hydrogenated oil and Glycerol monostearate are then added to the molten polyvinyl acetate. Calcium peroxide is then added to the resulting mixture and mixed under high shear to completely disperse the ingredients. The resulting filled polymer melt is cooled and ground to produce a powdered material with the particle size of less than 420 microns. The encapsulation matrix is stored in air tight containers with low humidity below 35° C.

Example 54

Encapsulation of Zinc Chloride—Polyvinyl Acetate Matrix

Composition:

| Ingredient | Weight percent |
|---|---|
| Polyvinyl Acetate | 65.00% |
| Hydrogenated Oil | 3.75% |
| Glycerol Monostearate | 1.25% |
| Zinc Chloride | 30.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. zinc Chloride is then added to the resulting mixture and mixed under high shear to completely disperse the ingredients. The resulting filled polymer melt is cooled and ground to produce a powdered material with the particle size of less than 420 microns. The encapsulation matrix is stored in air tight containers with low humidity below 35° C.

Example 55

Encapsulation of Carbamide Peroxide—Polyvinyl Acetate Matrix

Composition:

| Ingredient | Weight percent |
|---|---|
| Polyvinyl Acetate | 55.00% |
| Hydrogenated Oil | 3.75% |
| Glycerol Monostearate | 1.25% |
| Carbamide Peroxide | 40.00% |
| Total | 100.00% |

Procedure: Polyvinyl acetate is melted at a temperature of about 80° C. in a high shear mixer such as extruder (single or twin screw) or sigma or Banbury mixer. The hydrogenated oil and Glycerol monostearate are then added to the molten polyvinyl acetate. Carbamide peroxide is then added to the resulting mixture and mixed under high shear to completely disperse the ingredients. The resulting filled polymer melt is cooled and ground to produce a powdered material with the particle size of less than 420 microns. The encapsulation matrix is stored in air tight containers with low humidity below 35° C.

Example 56

Encapsulation of Potassium Nitrate (KNO3)—Polyvinyl Acetate Matrix

Composition:

| Ingredient | Weight percent |
|---|---|
| Polyvinyl Acetate | 55.00% |
| Hydrogenated Oil | 3.75% |
| Glycerol Monostearate | 1.25% |
| Potassium Nitrate | 40.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. KNO3 is then added to the resulting mixture and mixed under high shear to completely disperse the ingredients. The resulting filled polymer melt is cooled and ground to produce a powdered material with the particle size of less than 420 microns. The encapsulation matrix is stored in air tight containers with low humidity below 35° C.

Example 57

Encapsulation of Chlorhexidine—Polyvinyl Acetate Matrix

Composition:

| Ingredient | Weight percent |
| --- | --- |
| Polyvinyl Acetate | 55.00% |
| Hydrogenated Oil | 3.75% |
| Glycerol Monostearate | 1.25% |
| Chlorhexidine | 40.00% |
| Total | 100.00% |

Procedure: Polyvinyl acetate is melted at a temperature of about 80° C. in a high shear mixer such as extruder (single or twin screw) or sigma or Banbury mixer. The hydrogenated oil and Glycerol monostearate are then added to the molten polyvinyl acetate. Chlorhexidine is then added to the resulting mixture and mixed under high shear to completely disperse the ingredients. The resulting filled polymer melt is cooled and ground to produce a powdered material with the particle size of less than 420 microns. The encapsulation matrix is stored in air tight containers with low humidity below 35° C.

Example 58

Encapsulation of Sodium Stearate—Polyvinyl Acetate Matrix

Composition:

| Ingredient | Weight percent |
| --- | --- |
| Polyvinyl Acetate | 55.00% |
| Hydrogenated Oil | 3.75% |
| Glycerol Monostearate | 1.25% |
| Sodium stearate | 40.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. Sodium Stearate is then added to the resulting mixture and mixed under high shear to completely disperse the ingredients. The resulting filled polymer melt is cooled and ground to produce a powdered material with the particle size of less than 420 microns. The encapsulation matrix is stored in air tight containers with low humidity below 35° C.

Example 59

Encapsulation of Sodium Bicarbonate—Polyvinyl Acetate Matrix

Composition:

| Ingredient | Weight percent |
| --- | --- |
| Polyvinyl Acetate | 55.00% |
| Hydrogenated Oil | 3.75% |
| Glycerol Monostearate | 1.25% |

-continued

| Ingredient | Weight percent |
| --- | --- |
| Sodium Bicarbonate | 40.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. NaHCO3 is then added to the resulting mixture and mixed under high shear to completely disperse the ingredients. The resulting filled polymer melt is cooled and ground to produce a powdered material with the particle size of less than 420 microns. The encapsulation matrix is stored in air tight containers with low humidity below 35° C.

Example 60

Encapsulation of Cetylpridinium Chloride (CPC)—Polyvinyl Acetate Matrix

Composition:

| Ingredient | Weight percent |
| --- | --- |
| Polyvinyl Acetate | 55.00% |
| Hydrogenated Oil | 3.75% |
| Glycerol Monostearate | 1.25% |
| Cetylpridinium chloride | 40.00% |
| Total | 100.00% |

Procedure: Polyvinyl acetate is melted at a temperature of about 80° C. in a high shear mixer such as extruder (single or twin screw) or sigma or Banbury mixer. The hydrogenated oil and Glycerol monostearate are then added to the molten polyvinyl acetate. CPC is then added to the resulting mixture and mixed under high shear to completely disperse the ingredients. The resulting filled polymer melt is cooled and ground to produce a powdered material with the particle size of less than 420 microns. The encapsulation matrix is stored in air tight containers with low humidity below 35° C.

Example 61

Encapsulation of Calcium Casein Peptone—Calcium Phosphate CCP-CP (Recaldent)—Polyvinyl Acetate Matrix Composition:

| Ingredient | Weight percent |
| --- | --- |
| Polyvinyl Acetate | 55.00% |
| Hydrogenated Oil | 3.75% |
| Glycerol Monostearate | 1.25% |
| Recaldent | 40.00% |
| Total | 100.00% |

Procedure: Polyvinyl acetate is melted at a temperature of about 80° C. in a high shear mixer such as extruder (single or twin screw) or sigma or Banbury mixer. The hydrogenated oil and Glycerol monostearate are then added to the molten polyvinyl acetate. Recaldent is then added to the resulting mixture and mixed under high shear to completely disperse the ingredients. The resulting filled polymer melt is cooled and ground to produce a powdered material with the particle size of less than 420 microns. The encapsulation matrix is stored in air tight containers with low humidity below 35° C.

Example 62

Encapsulation of Sodium Ricinoleate—Polyvinyl Acetate Matrix

Composition:

| Ingredient | Weight percent |
| --- | --- |
| Polyvinyl Acetate | 55.00% |
| Hydrogenated Oil | 3.75% |
| Glycerol Monostearate | 1.25% |
| Sodium Ricinoleate | 40.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. Sodium ricinoleate is then added to the resulting mixture and mixed under high shear to completely disperse the ingredients. The resulting filled polymer melt is cooled and ground to produce a powdered material with the particle size of less than 420 microns. The encapsulation matrix is stored in air tight containers with low humidity below 35° C.

Example 63

Encapsulation of Sodium Hexametaphosphate (Sodiumhexametaphosphate)—Polyvinyl Acetate Matrix Composition:

| Ingredient | Weight percent |
| --- | --- |
| Polyvinyl Acetate | 55.00% |
| Hydrogenated Oil | 3.75% |
| Glycerol Monostearate | 1.25% |
| Sodium Hexametaphosphate | 40.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. Sodiumhexametaphosphate is then added to the resulting mixture and mixed under high shear to completely disperse the ingredients. The resulting filled polymer melt is cooled and ground to produce a powdered material with the particle size of less than 420 microns. The encapsulation matrix is stored in air tight containers with low humidity below 35° C.

Example 64

Encapsulation of Urea—Polyvinyl Acetate Matrix

Composition:

| Ingredient | Weight percent |
| --- | --- |
| Polyvinyl Acetate | 55.00% |
| Hydrogenated Oil | 3.75% |
| Glycerol Monostearate | 1.25% |
| Urea | 40.00% |
| Total | 100.00% |

Procedure: Polyvinyl acetate is melted at a temperature of about 80° C. in a high shear mixer such as extruder (single or twin screw) or sigma or Banbury mixer. The hydrogenated oil and Glycerol monostearate are then added to the molten polyvinyl acetate. Urea is then added to the resulting mixture and mixed under high shear to completely disperse the ingredients. The resulting filled polymer melt is cooled and ground to produce a powdered material with the particle size of less than 420 microns. The encapsulation matrix is stored in air tight containers with low humidity below 35° C.

Ingredient Examples of Multiple Oral Care Ingredients in a Delivery System

Example 65

Encapsulation of Sodiumtripolyphosphate (STP) and Sodium Stearate—Polyvinyl Acetate Matrix Composition:

| Ingredient | Weight percent |
| --- | --- |
| Polyvinyl Acetate | 55.00% |
| Hydrogenated Oil | 3.75% |
| Glycerol Monostearate | 1.25% |
| Sodiumtripolyphosphate | 20.00% |
| Sodium stearate | 10.00% |
| Sucralose | 10.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. Actives are then added to the resulting mixture and mixed under high shear to completely disperse the ingredients. The resulting filled polymer melt is cooled and ground to produce a powdered material with the particle size of less than 420 microns. The encapsulation matrix is stored in air tight containers with low humidity below 35° C.

Example 66

Encapsulation of Sodium Fluoride and Sodiumtripolyphosphate—Polyvinyl Acetate Matrix Composition:

| Ingredient | Weight percent |
|---|---|
| Polyvinyl Acetate | 57.00% |
| Hydrogenated Oil | 3.75% |
| Glycerol Monostearate | 1.25% |
| Sodiumtripolyphosphate | 25.00% |
| Sodium Fluoride | 3.00% |
| Sucralose | 10.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. Actives are then added to the resulting mixture and mixed under high shear to completely disperse the ingredients. The resulting filled polymer melt is cooled and ground to produce a powdered material with the particle size of less than 420 microns. The encapsulation matrix is stored in air tight containers with low humidity below 35° C.

Example 67

Encapsulation of Calcium peroxide and Sodiumhexamataphosphate—Polyvinyl Acetate Matrix Composition:

| Ingredient | Weight percent |
|---|---|
| Polyvinyl Acetate | 55.00% |
| Hydrogenated Oil | 3.75% |
| Glycerol Monostearate | 1.25% |
| Calcium Peroxide | 7.00% |
| Sodiumhexamataphosphate | 23.00% |
| Sucralose | 10.00% |
| Total | 100.00% |

Procedure: Polyvinyl acetate is melted at a temperature of about 80° C. in a high shear mixer such as extruder (single or twin screw) or sigma or Banbury mixer. The hydrogenated oil and Glycerol monostearate are then added to the molten polyvinyl acetate. Actives are then added to the resulting mixture and mixed under high shear to completely disperse the ingredients. The resulting filled polymer melt is cooled and ground to produce a powdered material with the particle size of less than 420 microns. The encapsulation matrix is stored in air tight containers with low humidity below 35° C.

Example 68

Encapsulation of Zinc Chloride and Sodiumtripolyphosphate—Polyvinyl Acetate Matrix Composition:

| Ingredient | Weight percent |
|---|---|
| Polyvinyl Acetate | 55.00% |
| Hydrogenated Oil | 3.75% |
| Glycerol Monostearate | 1.25% |
| Zinc Chloride | 4.00% |
| Sodiumtripolyphosphate | 26.00% |
| Aspartame | 10.00% |
| Total | 100.00% |

Procedure: Polyvinyl acetate is melted at a temperature of about 80° C. in a high shear mixer such as extruder (single or twin screw) or sigma or Banbury mixer. The hydrogenated oil and Glycerol monostearate are then added to the molten polyvinyl acetate. Actives are then added to the resulting mixture and mixed under high shear to completely disperse the ingredients. The resulting filled polymer melt is cooled and ground to produce a powdered material with the particle size of less than 420 microns. The encapsulation matrix is stored in air tight containers with low humidity below 35° C.

Example 69

Encapsulation of Carbamide Peroxide and Sodiumtripolyphosphate in Polyvinylacetate Encapsulation Composition:

| Ingredient | Weight percent |
|---|---|
| Polyvinyl Acetate | 55.00% |
| Hydrogenated Oil | 3.75% |
| Glycerol Monostearate | 1.25% |
| Sodiumtripolyphosphate | 20.00% |
| Carbamide Peroxide | 10.00% |
| Sucralose | 10.00% |
| Total | 100.00% |

Procedure: Polyvinyl acetate is melted at a temperature of about 80° C. in a high shear mixer such as extruder (single or twin screw) or sigma or Banbury mixer. The hydrogenated oil and Glycerol monostearate are then added to the molten polyvinyl acetate. Actives are then added to the resulting mixture and mixed under high shear to completely disperse the ingredients. The resulting filled polymer melt is cooled and ground to produce a powdered material with the particle size of less than 420 microns. The encapsulation matrix is stored in air tight containers with low humidity below 35° C.

Example 70

Encapsulation of Potassium Nitrate (KNO3) and Sodiumtripolyphosphate—Polyvinyl Acetate Matrix Composition:

| Ingredient | Weight percent |
|---|---|
| Polyvinyl Acetate | 55.00% |
| Hydrogenated Oil | 3.75% |
| Glycerol Monostearate | 1.25% |
| Potassium Nitrate | 10.00% |
| Sodiumtripolyphosphate | 20.00% |
| Sucralose | 10.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. Actives are then added to the resulting mixture and mixed under high shear to completely disperse the ingredients. The resulting filled polymer melt is cooled and ground to produce a powdered material with the particle size of less than 420 microns. The encapsulation matrix is stored in air tight containers with low humidity below 35° C.

Example 71

Encapsulation of Chlorhexidine, Sodiumpolyphosphate and Sodium Fluoride—Polyvinyl Acetate Matrix Composition:

| Ingredient | Weight percent |
|---|---|
| Polyvinyl Acetate | 55.00% |
| Hydrogenated Oil | 3.75% |
| Glycerol Monostearate | 1.25% |
| Chlorhexidine | 4.00% |
| Sodiumtripolyphosphate | 23.00% |
| Sodium Fluoride | 3.00% |
| Aspartame | 10.00% |
| Total | 100.00% |

Procedure: Polyvinyl acetate is melted at a temperature of about 80° C. in a high shear mixer such as extruder (single or twin screw) or sigma or Banbury mixer. The hydrogenated oil and Glycerol monostearate are then added to the molten polyvinyl acetate. Actives are then added to the resulting mixture and mixed under high shear to completely disperse the ingredients. The resulting filled polymer melt is cooled and ground to produce a powdered material with the particle size of less than 420 microns. The encapsulation matrix is stored in air tight containers with low humidity below 35° C.

Example 72

Encapsulation of Sodium Stearate, Sodiumtripolyphosphate and Menthol-Polyvinyl Acetate Matrix Composition:

| Ingredient | Weight percent |
|---|---|
| Polyvinyl Acetate | 55.00% |
| Hydrogenated Oil | 3.75% |
| Glycerol Monostearate | 1.25% |
| Sodium stearate | 4.00% |
| Sodiumtripolyphosphate | 19.00% |
| Menthol | 7.00% |
| Sucralose | 10.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. Actives are then added to the resulting mixture and mixed under high shear to completely disperse the ingredients. The resulting filled polymer melt is cooled and ground to produce a powdered material with the particle size of less than 420 microns. The encapsulation matrix is stored in air tight containers with low humidity below 35° C.

Example 73

Encapsulation of Sodium Bicarbonate, Sodiumtripolyphosphate and Sodium Stearate—Polyvinyl Acetate Matrix Composition:

| Ingredient | Weight percent |
|---|---|
| Polyvinyl Acetate | 55.00% |
| Hydrogenated Oil | 3.75% |
| Glycerol Monostearate | 1.25% |
| Sodium stearate | 4.00% |
| Sodiumtripolyphosphate | 19.00% |
| Sodium bicarbonate | 7.00% |
| Sucralose | 10.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. Actives are then added to the resulting mixture and mixed under high shear to completely disperse the ingredients. The resulting filled polymer melt is cooled and ground to produce a powdered material with the particle size of less than 420 microns. The encapsulation matrix is stored in air tight containers with low humidity below 35° C.

Example 74

Encapsulation of Cetylpridinium Chloride (CPC), Sodium Fluoride and Sodiumtripolyphosphate—Polyvinyl Acetate Matrix Composition:

| Ingredient | Weight percent |
|---|---|
| Polyvinyl Acetate | 55.00% |
| Hydrogenated Oil | 3.75% |
| Glycerol Monostearate | 1.25% |
| Cetylpridinium chloride | 4.00% |
| Sodiumtripolyphosphate | 23.00% |
| Sodium Fluoride | 3.00% |
| Sucralose | 10.00% |
| Total | 100.00% |

Procedure: Polyvinyl acetate is melted at a temperature of about 80° C. in a high shear mixer such as extruder (single or twin screw) or sigma or Banbury mixer. The hydrogenated oil and Glycerol monostearate are then added to the molten polyvinyl acetate. Actives are then added to the resulting mixture and mixed under high shear to completely disperse the ingredients. The resulting filled polymer melt is cooled and ground to produce a powdered material with the particle size of less than 420 microns. The encapsulation matrix is stored in air tight containers with low humidity below 35° C.

Example 75

Encapsulation of Calcium Casein Peptone—Calcium Phosphate CCP-CP (Recaldent) and Sodiumtripolyphosphate—Polyvinyl Acetate Matrix Composition:

| Ingredient | Weight percent |
|---|---|
| Polyvinyl Acetate | 55.00% |
| Hydrogenated Oil | 3.75% |
| Glycerol Monostearate | 1.25% |
| Recaldent | 10.00% |
| Sodiumtripolyphosphate | 20.00% |
| Sucralose | 10.00% |
| Total | 100.00% |

Procedure: Polyvinyl acetate is melted at a temperature of about 80° C. in a high shear mixer such as extruder (single or twin screw) or sigma or Banbury mixer. The hydrogenated oil and Glycerol monostearate are then added to the molten polyvinyl acetate. Actives are then added to the resulting mixture and mixed under high shear to completely disperse the ingredients. The resulting filled polymer melt is cooled and ground to produce a powdered material with the particle size of less than 420 microns. The encapsulation matrix is stored in air tight containers with low humidity below 35° C.

Example 76

Encapsulation of Sodium Ricinoleate and Sodiumtripolyphosphate—Polyvinyl Acetate Matrix Composition:

| Ingredient | Weight percent |
|---|---|
| Polyvinyl Acetate | 55.00% |
| Hydrogenated Oil | 3.75% |
| Glycerol Monostearate | 1.25% |
| Sodium Ricinoleate | 4.00% |
| Sodiumtripolyphosphate | 26.00% |
| Aspartame | 10.00% |
| Total | 100.00% |

Procedure: Polyvinyl acetate is melted at a temperature of about 80° C. in a high shear mixer such as extruder (single or twin screw) or sigma or Banbury mixer. The hydrogenated oil and Glycerol monostearate are then added to the molten polyvinyl acetate. Actives are then added to the resulting mixture and mixed under high shear to completely disperse the ingredients. The resulting filled polymer melt is cooled and ground to produce a powdered material with the particle size of less than 420 microns. The encapsulation matrix is stored in air tight containers with low humidity below 35° C.

Example 77

Encapsulation of Sodium Hexametaphosphate (SHMP) and Sodium Stearate—Polyvinyl Acetate Matrix Composition:

| Ingredient | Weight percent |
|---|---|
| Polyvinyl Acetate | 55.00% |
| Hydrogenated Oil | 3.75% |
| Glycerol Monostearate | 1.25% |
| Sodium Hexametaphosphate | 26.00% |
| Sodium stearate | 4.00% |
| Sucralose | 10.00% |
| Total | 100.00% |

Procedure: Polyvinyl acetate is melted at a temperature of about 110° C. in a high shear mixer such as extruder (single or twin screw) or sigma or Banbury mixer. The hydrogenated oil and Glycerol monostearate are then added to the molten polyvinyl acetate. Sodiumhexamataphosphate is then added to the resulting mixture and mixed under high shear to completely disperse the ingredients. The resulting filled polymer melt is cooled and ground to produce a powdered material with the particle size of less than 420 microns. The encapsulation matrix is stored in air tight containers with low humidity below 35° C.

Example 78

Encapsulation of Urea and Sodiumtripolyphosphate—Polyvinyl Acetate Matrix

Composition:

| Ingredient | Weight percent |
|---|---|
| Polyvinyl Acetate | 55.00% |
| Hydrogenated Oil | 3.75% |
| Glycerol Monostearate | 1.25% |
| Urea | 10.00% |
| Sodiumtripolyphosphate | 20.00% |
| Sucralose | 10.00% |
| Total | 100.00% |

Procedure: Polyvinyl acetate is melted at a temperature of about 80° C. in a high shear mixer such as extruder (single or twin screw) or sigma or Banbury mixer. The hydrogenated oil and Glycerol monostearate are then added to the molten polyvinyl acetate. Actives are then added to the resulting mixture and mixed under high shear to completely disperse the ingredients. The resulting filled polymer melt is cooled and ground to produce a powdered material with the particle size of less than 420 microns. The encapsulation matrix is stored in air tight containers with low humidity below 35° C.

While there have been described what are presently believed to be the preferred embodiments of the invention, those skilled in the art will realize that changes and modifications may be made thereto without departing from the spirit of the invention, and it is intended to include all such changes and modifications as fall within the true scope of the invention.

The invention claimed is:

1. A chewing gum composition comprising:
(a) a liquid-fill composition; and
(b) a gum region surrounding said liquid-fill composition, said gum region comprising a gum base, maltitol in the amount of about 40% to about 60% by weight of said gum region and sorbitol in the amount of about 0% to about 10% by weight of said gum region;
wherein said liquid-fill composition further comprises at least one modified release component and wherein after three weeks at 37° C. said chewing gum composition exhibits a reduced loss of said liquid-fill composition into said gum region.

2. The composition of claim 1, wherein said modified release component is at least partially encapsulated.

3. The composition of claim 1, wherein said modified release component provides an extended release or an early release of said component.

4. The composition of claim 1, wherein said modified release component is selected from the group consisting of flavors, sweeteners, sensates, breath fresheners, dental care components, actives, herbals, effervescing systems, appetite suppressors, potentiators, food acids, micronutrients, mouth moistening components, throat care components, and combinations thereof.

5. The composition of claim 1 further comprising;
(c) a third region; said third region surrounding at least a portion of said gum region.

6. The composition of claim 5, wherein at least one of said gum region and said third region comprises a second modified release component.

7. The composition of claim 6, wherein said modified release component is the same as said second modified release component.

8. A composition comprising:
(a) a liquid-fill composition; and
(b) a gum region surrounding said liquid-fill composition, said gum region comprising a gum base, maltitol in the amount of about 40% to about 60% by weight of said gum region and sorbitol in the amount of about 0% to about 10% by weight of said gum region;
wherein said liquid-fill composition comprises at least one encapsulated component and wherein after three weeks at 37° C. said chewing gum composition exhibits a reduced loss of said liquid-fill composition into said gum region.

9. The composition of claim 8, wherein said encapsulated component provides extended release or early release of said component.

10. The composition of claim 8, wherein said encapsulated component is selected from the group consisting of flavors, sweeteners, sensates, breath fresheners, dental care components, actives, herbals, effervescing systems, appetite suppressors, potentiators, food acids, micronutrients, mouth moistening components, throat care components, and combinations thereof.

11. The composition of claim 8, further comprising;
(c) a third region; said third region surrounding at least a portion of said gum region.

12. The composition of claim 11, wherein at least one of said gum region and said third region comprises at least one additional encapsulated component.

13. The composition of claim 12, wherein said encapsulated component is selected from the group consisting of flavors, sweeteners, sensates, breath fresheners, dental care components, actives, herbals, effervescing systems, appetite suppressors, potentiators, food acids, micronutrients, mouth moistening components, throat care components, and combinations thereof and said additional encapsulated component is selected from the group consisting of flavors, sweeteners, sensates, breath fresheners, dental care components, actives, herbals, effervescing systems, appetite suppressors, potentiators, food acids, micronutrients, mouth moistening components, throat care components, and combinations thereof.

14. A gum composition comprising:
(a) a center-fill comprising greater than zero up to about 10% by weight of said gum composition;
(b) a gum region comprising from about 55% to about 65% by weight of said gum composition, said gum region comprising maltitol in the amount of about 40% to about 60% by weight of said gum region and sorbitol in the amount of about 0% to about 10% by weight of said gum region; and
(c) a coating comprising from about 25% to about 35% by weight of said gum composition;
wherein said gum composition further comprises a gum piece of about three grams or less, and
said center-fill comprises as least one modified release component;
and wherein after three weeks at 37° C. said gum composition exhibits a reduced loss of said center-fill into said gum region.

15. The gum composition of claim 14, wherein at least one of said gum region and said coating composition comprises an additional modified release component.

16. The gum composition of claim 15, wherein said modified release component is selected from the group consisting of flavors, sweeteners, sensates, breath fresheners, dental care components, actives, herbals, effervescing systems, appetite suppressors, potentiators, food acids, micronutrients, mouth moistening components, throat care components, and combinations thereof and said additional modified release component is selected from the group consisting of flavors, sweeteners, sensates, breath fresheners, dental care components, actives, herbals, effervescing systems, appetite suppressors, potentiators, food acids, micronutrients, mouth moistening components, throat care components, and combinations thereof.

17. A composition comprising:
(a) a liquid-fill composition comprising a first component and a second component, said first component being encapsulated and said second component being unencapsulated; and
(b) a gum region surrounding said liquid-fill composition, said gum region comprising a gum base, maltitol in the amount of about 40% to about 60% by weight of said gum region and sorbitol in the amount of about 0% to about 10% by weight of said gum region,
wherein after three weeks at 37° C. said gum composition exhibits a reduced loss of said liquid-fill composition into said gum region.

18. The composition of claim 17, wherein said first component and said second component are the same.

* * * * *